(12) United States Patent
Kitazato et al.

(10) Patent No.: US 9,807,448 B2
(45) Date of Patent: Oct. 31, 2017

(54) RECEPTION DEVICE, TRANSMISSION DEVICE, AND DATA PROCESSING METHOD

(71) Applicant: SONY CORPORATION, Tokyo (JP)

(72) Inventors: Naohisa Kitazato, Tokyo (JP); Jun Kitahara, Shizuoka (JP); Yoshiharu Dewa, Tokyo (JP); Yasuaki Yamagishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/308,518

(22) PCT Filed: Dec. 5, 2014

(86) PCT No.: PCT/JP2014/082260
§ 371 (c)(1),
(2) Date: Nov. 2, 2016

(87) PCT Pub. No.: WO2015/173986
PCT Pub. Date: Nov. 19, 2015

(65) Prior Publication Data
US 2017/0064371 A1 Mar. 2, 2017

(30) Foreign Application Priority Data
May 12, 2014 (JP) .................. 2014-098664

(51) Int. Cl.
*H04N 7/10* (2006.01)
*H04N 7/025* (2006.01)
(Continued)

(52) U.S. Cl.
CPC ........... *H04N 21/435* (2013.01); *H04N 5/278* (2013.01); *H04N 21/236* (2013.01);
(Continued)

(58) Field of Classification Search
CPC .. H04N 21/435; H04N 21/236; H04N 21/643; H04N 21/2553; H04N 21/2362;
(Continued)

(56) References Cited

U.S. PATENT DOCUMENTS 6,104,861 A * 8/2000 Tsukagoshi ............ G09B 5/065
348/E5.099
8,917,970 B2 * 12/2014 Kobayashi ....... G11B 20/00086
386/200

(Continued)

FOREIGN PATENT DOCUMENTS

JP 2003-284010 A 10/2003
JP 2010-245618 A 10/2010
(Continued)

OTHER PUBLICATIONS

"Data Coding and Transmission Specification for Digital Broadcasting", ARIB Standard, ARIB STD-B24, pp. 170-180.
(Continued)

*Primary Examiner* — Oschta Montoya
(74) *Attorney, Agent, or Firm* — Chip Law Group

(57) ABSTRACT

A device and a method for realizing accurate TTML subtitle data display control are provided. A TTML subtitle data storage packet storing TTML subtitle data as payload of a MMT packet defined in the MMT format, and a signaling message including subtitle-related information corresponding to the TTML subtitle data are transmitted from a transmission device to a reception device. The signaling message defines therein a time mode (TMD) as subtitle display timing control mode, and an operation mode (OPM) of selectively performing instant display of subtitles or TTML description-based display thereof, and the reception device can conduct display control in a designated mode.

16 Claims, 39 Drawing Sheets

(51) Int. Cl.
*H04N 21/435* (2011.01)
*H04N 5/278* (2006.01)
*H04N 21/236* (2011.01)
*H04N 21/643* (2011.01)
*H04N 21/235* (2011.01)
*H04N 21/2362* (2011.01)
*H04N 21/43* (2011.01)
*H04N 21/434* (2011.01)
*H04N 21/488* (2011.01)
*H04N 21/8543* (2011.01)

(52) U.S. Cl.
CPC ..... *H04N 21/2353* (2013.01); *H04N 21/2362* (2013.01); *H04N 21/4302* (2013.01); *H04N 21/4345* (2013.01); *H04N 21/4884* (2013.01); *H04N 21/643* (2013.01); *H04N 21/8543* (2013.01)

(58) Field of Classification Search
CPC ........... H04N 21/4302; H04N 21/4345; H04N 21/4884; H04N 21/8543; H04N 5/278
See application file for complete search history.

(56) References Cited

U.S. PATENT DOCUMENTS

| | | | | |
|---|---|---|---|---|
| 2003/0093790 | A1* | 5/2003 | Logan | G06F 17/30265 725/38 |
| 2005/0207442 | A1* | 9/2005 | Zoest | G11B 20/00086 370/465 |
| 2007/0147786 | A1* | 6/2007 | Togashi | G11B 27/105 386/241 |
| 2010/0162313 | A1* | 6/2010 | Ruiz-Velasco | G11B 27/329 725/44 |
| 2016/0014482 | A1* | 1/2016 | Chen | G11B 27/031 386/241 |

FOREIGN PATENT DOCUMENTS

| | | |
|---|---|---|
| JP | 2012-169885 A | 9/2012 |
| JP | 2012-203683 A | 10/2012 |

OTHER PUBLICATIONS

Dolan, et al., "Timed Text Markup Language 1 (TTML 1)", W3C Recommendation, Sep. 24, 2013, pp. 19-35.

Park, et al., "Text of ISO/IEC 2nd CD 23008-1 MPEG Media Transport", ISO/IEC JTC1/SC29/WG11 MPEG/N13293, Geneva, Switzerland, Jan. 2013, pp. 46-52.

"Midterm Report Related to Ultra High Definition Television Broadcasting System", Association of Radio Industries and Businesses, Nov. 25, 2013, 03 pages.

Glenn Adams, "Timed Text Markup Language 1 (TTML1) (Second Edition)", W3C Recommendation, Sep. 24, 2013, 15 pages.

Park, et al., "Text of ISO/IEC 2nd CD 23008-1 MPEG Media Transport", ISO/IEC JTC1/SC29/WG11, MPEG/N13293, Jan. 2013, pp. 46-52.

* cited by examiner

FIG. 10

DATA STRUCTURE OF MPT (MMT PACKAGE TABLE) (1/3)

```
Syntax

MP_table() {
    table_id
    version
    length
    If (table_id ==SUBSET_0_MPT_TABLE_ID) {        ···· BASE PACKAGE
        MMT_package_id
        MMT_package_id_length
        for (i=0; i<N1; i++) {                      ···· PACKAGE ID
            MMT_package_id_byte
        }
    }
    MPT_descriptors {
        MPT_descriptors_length
        for (i=0; i<N2; i++) {                      ···· MPT DESCRIPTOR
            MPT_descriptors_byte
        }
    }
}
```

FIG. 11

DATA STRUCTURE OF MPT (MMT PACKAGE TABLE) (2/3)

```
Syntax
number_of_assets
for (i=0; i<N3; i++) {
    asset_id{
        asset_id_length
        for (j=0; j<N4; i++) {
            asset_id_byte
        }
    }
    reserved
    asset_clock_relation_flag
    if (asset_clock_relation_flag == 1) {
        asset_clock_relation_id
        reserved
        asset_timescale_flag
        if (asset_time_scale_flag == 1) {
            asset_timescale
        }
    }
}
```

- ASSET
- ASSET ID
- CLOCK USED BY ASSET NTP., OTHERS: 1
- CLOCK ID TO BE REFERRED TO (IN CRI)

FIG. 16

SUBTITLE INFORMATION DESCRIPTOR (subtitle descriptor)

| DATA STRUCTURE | NUMBER OF BITS | NOTATION OF BIT STRING |
|---|---|---|
| subtitle_descriptor(){ | | |
| descriptor_tag | 16 | uimsbf |
| descriptor_length | 8 | uimsbf |
| ISO_639_language_code | 24 | uimsbf |
| type | 2 | bslbf |
| reserved_for_futureuse | 6 | bslbf |
| TMD | 4 | bslbf |
| DMF | 4 | bslbf |
| OPM | 2 | bslbf |
| reserved_for_futureuse | 2 | bslbf |
| format | 4 | bslbf |
| compression_mode | 3 | bslbf |
| reserved_for_futureuse | 5 | bslbf |
| } | | |

FIG. 17

| Bit1-0 | SUBTITLE TYPE CONTENTS |
|---|---|
| 00 | SUBTITLE BASIC INFORMATION |
| 01 | SUBTITLE EXTENSION INFORMATION |
| 10 | CHARACTER SUPERPOSITION |
| 11 | RESERVED |

FIG. 18

| TIME MODE (TMD) | |
|---|---|
| Bit3-0 | CONTENTS |
| 0001 | TTML DESCRIPTION + MH-EIT starttime |
| 0010 | TTML DESCRIPTION + NPT |
| 0011 | TTML DESCRIPTION + ABSOLUTE TIME |
| 0100 | TTML DESCRIPTION + reference starttime |
| 0101 | TTML DESCRIPTION + MPU timestamp |
| 1000 | MPU timestamp CONTROL |
| 1111 | NO PRESENTATION CONTROL (SUCH AS INSTANT DISPLAY ON RECEPTION) |

FIG. 19

| Bit3—2 | | Bit1—0 | | |
|---|---|---|---|---|
| PROCESSING FORM ON RECEPTION | | PROCESSING FORM ON RECORDING/ REPRODUCING | | CONTENTS |
| 00 | | | | AUTOMATIC DISPLAY ON RECEPTION |
| 01 | | | | NON-AUTOMATIC DISPLAY ON RECEPTION |
| 10 | | | | SELECTIVE DISPLAY ON RECEPTION |
| 11 | | | | RESERVED |
| | | 00 | | AUTOMATIC DISPLAY ON RECORDING/REPRODUCING |
| | | 01 | | NON-AUTOMATIC DISPLAY ON RECORDING/REPRODUCING |
| | | 10 | | SELECTIVE DISPLAY ON RECORDING/REPRODUCING |
| | | 11 | | RESERVED |

DISPLAY MODE (DMF)

FIG. 20

| OPERATION MODE (OPM) | |
|---|---|
| Bit1 – 0 | CONTENTS |
| 00 | LIVE MODE |
| 01 | SEGMENTATION MODE |
| 10 | PROGRAM MODE |
| 11 | RESERVED |

FIG. 21

| Bit3—0 | DISPLAY FORMAT CONTENTS |
|---|---|
| 0000 | 1920×1080(=HD) |
| 0001 | 3840×2160(=4K) |
| 0010 | 7680×4320(=8K) |
| 0000~1111 | RESERVED |

FIG. 22

| COMPRESSION MODE (Compression_mode) | |
|---|---|
| Bit2-0 | CONTENTS |
| 000 | NO COMPRESSION |
| 001 | COMPRESSION IN EXI |
| 010 | COMPRESSION IN BIM |
| 011 | COMPRESSION IN ZIP |
| 100~111 | RESERVED |

FIG. 25

UTC-NPT-reference/EMT DATA STRUCTURE

| DATA STRUCTURE | NUMBER OF BITS | NOTATION OF BIT STRING |
|---|---|---|
| UTC_NPT_reference_descriptor(){ | | |
| descriptor_tag | 8 | uimsbf |
| descriptor_length | 8 | uimsbf |
| postDiscontinuityIndicator | 1 | bslbf |
| reserved | 7 | bslbf |
| UTC_Reference | 64 | uimsbf |
| NPT_Reference | 64 | uimsbf |
| scale | 2 | uimsbf |
| reserved | 6 | uimsbf |
| } | | |

UTC TIME INFORMATION (UTC_Reference)

NPT TIME INFORMATION (NPT_Reference)

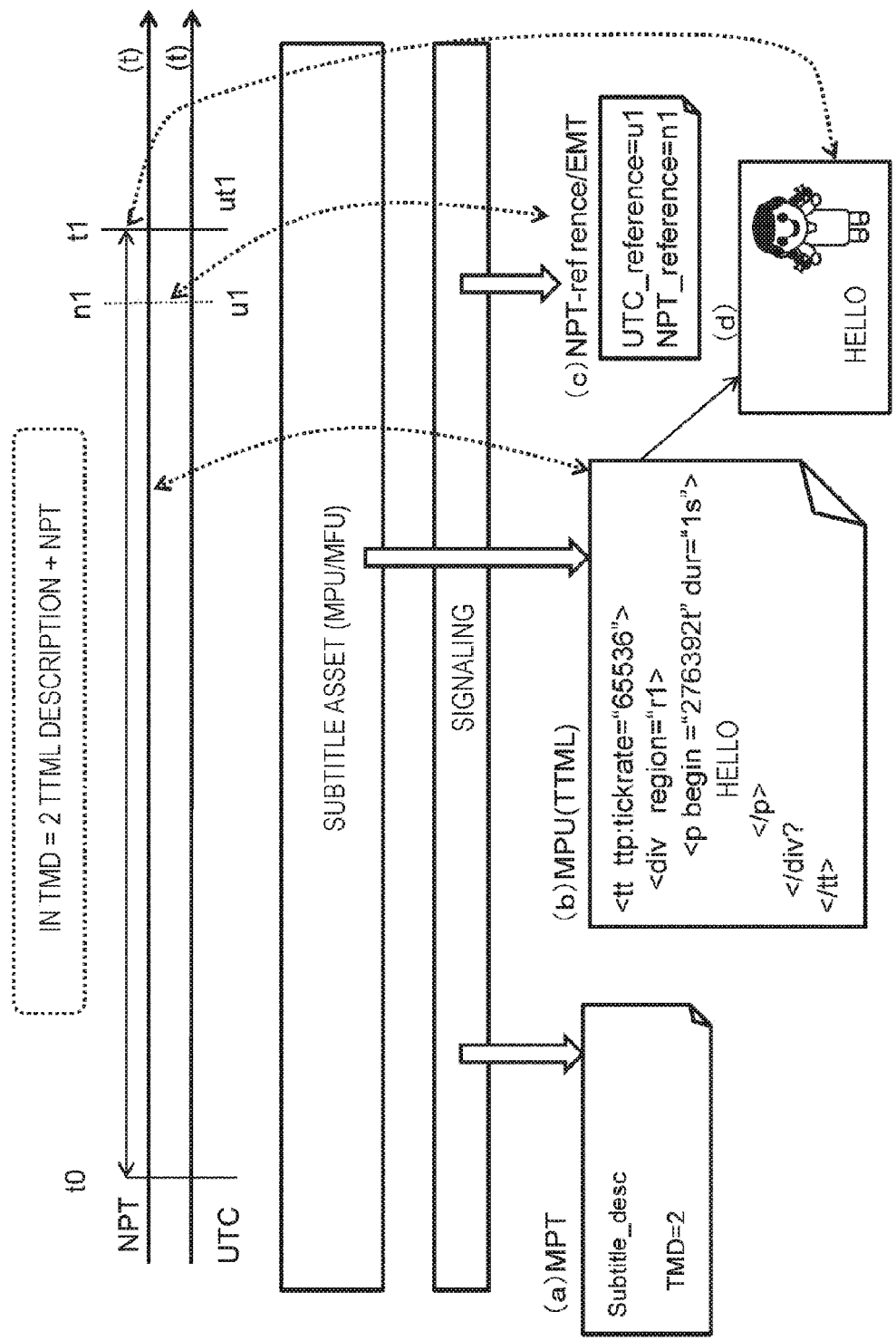

FIG. 30

MPU TIMESTAMP DESCRIPTOR DATA STRUCTURE

| DATA STRUCTURE | NUMBER OF BITS | NOTATION OF BIT STRING |
|---|---|---|
| MPU_Timestamp_Descriptor(){ | | |
| descriptor_tag | 16 | uimsbf |
| descriptor_length | 8 | uimsbf |
| for(i=0; i<N; i++){ | | |
| mpu_sequence_number | 32 | uimsbf |
| mpu_presentation_time | 64 | uimsbf |
| } | | |
| } | | | mpu_sequence_number → MPU SEQUENCE NUMBER mpu_presentation_time → MPU-RELATED TIMESTAMP (64bit)

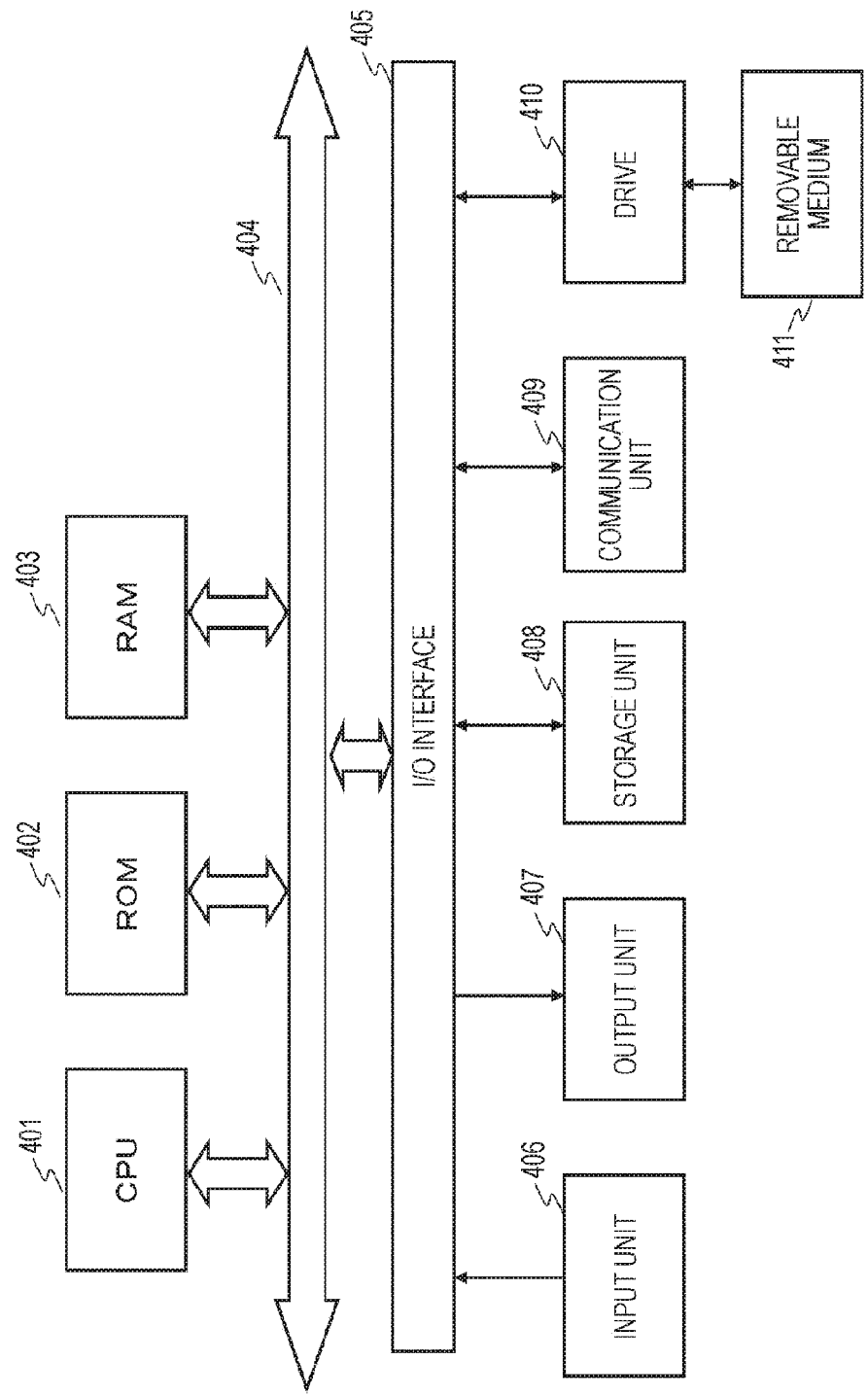

RECEPTION DEVICE, TRANSMISSION DEVICE, AND DATA PROCESSING METHOD

CROSS REFERENCE TO RELATED APPLICATIONS

This application is a U. S. National Phase of International Patent Application No. PCT/JP2014/082260 filed on Dec. 5, 2014, which claims priority benefit of Japanese Patent Application No. JP 2014-098664 filed in the Japan Patent Office on May 12, 2014. Each of the above-referenced applications is hereby incorporated herein by reference in its entirety.

TECHNICAL FIELD

The present disclosure relates to a reception device, a transmission device, and a data processing method. More specifically, the present disclosure relates to a reception device and a transmission device for transmitting or receiving data via broadcast waves, for example, and a data processing method.

BACKGROUND ART

There are various systems for superposing and displaying subtitles on a video, and Timed Text Markup Language (TTML) as subtitle data in the Extensible Markup Language (XML) form, which enables a display region, a display timing and the like to be controlled, are increasingly used.

TTML can be associated with a web application such as HTML5, and has a property that it can use not only character codes but also bit maps.

Note that, TTML is described in Patent Document 1 (Japanese Patent Application Laid-Open No. 2012-169885), for example.

CITATION LIST

Patent Document

Patent Document 1: Japanese Patent Application Laid-Open No. 2012-169885

SUMMARY OF THE INVENTION

Problems to be Solved by the Invention

The TTML subtitle data as subtitle data is used in VOD and the like, for example, but a specific method for delivering TTML subtitle data in TV broadcasting, for example, has not been obviously proposed.

It is an object of the present disclosure to provide a reception device and a transmission device capable of transmitting/receiving TTML subtitle data via broadcast waves and conducting various subtitle display control based on the TTML subtitle data on the reception side, and a data processing method.

Solutions to Problems

A first aspect of the present disclosure lies in
a reception device including:
a communication unit for receiving a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data; and
a data processing unit for conducting subtitle display control by use of the TTML subtitle data and the signaling message.

Further, a second aspect of the present disclosure lies in
A transmission device including:
a data processing unit for generating a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data; and
a communication unit for transmitting the TTML subtitle data storage packet and the signaling message.

Further, a third aspect of the present disclosure lies in
a data processing method performed by the reception device,
wherein the communication unit receives a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data, and
the data processing unit conducts subtitle display control by use of the TTML subtitle data and the signaling message.

Further, a fourth aspect of the present disclosure lies in
a data processing method performed by the transmission device,
wherein the data processing unit generates a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data, and
the communication unit transmits the TTML subtitle data storage packet and the signaling message.

Other objects, characteristics, and advantages of the present disclosure will be apparent in more detailed description based on the exemplary embodiments of the present disclosure or the accompanying drawings described below. Note that, a system in the present specification is a logical collective structure of a plurality of devices, and the devices in each structure are not necessarily present in the same casing.

Effects of the Invention

With the structure according to one exemplary embodiment of the present disclosure, a device and a method for realizing accurate TTML subtitle data display control are realized.

Specifically, a TTML subtitle data storage packet storing TTML subtitle data as payload of a MMT packet defined in the MMT format therein, and subtitle-related information corresponding to the TTML subtitle data are transmitted as a signaling message from a transmission device to a reception device. The signaling message defines a time mode (TMD) as a subtitle display timing control mode, or an operation mode (OPM) of selectively performing instant display of subtitles or TTML description-based display thereof, and the reception device can conduct display control in a designated mode.

With the structure, the device and the method for realizing accurate TTML subtitle data display control are realized.

Note that, the effects described in the present specification are merely exemplary and not restrictive, and additional effects may be given.

BRIEF DESCRIPTION OF DRAWINGS

FIG. 10 is a diagram for explaining MMT package table (MPT).

FIG. 11 is a diagram for explaining MMT package table (MPT).

FIG. 16 is a diagram for explaining subtitle-related information recorded in MPT.

FIG. 17 is a diagram for explaining a subtitle type recorded in MPT.

FIG. 18 is a diagram for explaining time modes recorded in MPT.

FIG. 19 is a diagram for explaining display modes recorded in MPT.

FIG. 20 is a diagram for explaining operation modes recorded in MPT.

FIG. 21 is a diagram for explaining display formats recorded in MPT.

FIG. 22 is a diagram for explaining compression modes recorded in MPT.

FIG. 25 is a diagram for explaining a data structure of UTC-NPT-reference/EMT.

FIG. 26 is a diagram for explaining the processing while TMD=2: TTML description+NPT mode is set.

FIG. 30 is a diagram for explaining a MPU timestamp descriptor.

FIG. 39 is a diagram for explaining an exemplary hardware structure of a communication device as the transmission device and the reception device.

MODE FOR CARRYING OUT THE INVENTION

Figure 1:
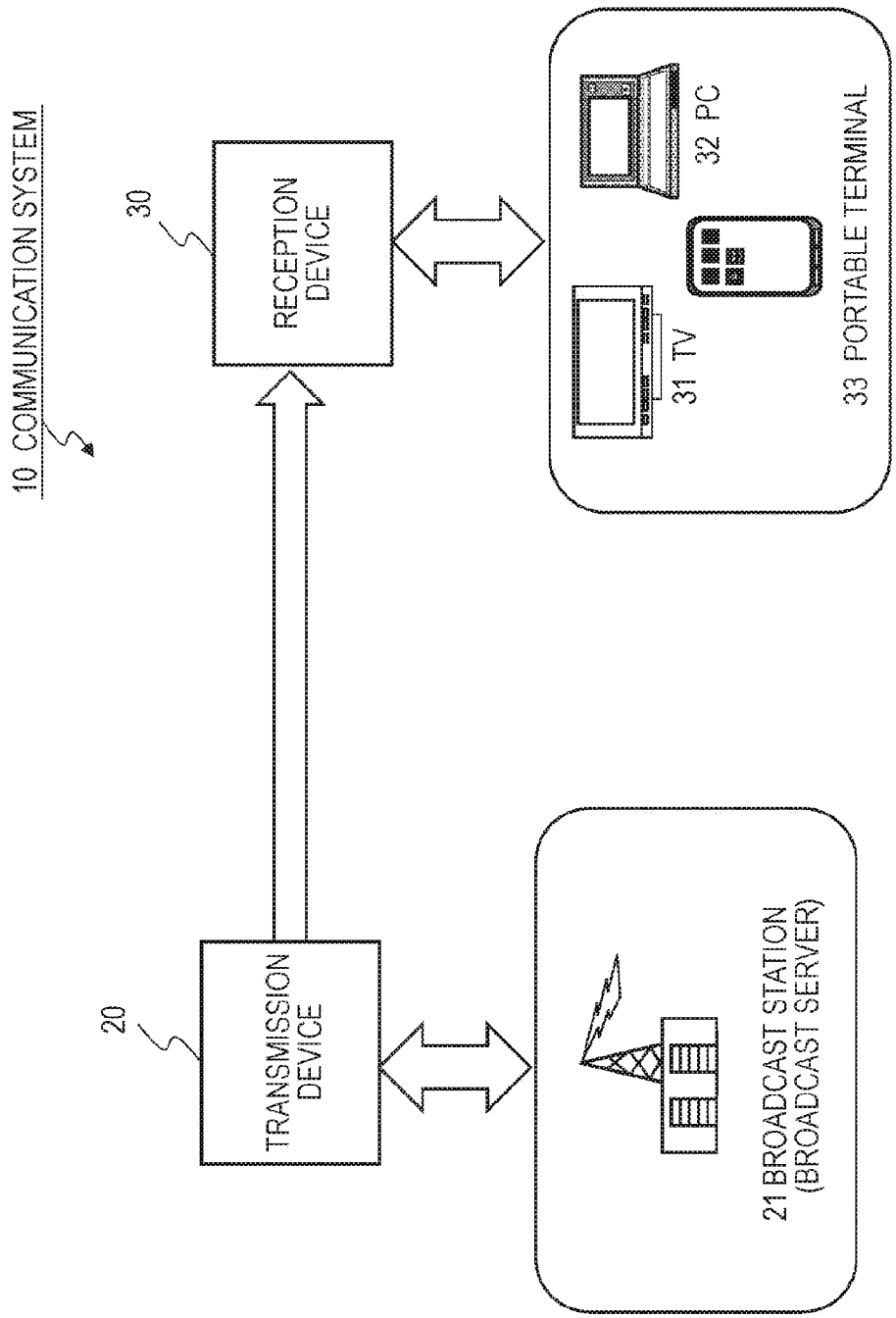
FIG. 1 is a diagram for explaining an exemplary structure of a communication system for performing the processing according to the present disclosure.

A reception device, a transmission device, and a data processing method according to the present disclosure will be described below in detail with reference to the drawings. Note that, the description will be made according to the following items.

1. Exemplary structure of communication system
2. Structures of transmission device and reception device, and MPEG Media Transport (MMT)
3. Details of MMT format
4. MMT package table (MPT)
5. Outline of data and TTML subtitle data transmitted from transmission device to reception device
6. Subtitle-related information recorded in MMT package table (MPT)
7. Specific processing in each of time modes (TMD)
  7-1. Processing while TMD=1: TTML description+EIT starttime mode is set
  7-2. Processing while TMD=2: TTML description+NPT mode is set
  7-3. Processing while TMD=3: TTML description+absolute time mode is set
  7-4a. Processing while TMD=4: TTML description+reference starttime mode is set (first example)
  7-4b. Processing while TMD=4: TTML description+reference starttime mode is set (second example)
  7-5. Processing while TMD=5: TTML description+MPU timestamp mode is set
  7-6. Processing while TMD=8: MPU timestamp mode is set
  7-7. Processing while TMD=15: no time control mode is set
8. Specific processing in each mode of operation modes (OPM)
  8-1. Processing while OPM=0 Live mode is set
  8-2. Processing while OPM=1: Segmentation mode is set
  8-3. Processing while OPM=2: Program mode is set
9. Processing sequences of processing performed by transmission device and reception device
10. Exemplary structures of transmission device and reception device
11. Summary of structure of present disclosure

[1. Exemplary Structure of Communication System]

An exemplary structure of a communication system for performing the processing according to the present disclosure will be first described with reference to FIG. 1.

As illustrated in FIG. 1, a communication system 10 has a transmission device 20 which is a communication device for transmitting video data, audio data, subtitle data, and data such as various items of control information, and a reception device 30 which is a communication device for receiving data transmitted from the transmission device 20.

The transmission device 20 is specifically a device for providing contents of various programs, such as broadcast station 21, for example.

On the other hand, the reception device 30 is a client device of a typical user, and is specifically configured of a TV 31, a PC 32, or a portable terminal 33, for example.

Data communication between the transmission device 20 and the reception device 30 is made as one-way communication using broadcast waves.

Data transmission from the transmission device 20 to the reception device 30 is performed mainly in the MPEG Media Transport (MMT) format.

The MMT format defines a data transfer system (transport format) when coding data as content structure data, such as video, audio, and subtitles, is transmitted via a broadcast wave or network.

The transmission device 20 codes content data, generates a data file including coded data and metadata of the coded data, and stores the generated coded data in a MMT packet defined in MMT to be transmitted via a broadcast wave or network.

Data provided from the transmission device 20 to the reception device 30 is configured of guidance information such as program guide, notification information, and control information in addition to data to be reproduced such as video, audio, and subtitles.

[2. Structures of Transmission Device and Reception Device, and MPEG Media Transport (MMT)]

As described above, data transmission from the transmission device 20 to the reception device 30 is performed mainly in the MPEG Media Transport (MMT) format.

The structures of the transmission device and the reception device, and the data exchange processing using the MMT format for MPEG Media Transport (MMT) will be described in detail with reference to FIG. 2 and others.

Figure 2:
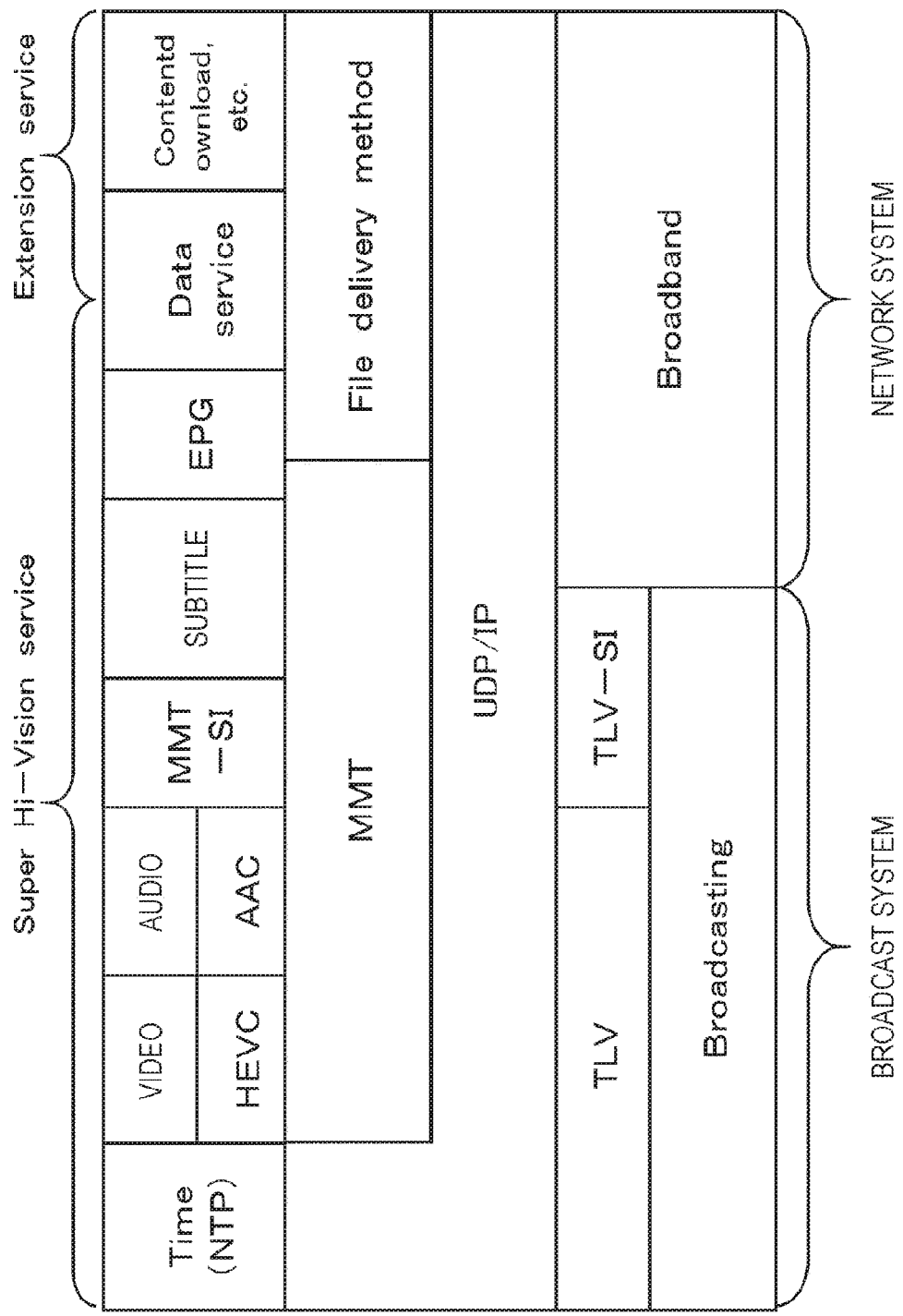
FIG. 2 is a diagram illustrating a stack model in the MMT format.

FIG. 2 is a diagram illustrating a stack model in the MMT format.

In the MMT stack model illustrated in FIG. 2, a physical layer (PHY) is present in the lowermost layer. The physical layer is divided into a broadcasting layer for broadcast processing, and a broadband layer for network processing.

MMT enables the processing using two communication networks for broadcast and network.

A Type Length Value (TLV) layer is present on top of the broadcasting layer for broadcast processing. TLV is a format definition layer defining an IP packet multiplexing system therein. A plurality of IP packets are multiplexed to be transmitted as a TLV packet. TLV-SI is a signaling message transmission layer in the TLV format.

A signaling message is configured of setting information required for receiving contents (programs) in the reception device 30, guidance information such as program guide, notification information, control information, and the like.

A signaling message stored in the TLV packet generated in the TLB layer is TLV-SI, and a signaling message stored in the MMT packet is MMT-SI indicated in the uppermost layer.

A UDP/IP layer is set on top of the TLV layer.

The UDP/IP layer is dividable into an IP layer and a UDP layer in detail, but is a layer for defining transmission for storing a UDP packet in payload of an IP packet.

A MMT layer and a File delivery method layer are set on top of the UDP/IP layer.

Both a system for transmitting a MMT packet stored in an IP packet, and a system for performing data transmission in an IP packet by use of the File delivery method as a data transmission system not using a MMT packet are usable.

The following layers are set on top of the MMT layer:
HEVC as video codec, and video data thereon
AAC as audio codec, and audio data thereon
Signaling message (MMT-SI) transmitted by use of MMT packet Subtitle data
Electronic Program Guide (EPG) as program information
Each item of the data is stored in a MMT packet to be transmitted.

Note that, Time (NTP: Network Time Protocol) is absolute time information, and is directly stored in a UDP packet to be transmitted.

Data service for performing other data delivery, contents download, and the like can be delivered by use of a different file delivery method from MMT.

Figure 3:
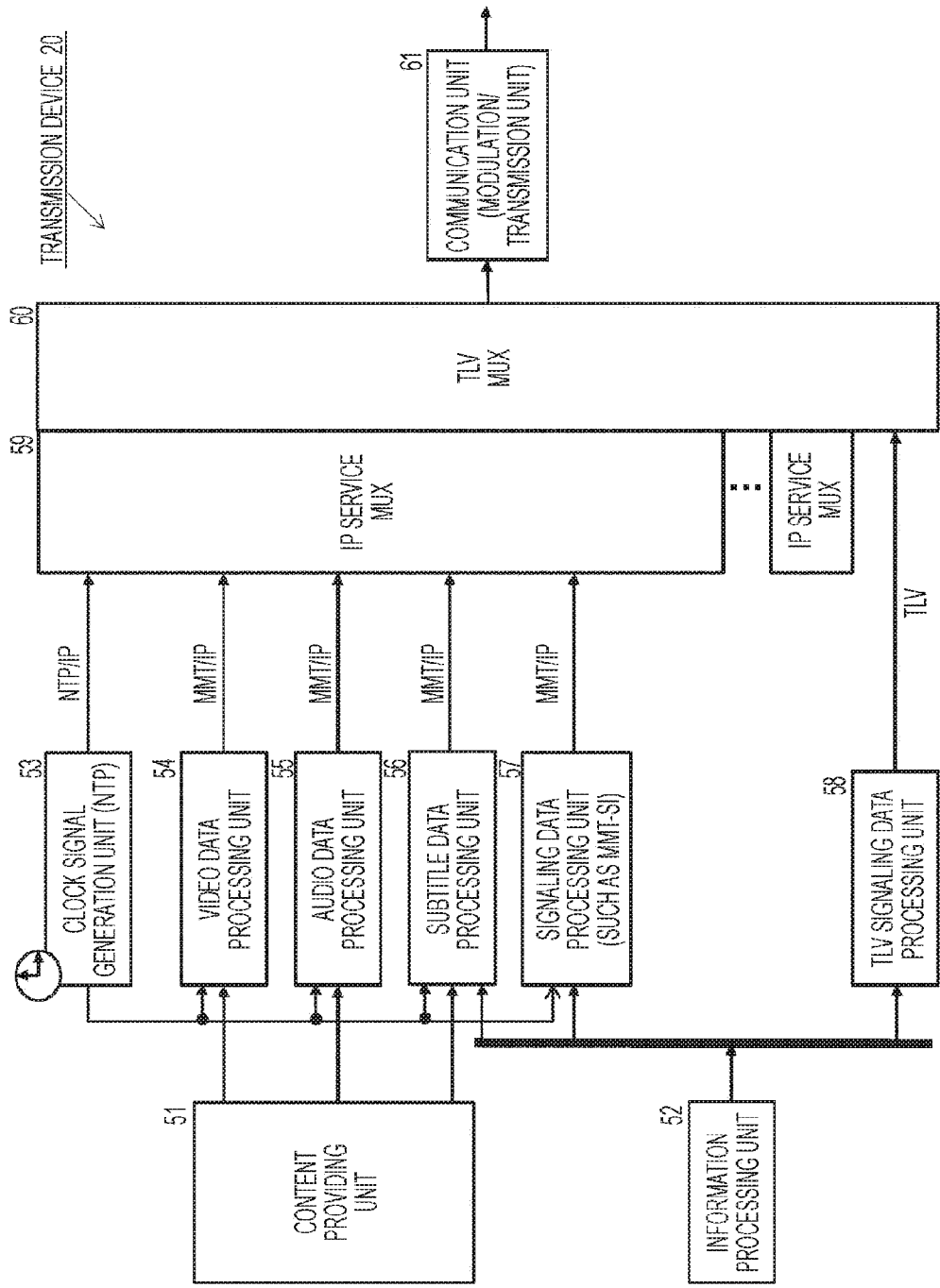
FIG. 3 is a diagram for explaining an exemplary structure of a transmission device.

FIG. 3 illustrates an exemplary structure of the transmission device 20 illustrated in FIG. 1.

As illustrated in FIG. 3, the transmission device 20 has a content providing unit 51, an information processing unit 52, a clock signal generation unit (NTP) 53, a video data processing unit 54, an audio data processing unit 55, a subtitle data processing unit 56, a signaling message processing unit 57 for performing the processing mainly on a signaling message stored in a MMT packet, a TLV signaling message processing unit 58 for performing the processing on a signaling message stored in a TLV packet, an IP service multiplexer (MUX) 59, a TLV multiplexer (MUX) 60, and a communication unit (modulation/transmission unit) 61.

The content providing unit 51 is configured of a storage unit storing program contents therein, for example. Additionally, it may be configured of a data acquisition unit such as TV camera or microphone for live broadcast. Alternatively, it may be configured as a communication unit with external servers or the like for supplying contents.

The content providing unit 51 outputs contents such as video, audio, and subtitle to the video data processing unit 54, the audio data processing unit 55, and the subtitle data processing unit 56, respectively.

Note that, subtitle data may be generated in the information processing unit 52.

The information processing unit 52 generates information (signaling message) required for accurately receiving and reproducing the contents provided by the content providing unit 51 in the reception device 30, such as generated subtitles, generated control information, or generated guidance information for the contents provided by the content providing unit 51.

The subtitle data generated by the information processing unit 52 is provided to the subtitle data processing unit 56. The signaling message is provided to the signaling message processing unit 57 and the TLV signaling message processing unit 58.

The clock signal generation unit 53 generates time information synchronized with time information obtained from a NTP server (not illustrated) for transmitting absolute time information, and transmits an IP packet including the generated time information to the IP service multiplexer 59.

Further, a clock signal generated in the clock signal generation unit 53 is also output to the video data processing unit 54, the audio data processing unit 55, and the subtitle data processing unit 56, and the video data processing unit 54, the audio data processing unit 55, and the subtitle data processing unit 56 generate an IP packet setting clock information therein.

The video data processing unit 54 codes and packetizes a video signal sent from the content providing unit 51, and sends an IP packet including a MMT packet storing video data therein to the IP service multiplexer 59. Further, the audio data processing unit 54 codes and packetizes an audio signal sent from the content providing unit 51, and sends an IP packet including an audio MMT packet therein to the IP service multiplexer 59.

Further, the subtitle data processing unit 56 codes and packetizes subtitle data sent from the content providing unit 51 or the information processing unit 52, and sends an IP packet including a subtitle MMT packet therein to the IP service multiplexer 59.

Note that, with the structure according to the present disclosure, subtitle data employs Timed Text Markup Language (TTML) as subtitle data in the Extensible Markup Language (XML) form enabling a display region or a display timing to be controlled.

TTML subtitle data will be described below in detail.

The signaling message processing unit 57 generates a signaling message on the basis of the information sent from the information processing unit 52, and generates an IP packet including a MMT packet in which the signaling message is arranged in the payload, and sends it to the IP service multiplexer 59.

The TLV signaling message processing unit 58 generates a signaling message on the basis of the information sent from the information processing unit 52, and generates a TLV packet in which the signaling message is arranged in the payload, and sends it to the TLV multiplexer 60.

The transmission device 20 provides the IP service multiplexer 59 per channel to send (broadcast channel). The IP service multiplexer 59 for one channel generates an IP packet including each of video, audio, subtitle, and signaling message sent from each of the data processing units 54 to 57, and sends it to the TLV multiplexer 60.

The TLV multiplexer 60 multiplexes the IP packet output from the IP service multiplexer 59 and the TLV signaling message output from the TLV signaling message processing unit 58, and generates and outputs a TLV packet including the data to the communication unit 61.

The communication unit 61 performs a RF modulation processing or the like on the TLV packet generated in the TLV multiplexer 60, and outputs a resultant broadcast wave.

Figure 4:
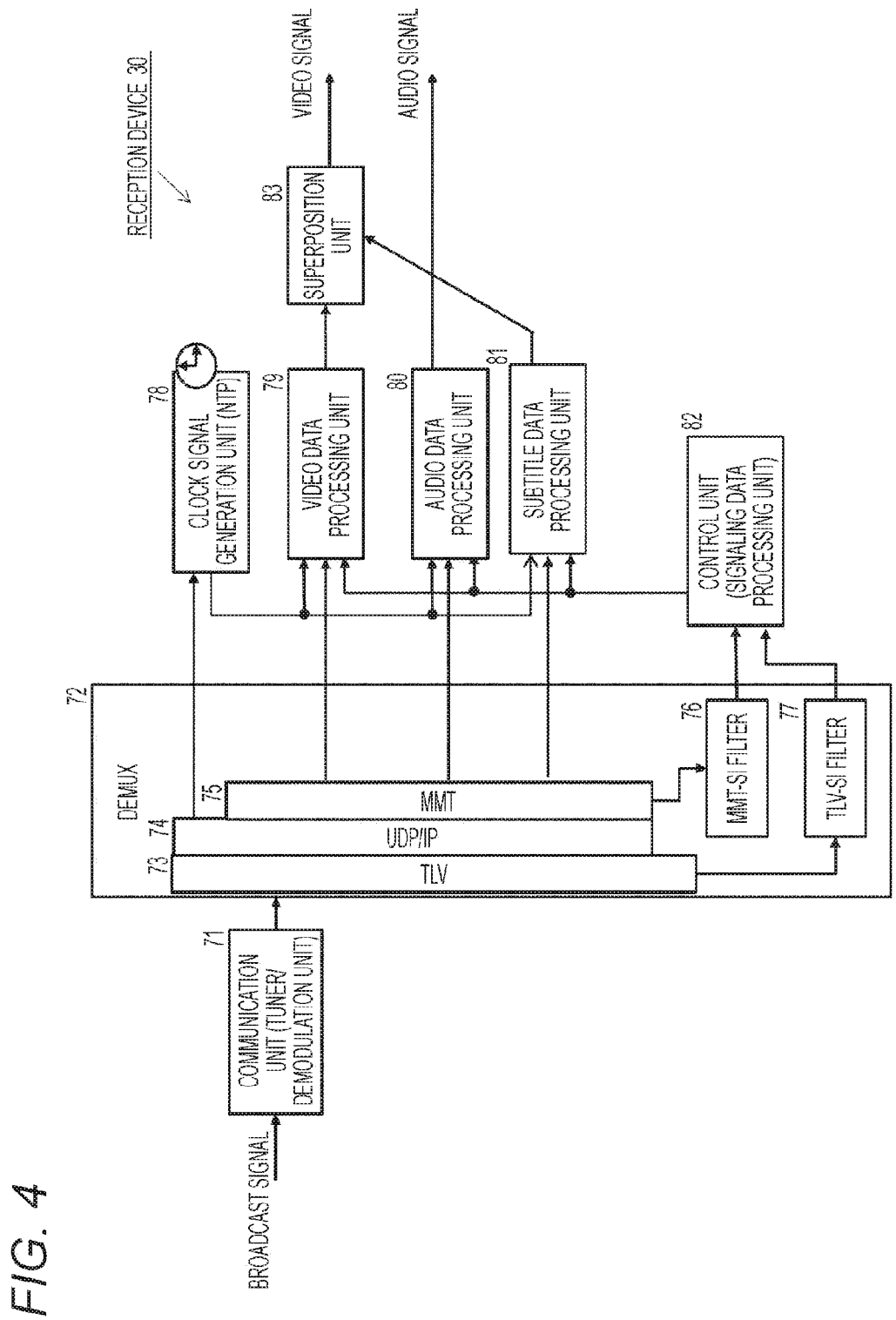
FIG. 4 is a diagram for explaining an exemplary structure of a reception device.

FIG. 4 illustrates an exemplary structure of the reception device 30 illustrated in FIG. 1. The reception device 30 illustrated in FIG. 4 has a communication unit 71, a demultiplexer 72, and the components of the demultiplexer 72 including a TLV processing unit 73, a UDP/IP processing unit 74, a MMT processing unit 75, a MMT-SI filter 76, and a TLV-SI filter 77.

It further has a clock signal generation unit 78, a video data processing unit 79, an audio data processing unit 80, a subtitle data processing unit 81, a control unit 82, and a superposition unit 83.

The communication unit (tuner/demodulation unit) 71 receives a RF modulation signal and performs the demodulation processing thereon, thereby obtaining a broadcast stream. The demultiplexer 72 performs the demultiplex processing and the packet separation processing on the broadcast stream.

Each MMT packet or signaling message described below is obtained in the processing of each of the components of the demultiplexer 72 including the TLV processing unit 73, the UDP/IP processing unit 74, the MMT processing unit 75, the MMT-SI filter 76, and the TLV-SI filter 77, and is output to a respective processing unit.

(1) To output NTP time information stored in an IP packet to the clock signal generation unit 78

(2) To output video data stored in a MMT packet to the video data processing unit 79

(3) To output audio data stored in a MMT packet to the audio data processing unit 80

(4) To output subtitle data stored in a MMT packet to the subtitle data processing unit 81

(5) To output signaling message stored in a MMT packet or a TLV packet to the control unit 82

Note that, the MMT-SI filter 76 selects the MMT signaling message stored in the MMT packet, and the TLV-SI filter 77 selects and outputs the TLV signaling message stored in the TLV packet. The same signaling message is repeatedly transmitted, and thus each filter confirms the version set in the packet, and selects and obtains a signaling message with a new version, and outputs it to the control unit 82 without obtaining the already obtained signaling messages.

The control unit 82 controls the operation of each unit in the reception device 30 on the basis of the signaling message obtained in the demultiplexer 72, or operation information from the user via a user operation unit (not illustrated).

The signaling message obtained by the control unit 82 is input into the video data processing unit 79, the audio data processing unit 80, and the subtitle data processing unit 81, and is applied to the processing in each data processing unit.

The clock signal generation unit 78 generates time information synchronized with the NTP time information on the basis of the NTP time information obtained in the demultiplexer 72.

Note that, a clock signal generated by the clock signal generation unit 78 is input into the video data processing unit 79, the audio data processing unit 80, and the subtitle data processing unit 81, and the data generated in each data processing unit can be synchronized and output.

The video data processing unit 79 performs the decode processing or the like on a coded video signal obtained in the demultiplexer 72 thereby to generate an output video signal. Further, the audio data processing unit 405 performs the decode processing or the like on a coded audio signal obtained in the demultiplexer 72 thereby to generate an output audio signal. Further, the subtitle data processing unit 81 decodes a coded subtitle signal obtained in the demultiplexer 72 thereby to obtain a subtitle display signal.

Note that, the subtitle data processing unit 81 conducts subtitle output control for determining a display timing, a display region, and the like of subtitles, and outputs the subtitles to the superposition unit 83 at the determined display timing.

The display control processing will be described below in detail.

A clock signal generated by the clock signal generation unit 78 is input into the video data processing unit 79, the audio data processing unit 80, and the subtitle data processing unit 81, and the data generated in each data processing unit is synchronized and output.

The superposition unit 83 performs the processing of superposing the subtitle data generated by the subtitle data processing unit 81 on the video signal generated by the video data processing unit 76 and outputting it.

Note that, as described above, with the structure according to the present disclosure, the subtitle data employs Timed Text Markup Language (TTML), which is subtitle data in the Extensible Markup Language (XML) format enabling a display region, a display timing, and the like to be controlled.

TTML subtitle data will be described below in detail.

[3. Details of MMT Format]

The communication system 10 illustrated in FIG. 1 assumes that MMT is mainly applied as the transport system for transmitting a broadcast signal from the transmission device 20 to the reception device 30.

When MMT is used as the transport system, data is stored in a MMT packet to be transmitted.

A structure of a MMT packet will be described with reference to FIG. 5 and others.

A MMT packet is a unit of media data formatted to be transmitted by use of the MMT protocol.

Figure 5:
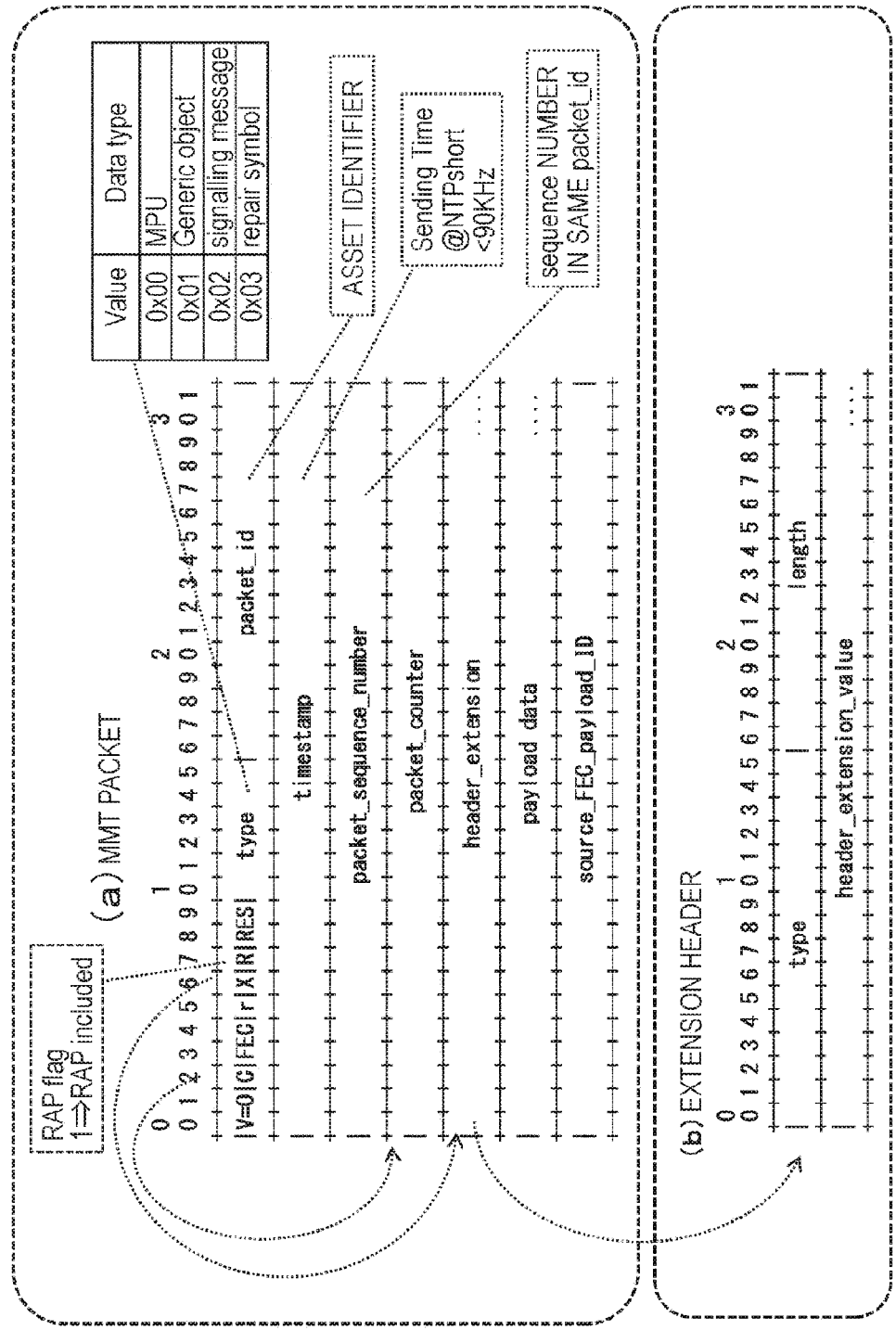
FIG. 5 is a diagram for explaining a structure of a MMT packet.

(a) in FIG. 5 is a diagram illustrating an entire structure of a MMT packet.

When 1 is substituted into a packet counter flag "C," it is expressed that the packet counter field indicated in an arrow from Cis present in the MMT packet. The packet counter is a 32-bit length field to be written with an integer value of the counted MMT packets, and is incremented by 1 each time a MMT packet is transmitted.

When 1 is substituted into an extension flag "X," it is expressed that an extension header indicated in an arrow is present. (b) in FIG. 5 illustrates an exemplary structure of the extension header. The extension header is configured of a 16-bit length type field, a length field, and a header_extension_value field. A byte length of the header_extension_value field is written in the length field. Extension information not conforming to the MMT specification can be written in the header_extension_value field.

A type value indicating a type of the payload data of the MMT packet is written in the type field. The definitions of the type value are as follows.

0x00: MPU
0x01: Generic object
0x02: signaling message
0x00: repair symbol

The payload with type=0x00 is a media presentation unit (MPU). MPU is a unit set as one unit of video, audio, subtitle, or the like, for example. For example, one picture is 1 MPU for video. One TTML file is set as 1 MPU for subtitles.

Note that, 1 MPU is divided into a plurality of media fragment units (MFUs) as needed to be stored in the MMT packet.

The payload with type=0x02 is a signaling message. This is configured of setting information in the reception device, notification information, guidance information, attribute information on transmission data (video, audio, subtitles), control information, and the like.

Other types do not have a direct relationship with the processing according to the present disclosure, and thus the description thereof will be omitted.

When 1 is substituted into a Random Access Point (RAP) flag, it is expressed that the payload of the MMT packet includes Random Access Point to a data stream with the data type.

An integer value for discriminating an asset is written in the 16-bit length packet_id field. A value in the field results from asset_id of the asset to which the MMT packet belongs.

Mapping between a packet identifier (packet_id) and an asset identifier (asset_id) is indicated by MMT package table (MPT) as part of the signaling message.

MPT will be described below in detail.

Note that, asset is a data unit set for a signal series. Video data, audio data, and subtitle data are set as different assets, respectively. Further, when video data including a plurality of different items of video data, such as multi-view video, is transmitted, the shot videos are set as different assets, such as asset 1 for camera 1 and asset 2 for camera 2.

In the case of subtitle data, individual assets are set depending on the kind of subtitles.

Note that, the kinds of subtitles are discriminated by various elements such as languages including Japanese or English, subtitle type, and time mode defining a subtitle display timing, and TTML subtitle data in which the respective elements are identical is assumed as one asset.

A transmission time of the MMT packet is described in the 32-bit length timestamp field in the short-format defined in the NTP protocol.

An integer value (sequence number on the MMT transmission path) for discriminating a packet having the same packet_id is described in the 32-bit length packet_sequence_number field.

A serial number of the MMT packet is described in the 32-bit length packet_counter field.

Figure 6:
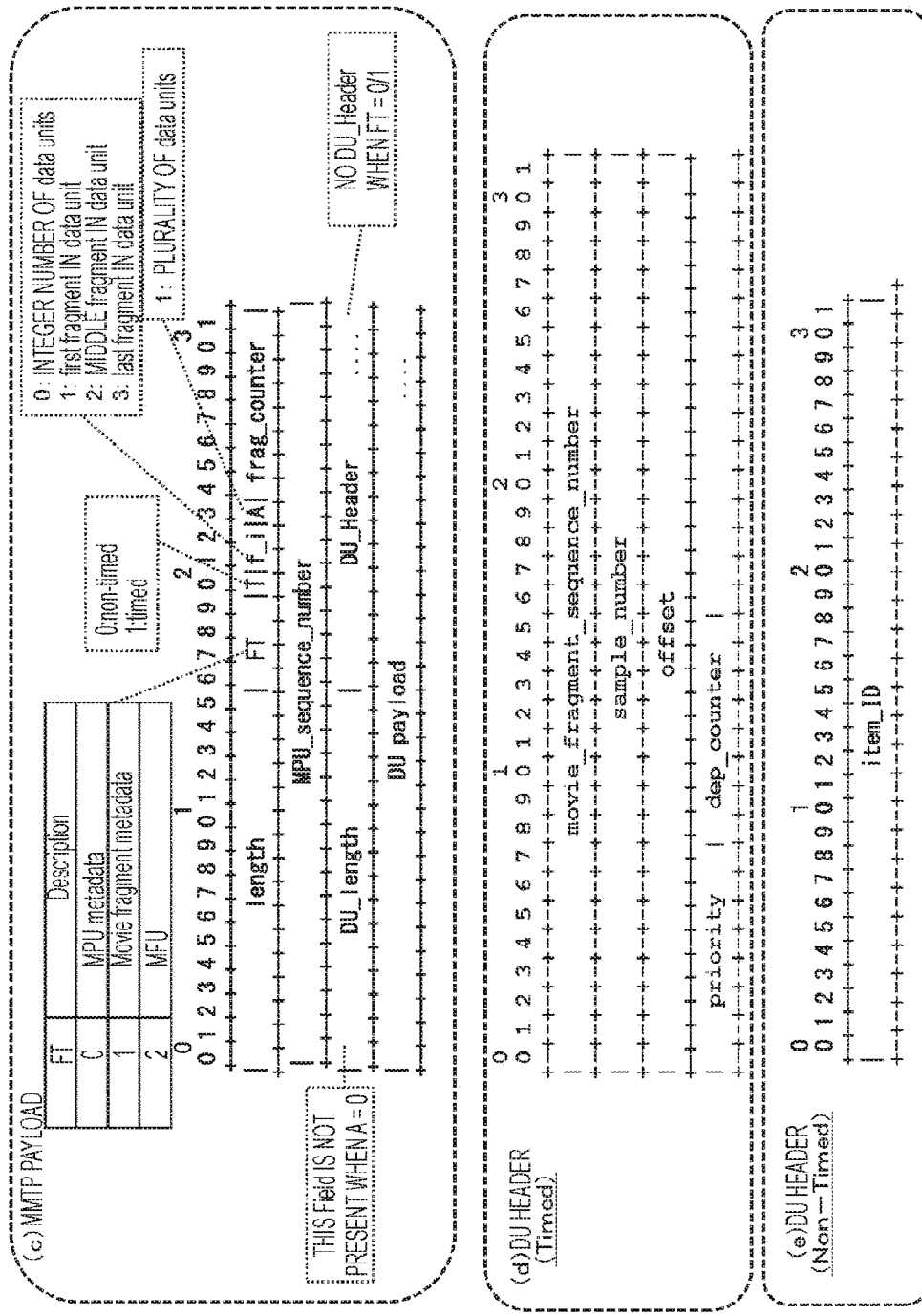
FIG. 6 is a diagram for explaining a structure of a MMT packet.

(c) in FIG. 6 illustrates an exemplary structure of the payload of the MMT packet storing MPU as one unit of video, audio, or subtitles or MFU as divided data of MPU therein. A MMT packet storing MPU or MFU as divided data of MPU therein is called MPU mode MMT packet. This is when "0x00" is written in the type field in the MMT header. The MPU mode MMT packet is used for transmitting data such as video, audio, or subtitles.

A fragment type is indicated in a 4-bit value in the MPU Fragment Type (FT) field. The definitions of the FT value are as follows:

0: MPU metadata
1: Movie fragment metadata
2: MFU

When 1 is written in the Timed (T) flag, it is expressed that MPU for transmitting timed media is fragmented, and when 0 is written therein, it is expressed that MPU for transmitting non-timed media is fragmented.

With data transmission using a MMT packet, both timed media such as video or audio as stream media, and non-timed media such as file can be transmitted.

The Timed (T) flag is directed for identifying whether MPU is timed media or non-timed media.

Information on fragmentation of the data unit in the payload is indicated in 2 bits in the Fragmentation Identifier (f_i) field. The definitions of four values of f_i are as follows:

0: To store an integer number of data units (MPU)
1: To store the first fragment (MFU) of data unit (MPU)
2: To store middle fragment (MFU) of data unit (MPU)
3: To store the last fragment (MFU) of data unit (MPU)

The number of payloads including the fragments of the same data unit followed by the MMT payload is described in the 8-bit length fragment_counter field.

A length of data (DU: Data Unit) leading to the 16-bit length DU_length field is described in the 16-bit length DU_length field. When the A flag is 0, the DU_length field is not present.

DU_Header is the header of a data unit. When the FT value is 0 or 1 (or when it is not MFU), DU_Header is not present. MFU includes a sample or sub-sample of timed media, or an item of non-timed media.

MPU or MFU as divided data of MPU is stored in DU_payload. Specifically, coded data of video, audio, or subtitles is stored. In the case of subtitle data, Timed Text Markup Language (TTML) is employed in the structure according to the present disclosure. TTML subtitle data will be described below in detail.

(d) in FIG. 6 illustrates an exemplary structure of DU_Header of MFU in which timed media is arranged in the payload. Further, (e) in FIG. 6 illustrates an exemplary structure of DU_Header of MFU in which non-timed media is arranged in the payload. As illustrated in (e) in FIG. 6, DU_Header for non-timed media is configured of 32-bit length item_ID which is the identifier of an item transmitted as part of the MFU. The item is a resource configuring the application of HTML document data or mono-media data referred to by a HTML document. An item can be uniquely specified in a combination of packet_id in the header of the MMT packet, download id in the extension header, and item_ID in the DU header on the MMT transmission path designated by asset_id.

As described above, type set in the header of the MMT packet illustrated in FIG. 5 is type information capable of identifying whether the payload is MPU configured of video, audio, and subtitles, or a signaling message.

The payload with type=0x00 is a media presentation unit (MPU) configured of video, audio, and subtitles.

The payload with type=0x02 is a signaling message.

Figure 7:
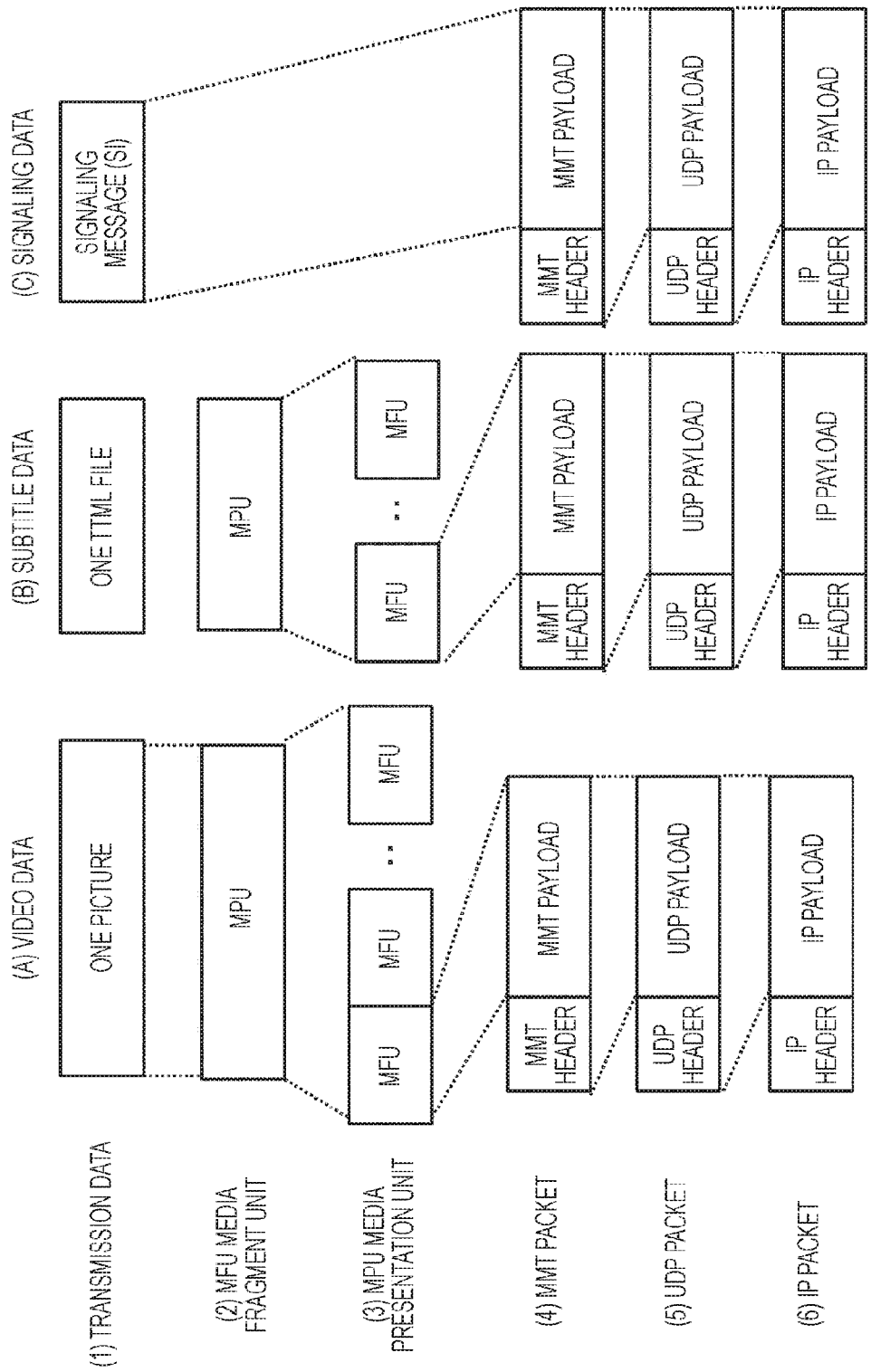
FIG. 7 is a diagram for explaining data transmission in the MMT format.

FIG. 7 is a diagram for explaining the structures of packets storing MPU, and an exemplary structure of packets storing a signaling message.

The following packet structures are illustrated by way of example:

(A) Video data (MPU)
(B) Subtitle data (MPU)
(C) Signaling data (A) and (B) illustrate MPU of video and subtitles by way of example, and MPU is a unit set as one unit of video, audio, or subtitles, for example. For example, one picture is 1 MPU for video. One TTML file is set as 1 MPU for subtitles.

One MPU is divided into a plurality of media fragment units (MFU) as needed to be stored in a MMT packet.

The MMT packet is stored in a UDP packet, and the UDP packet is further stored in an IP packet.

Further, though not illustrated, the IP packet is stored in a TLV packet to be transmitted.

On the other hand, the payload with type=0x02 is (C) signaling message. This is configured of setting information in the reception device, notification information, guidance information, attribute information on transmission data (video, audio, and subtitles), control information, and the like.

The signaling message is not in the unit setting such as MPU/MFU, and is defined in its order by a sequence number, for example, to be stored in a MMT packet.

The MMT packet is stored in a UDP packet, and the UDP packet is further stored in an IP packet.

Further, though not illustrated, the IP packet is stored in a TLV packet to be transmitted.

Note that, with the structure according to the present disclosure, subtitle data employs Timed Text Markup Language (TTML).

Figure 8:
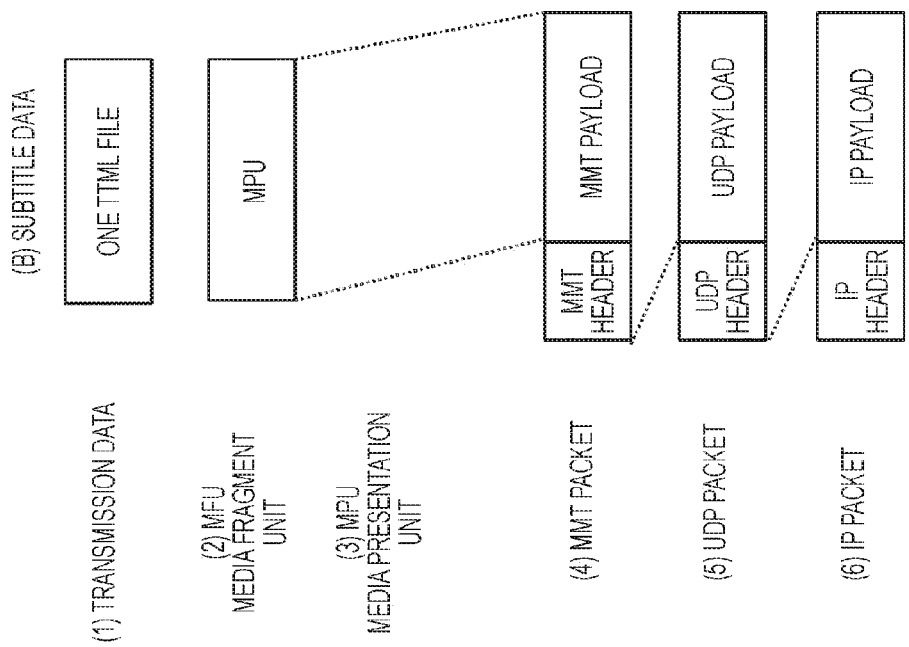
FIG. 8 is a diagram for explaining data transmission in the MMT format.

A TTML file has a smaller amount of data than video data, and thus may not need to be divided (fragmented) in many cases. Thus, as illustrated in FIG. 8, for example, one TTML file including TTML subtitle data is assumed as 1 MPU, and the MPU is stored in a MMT packet to be transmitted in many cases.

[4. MMT Package Table (MPT)]

According to the present disclosure, subtitle data transmitted by use of a MMT packet is TTML and subtitle data, and control information such as display control for the subtitle data is transmitted as a signaling message.

A signaling message including control information for subtitle data is MMT package table (MPT) by way of example.

MMT package table (MPT) will be described below.

A signaling message used in the MMT protocol includes information required for data transmission control or the data decode and reproduction processing in the reception device.

The MMT signaling message uses a typical format configured of three common fields, one field specific to each signaling message type, and a message payload. The message payload transmits signaling information.

Figure 9:
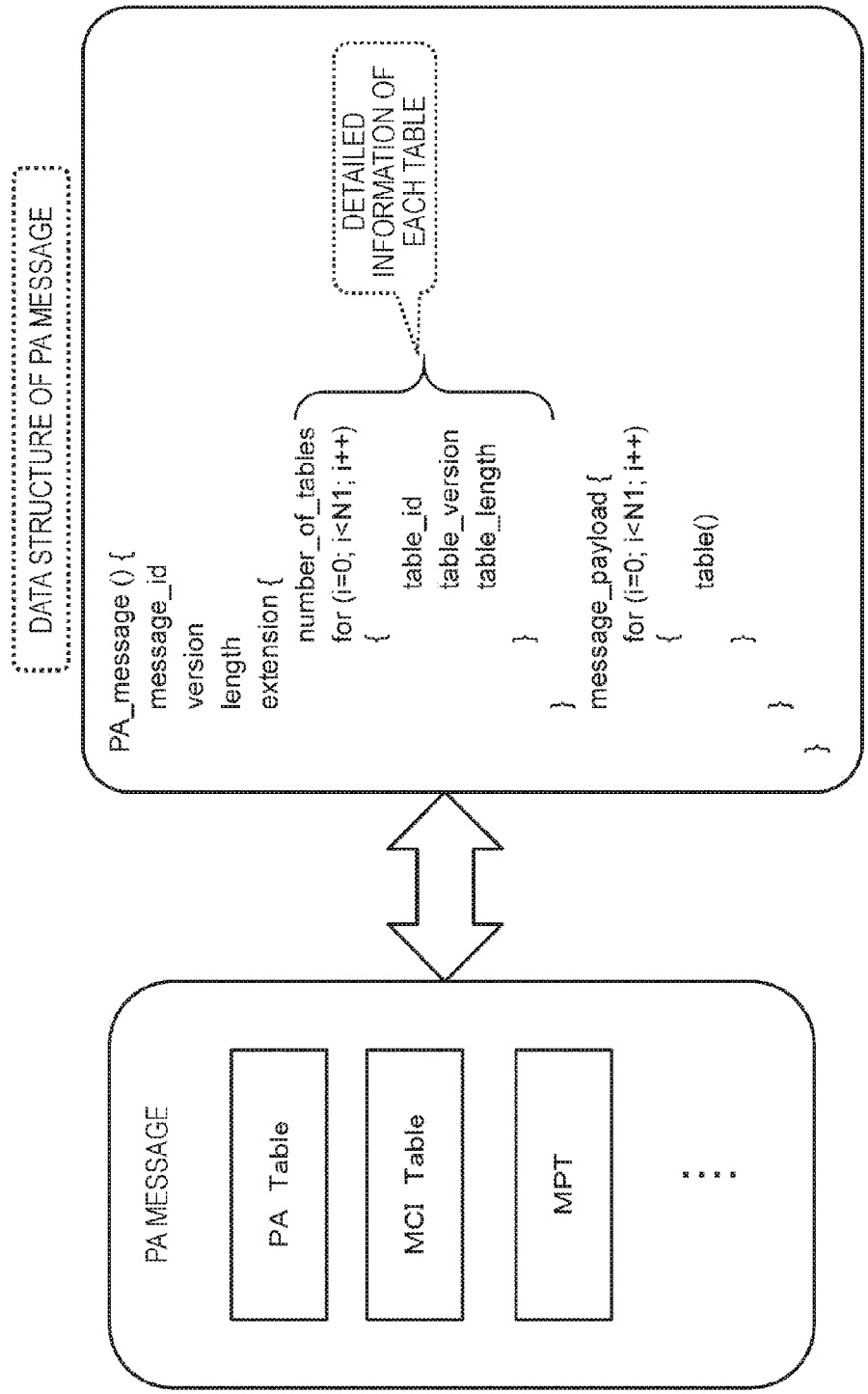
FIG. 9 is a diagram for explaining a PA message.

A PA message including MMT package table (MPT) as a signaling message including control information for subtitle data will be described with reference to FIG. 9.

A package Access (PA) message transmits a PA table having various items of information required for data reception and the coding and reproduction processing in the reception device 30. The PA table includes a plurality of tables, one of which is MMT package table (MPT).

A data structure of the PA message illustrated on the right side of FIG. 9 will be described.

message id is a 16-bit fixed value for identifying the PA message in various items of signaling information.

version is an 8-bit integer value parameter indicating a version of the PA message. When even some parameters configuring MPT are updated, for example, version is incremented by +1. length is a 32-bit length parameter indicating a size of the PA message counted immediately after the field in bytes.

Index information in each table arranged in the payload field is arranged in the extension field. 8-bit table_id, 8-bit table_version, and 16-bit table_length are arranged in the field.

Detailed information on each table is recorded in the payload field in the PA message.

Detailed information on MMT package table (MPT) is also recorded therein.

A data structure of MMT package table (MPT) will be described below with reference to FIG. 10 to FIG. 13.

Figure 12:
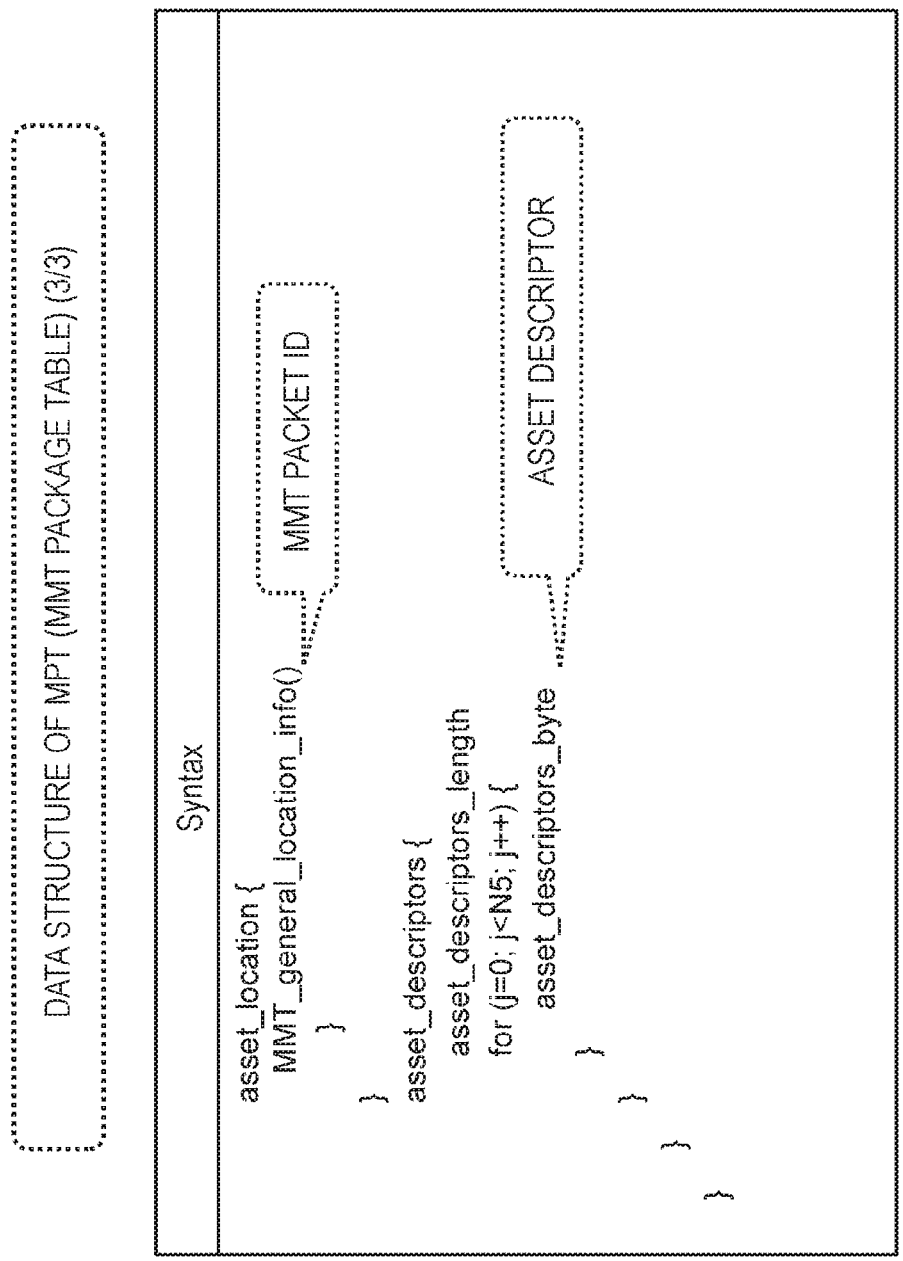
FIG. 12 is a diagram for explaining MMT package table (MPT).

The structure of MMT package table (MPT) is divided into three parts of front part, middle part, and rear part, which are illustrated in FIG. 10 to FIG. 12, respectively.

A structure of the MPT heading part will be described with reference to FIG. 10.

table_id is an 8-bit fixed value for identifying MPT in various items of signaling information.

version is an 8-bit integer value indicating a version of MPT. For example, when even some parameters configuring MPT are updated, version is incremented by +1. length is a 32-bit length parameter indicating a size of MPT counted immediately after the field in bytes.

MMT_package_id is identification information on the entire package including components of assets such as all the signals transmitted in broadcast signals (video, audio, and subtitles) and files. The identification information is text information.

MMT_package_id length indicates a size of the text information in bytes.

MP_table_descriptors field is an area where a descriptor of the entire package is stored.

MPT_table_descriptor length is a 16-bit length parameter indicating a size N2 of the field in bytes. Then, MP_table_descriptor assumes to be as much as N2 bytes (one or more assets are arranged) in consideration of descriptors for various purposes.

A structure of the middle part of MPT will be described below with reference to FIG. 11.

number_of_assets is an 8-bit parameter indicating the number of assets (signals or files) as elements configuring the package. As many following loops (Asset loop) as number_of_asset (N3) are arranged.

The respective parameters asset_id_len, asset_id, gen_loc_info, asset_dsc_len, and asset_descriptor are arranged as individual items of asset information in one Asset loop.

asset_id is text information for uniquely identifying an asset asset_id_len indicates a size of asset_id in bytes.

asset_clock_relation_flag describes therein a clock used by an asset or clock information referred to for subtitle display timing when the asset is TTML subtitle data, for example.

asset_timescale records a clock ID referred to by an asset.

A structure of the rear part of MPT will be described below with reference to FIG. 12.

MMT_general_loc_info is information indicating an asset acquisition position. According to the present exemplary embodiment, it is described in the form of packet id on the transmission path as the asset acquisition position. Thus, asset_id is used on MPT thereby to extract relevant packet ID on the MMT transmission path.

The asset_descriptor field is an area where a descriptor for an asset is stored. asset_dsc_len indicates a size N5 of the asset_descriptor field in bytes. Then, asset_descriptor is assumed to be arranged by N5 (one or more assets) in consideration of descriptors for various purposes.

Asset-related control information is recorded therein.

When an asset is TTML subtitle data, TTML subtitle data display control information is described.

Note that, an asset corresponding to subtitle data is set per kind of the subtitle data.

The kind of subtitles is discriminated by various elements such as languages including Japanese or English, subtitle type, and time mode defining a subtitle display timing, and TTML subtitle data in which the respective elements are identical is assumed as one asset.

The subtitles-related control information recorded in PMT, and its use form will be described below in detail.

[5. Outline of Data and TTML Subtitle Data Transmitted from Transmission Device to Reception Device]

Data and TTML subtitle data transmitted from the transmission device 20 to the reception device 30 illustrated in FIG. 1 will be described below with reference to FIG. 13 and others.

Figure 13:
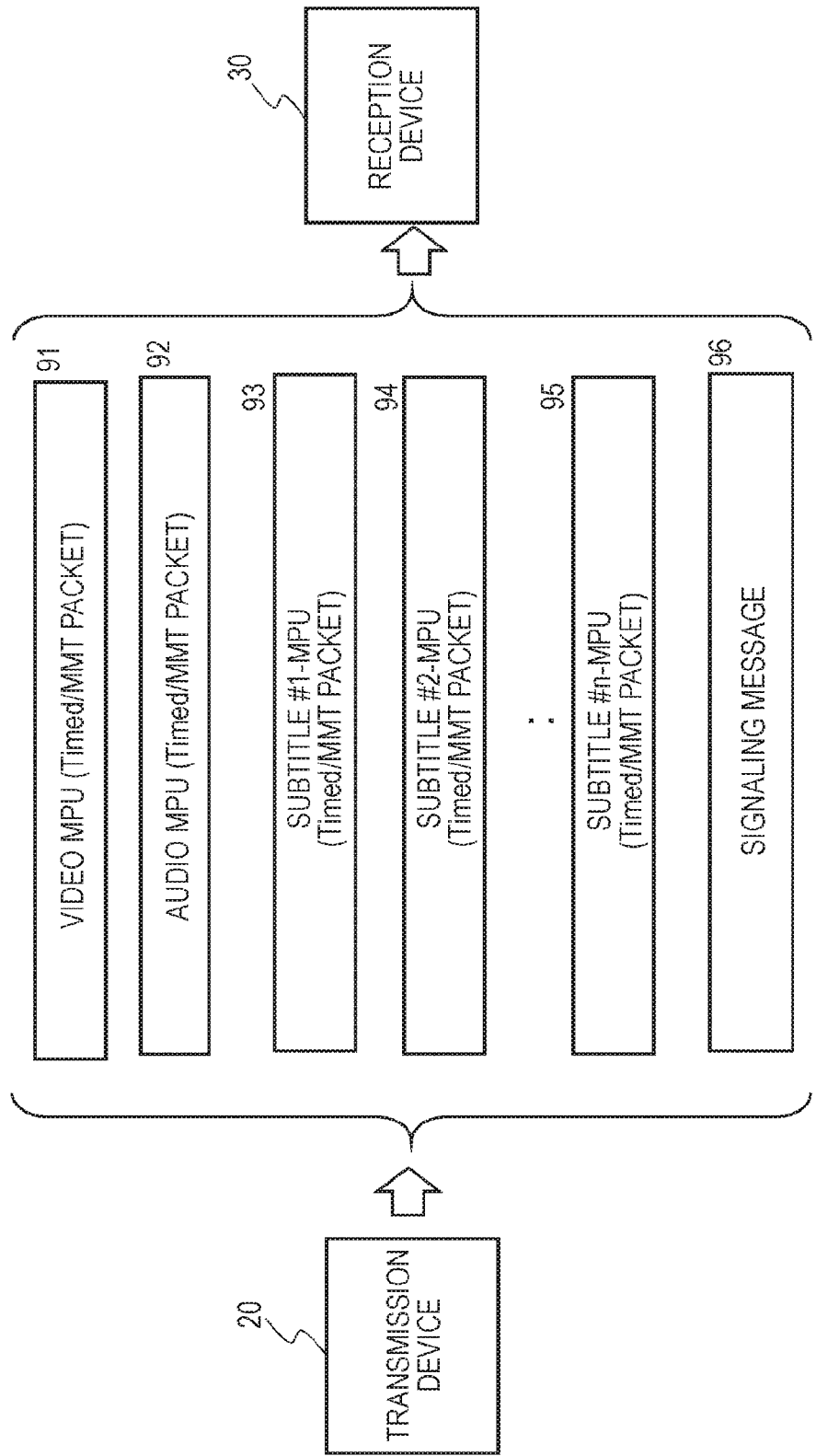
FIG. 13 is a diagram for explaining data transmitted from the transmission device to the reception device.

FIG. 13 is a diagram for explaining exemplary transmission data of the transmission device 20.

FIG. 13 illustrates the kinds of data transmitted from the transmission device 20 to the reception device 30. The data transmitted from the transmission device 20 to the reception device 30 is the following data:

(a) Video MPU 91
(b) Audio MPU 92
(c) Subtitle MPU 93 to 95
(d) Signaling message 96

Each item of the data is stored as payload of the MMT packet defined in the MMT format in the MMT packet to be transmitted.

(a) Video MPU 91, (b) Audio MPU 92, and (c) Subtitle MPU 93 to 95 are transmitted as timed media in media presentation unit (MPU).

The subtitle data is TTML subtitle data, and is transmitted in units of asset. The illustrated #1 to #3 correspond to the asset identifiers.

An asset is set per kind of subtitles as described above, and is set per subtitle in a different data form depending on language such as Japanese or English, or kind such as typical subtitles or subtitles for hearing-impaired people, for example.

The signaling message 96 includes MPT for subtitle control and the like described above. Note that, the signaling message 96 is configured of guidance information such as program guide, notification information, control information, and the like in addition to MPT.

The subtitle data is superposed on video data to be displayed, and needs to be controlled for display position or display timing.

The processing for the subtitle data will be described below with reference to FIG. 14 and others.

Figure 14:
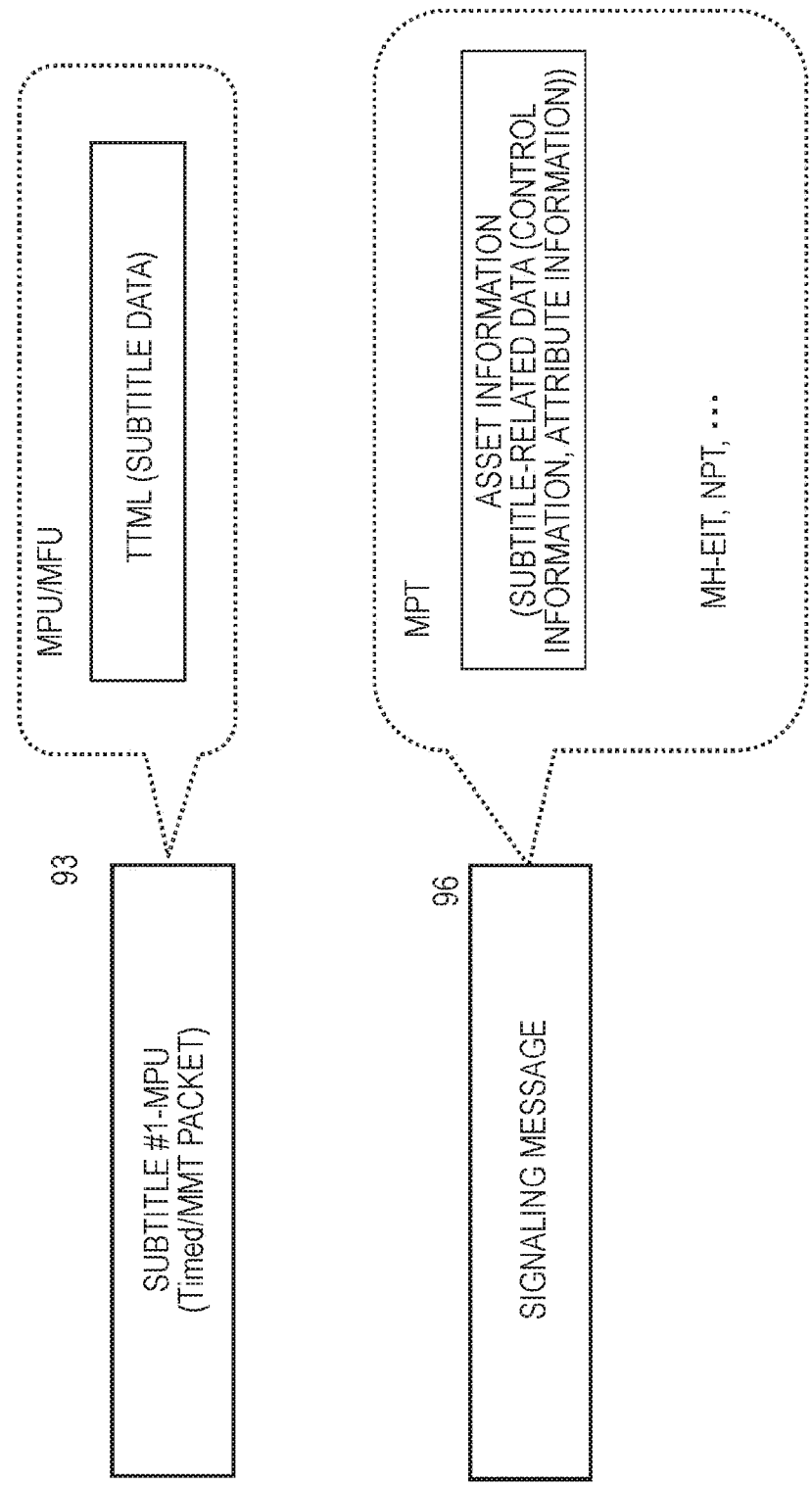
FIG. 14 is a diagram for explaining subtitle-related data transmitted from the transmission device to the reception device.

FIG. 14 is a diagram illustrating subtitle data transmitted from the transmission device 20 to the reception device 30 described with reference to FIG. 13, and information applied for controlling the subtitle data.

Subtitle-related data transmitted from the transmission device 20 to the reception device 30 includes the following data:

the subtitle MPU 93 including TTML subtitle data as subtitle data, and the signaling message 96 storing control information and the like corresponding to the TTML subtitle data.

These items of data include data required for displaying the subtitles in the reception device 30.

The transmission device 20 according to the present disclosure transmits, as MPU, Timed Text Markup Language (TTML) data as subtitle data in the Extensible Markup Language (XML) form.

Note that, one TTML subtitle file is set as one media presentation unit (MPU), while the MPU is divided into a plurality of items to generate MFUs, which may be stored in a MMT packet in units of MFU for transmission.

The signaling message 96 includes MPT storing control information applied to TTML subtitle data display control, or MPT described above with reference to FIG. 9 to FIG. 12, and other information (MH-EIT).

MH-Envent Information Table (EIT) records therein information such as title, broadcast time/date, and contents to be broadcasted of a program.

The signaling message 96 includes various items of notification data usable in the reception device 30 in addition to the above data.

Figure 15:
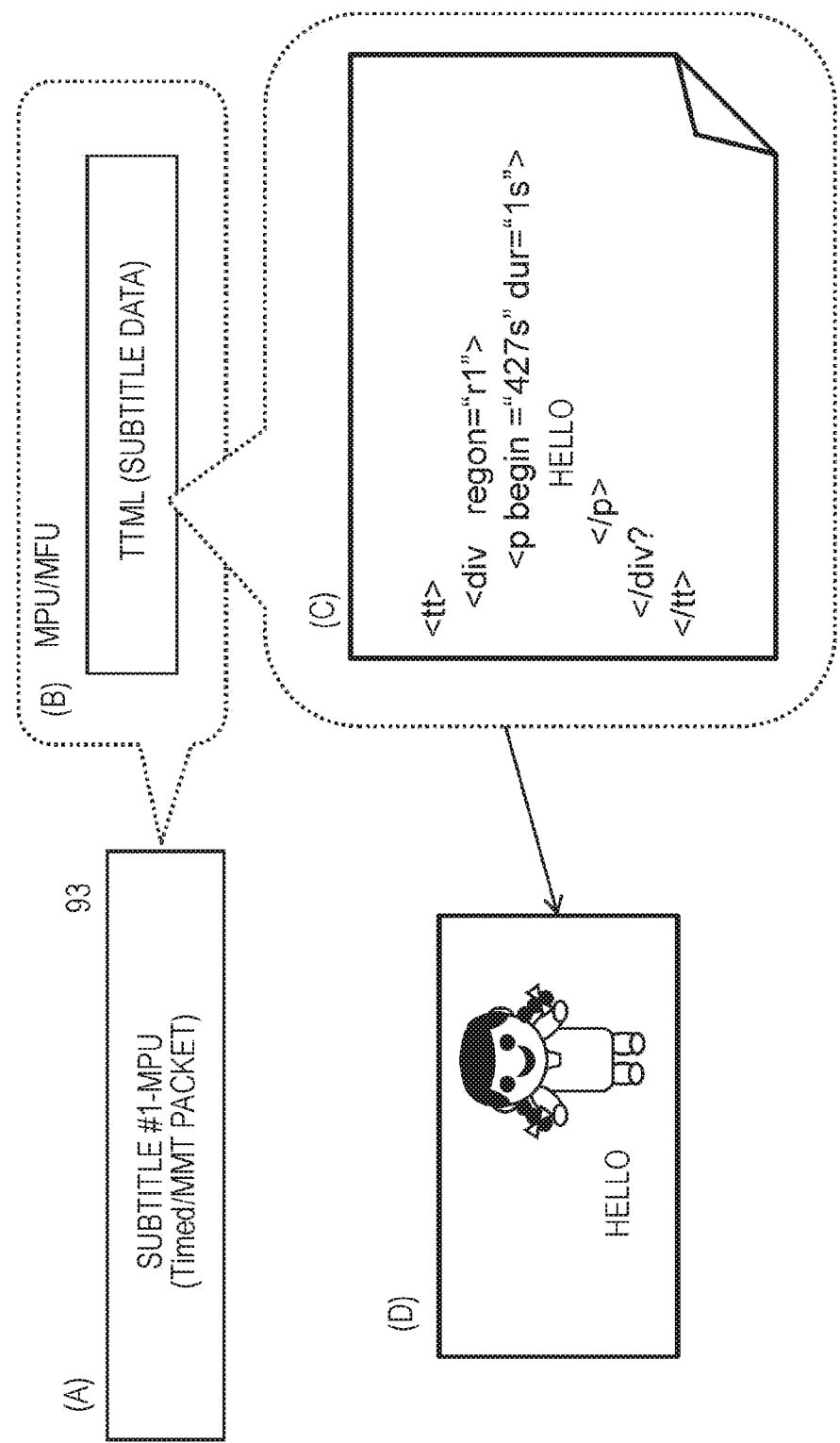
FIG. 15 is a diagram for explaining a structure and exemplary use of TTML subtitle data.

FIG. 15 is a diagram illustrating an exemplary structure of TTML subtitle data in the XML form stored as MPU in a MMT packet.

For example, as illustrated in (B) in FIG. 15, TTML subtitle data is stored in (A) subtitle MPU 71 described with reference to FIG. 13 and FIG. 14.

The TTML subtitle data is in the XML form as illustrated in (C) in FIG. 15, for example, and is configured to be able to describe the information on display area and display timing in addition to actually-displayed character strings.

The reception device 30 interprets the TTML subtitle data, and performs the processing of generating display data illustrated in (D) in FIG. 15 or display data in which subtitles are superposed on the video data acquired and decoded from other MMT packet, and displaying it on the display unit.

[6. Subtitles-Related Information Recorded in MMT Package Table (MPT)]

Subtitles-related information recorded in MMT package table (MPT) will be described below.

MMT package table (MPT) is a table configuring a PA message as a signaling message as described above with reference to FIG. 9 to FIG. 12.

MMT package table (MPT) records therein asset-based attribute information or control information for TTML subtitle data transmitted as MPU in a MMT packet.

FIG. 16 illustrates subtitle information descriptors (subtitle descriptors) recorded in MPT. That is, they are attribute information or control information corresponding to TTML subtitle data set as MPU.

The data illustrated in FIG. 16 is asset-based information recorded in the fields in and subsequent to asset_descriptor_byte in MMT package table (MPT) which is the signaling data in FIG. 12 described above.

As illustrated in FIG. 16, the following descriptors are recorded in the subtitle information descriptor (subtitle descriptor) recording fields:
 (1) Language code (ISO_639_language_code)
 (2) Subtitle type (Type)
 (3) Time mode (TMD)
 (4) Display mode (DMF)
 (5) Operation mode (OPM)
 (6) Display format (Format)
 (7) Compression mode (Compression_mode)

The information will be sequentially described below in detail.

(1) Language Code (ISO_639_Language_Code)

Language code (ISO_639_language_code) is data indicating the kind of language as a language code defined in ISO639-2.

For example, in the case of Japanese language, jpn (01101010 01110000 01101110) is assumed.

(2) Subtitle Type (Type)

Subtitle type (Type) is information indicating a type of subtitles.

FIG. 17 illustrates specific examples.
 00=subtitle basic information
 01=subtitle extension information
 10=character superposition Information for discriminating the subtitle types is recorded.

Note that, the subtitle basic information indicates basic subtitle data. The subtitle extension information is used for changing a character display form for rich expression. It is used only when it can be understood in the reception device. The character superposition is data for discriminating the characters of braking news or the like.

(3) Time Mode (TMD)

Time mode (TMD) indicates a time control mode used for controlling a subtitle display timing. Specifically, as illustrated in FIG. 18, any of the following modes is recorded:
 0001=TTML description+EIT starttime
 0010=TTML description+NPT
 0011=TTML description+absolute time
 0100=TTML description+reference starttime
 0101=TTML description+MPU timestamp
 1000=MPU timestamp
 1111=no presentation control (such as instant display on reception)

"TTML description" is a description of the display timing recorded in the TTML subtitle data described above with reference to (c) in FIG. 15.

The TTML subtitle data illustrated in (c) in FIG. 15 records the following display timing control information therein:
 <p begin "427 s"dur="1 s">

The TTML description is a description of the display timing for displaying the characters "HELLO" for one second from a time point of 427 seconds after the program starts.

However, the display timing control depending on only the description of the TTML subtitle data may not be necessarily conducted due to inserted commercial messages or braking news during actual program display.

The time mode (TMD) recorded in MPT is used for enabling the subtitles to be displayed at a display timing accurately coinciding with the video in any case.

Note that, the specific processing in four modes recordable in the time mode (TMD) will be described below.

(4) Display Mode (DMF)

The display mode (DMF) is information on a subtitle display mode. Specific examples thereof are illustrated in FIG. 19.

The display mode (DMF) is configured of 4 bits, where the higher 2 bits (Bit 3 to 2) indicate a processing form on reception, and the lower 2 bits (Bit 1 to 0) indicate a processing form on recording/reproducing.

The processing form on reception in the higher 2 bits defines processing when receiving MPU storing TTML subtitle data therein, and defines any of the following display modes:
 00=automatic display on reception
 01=non-automatic display on reception
 10=Selective display on reception 00=automatic display on reception is a mode defining that subtitles are displayed according to TTML subtitle data and MPT control information received on reception of MPU storing TTML therein.

01=non-automatic display on reception is a mode defining that subtitles recorded in TTML subtitle data received on reception of MPU storing TTML therein are not displayed.

10=selective display on reception is a mode of enabling subtitles of TTML subtitle data received on reception of MPU storing TTML therein to be displayed or not to be displayed depending on the user's setting of a remote controller, for example.

The processing form on recording/reproducing in the lower 2 bits defines a processing when recording a program or the like in a medium such as hard disk and then reproducing it, and defines any of the following display modes:
 00=automatic display on recording/reproducing
 01=non-automatic display on recording/reproducing
 10=selective display on recording/reproducing 00=automatic display on recording/reproducing is a mode defining that subtitles are displayed according to TTML subtitle data and MPT control information when reproducing contents including MPU storing TTML therein.

01=non-automatic display on recording/reproducing is a mode defining that subtitles recorded in TTML subtitle data are not displayed when reproducing contents including MPU storing TTML therein.

10=selective display on recording/reproducing is a mode of enabling subtitles of TTML subtitle data to be displayed or not to be displayed depending on the user's setting of a remote controller when reproducing contents, for example.

(5) Operation Mode (OPM)

The operation mode (OPM) is operation mode definition information applied for subtitle display control. Specific examples thereof are illustrated in FIG. 20. The following modes can be set for the operation mode (OPM).

00=Live mode
01=Segmentation mode
10=Program mode

00=Live mode is a mode of instantly displaying received TTML subtitle data on reception, for example. It is a mode set for displaying subtitle data of simultaneous interpretation, for example.

01=Segmentation mode is a mode applied to contents for which subtitle data is previously prepared, such as movie contents, and is a mode of displaying at a display timing defined in MPT and TTML subtitle data control information.

10=Program mode is a mode in which a TTML file recording all the subtitles of one program is prepared and is transmitted from the transmission device to the reception device and the reception device performs subtitle display of the program by use of the TTML file.

Note that, specific examples of the processing in setting each of the operation modes (OPM) will be described below in detail.

(6) Display Format (Format)

The display format (Format) is a descriptor defining a display format of a display screen displaying subtitle data thereon. Specifically, as illustrated in FIG. 21, the following formats are set as follows.

0000=1920×1080 (HD)
0001=3840×2160 (4K)
0010=7860×4320 (8K)

These indicate subtitle data corresponding to the display screens, for example.

(8) Compression Mode (Compression_Mode)

The compression mode (Compression_mode) is a descriptor indicating a compression mode of TTML subtitle data. Specifically, as illustrated in FIG. 22, any of the following compression modes is set:

000=no compression
001=compression in EXI
010=compression in BIM
011=compression in ZIP For example, information indicating which compression processing described above is performed on TTML subtitle data is set.

[7. Specific Processing in Each of Time Modes (TMD)]

Specific processing in each of the time modes (TMD) as one subtitle information descriptor (Subtitle descriptor) recorded in MPT will be described below.

As described with reference to FIG. 18, the time mode (TMD) indicates a time control mode used for controlling a subtitle display timing. Specifically, as illustrated in FIG. 18, any of the following modes is recorded:

0001=TTML description+EIT starttime
0010=TTML description+NPT
0011=TTML description+absolute time
0100=TTML description+reference starttime
0101=TTML description+MPU timestamp
1000=MPU timestamp
1111=no presentation control (such as instant display on reception)

Specific examples of subtitle display control of the reception device corresponding to the seven time mode settings will be described below.

[7-1. Processing while TMD=1: TTML Description+EIT Starttime Mode is Set]

Subtitle display control in the time mode (TMD) of TMD=1 or in the setting of 0001=TTML description+EIT starttime will be first described with reference to FIG. 23 and FIG. 24.

In the TMD=1 mode setting, the reception device 30 controls a display timing by use of the subtitle display time described in TTML and the record information in MH-Envent Information Table (EIT).

MH-Envent Information Table (EIT) is a table recording therein the structure information of the signaling message 96, or the information on title, broadcast time/date, contents to be broadcasted, and cast of a program as described above with reference to FIG. 14.

A specific structure of MH-EIT will be described in FIG. 23 by way of example.

Figure 23:
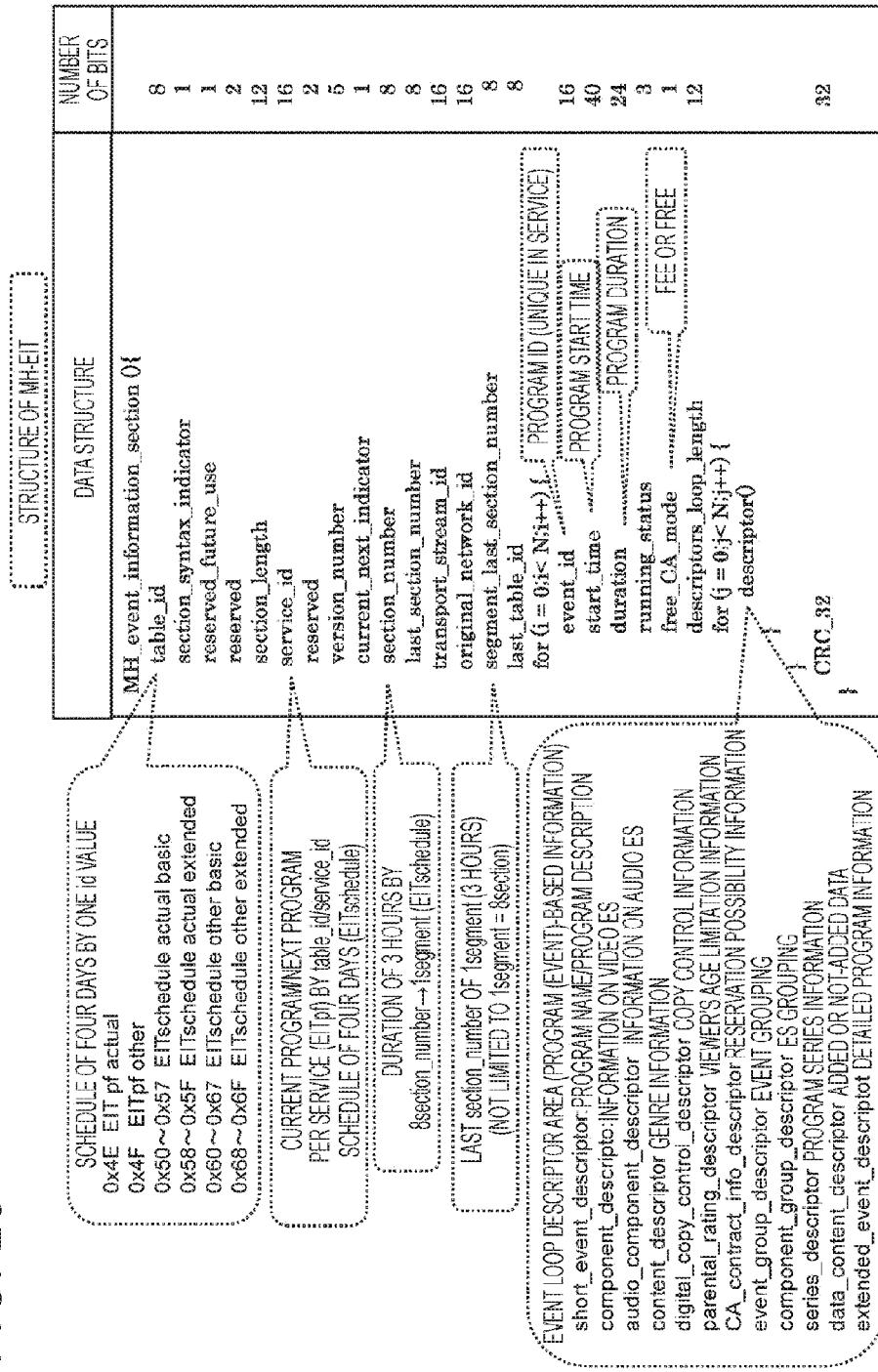
FIG. 23 is a diagram for explaining a structure of MH-Envent Information table (EIT).

As illustrated in FIG. 23, MH-EIT records the following data therein:
(a) Program ID (event_id)
(b) Program start time (start_time)
(c) Program duration (duration)

Such information is included, for example.

The reception device 30 determines a subtitle display timing of the TTML subtitle data by use of (b) program start time (start_time) recorded in MH-EIT.

The TTML subtitle data display timing control processing performed by the reception device 30 will be described with reference to FIG. 24.

Figure 24:
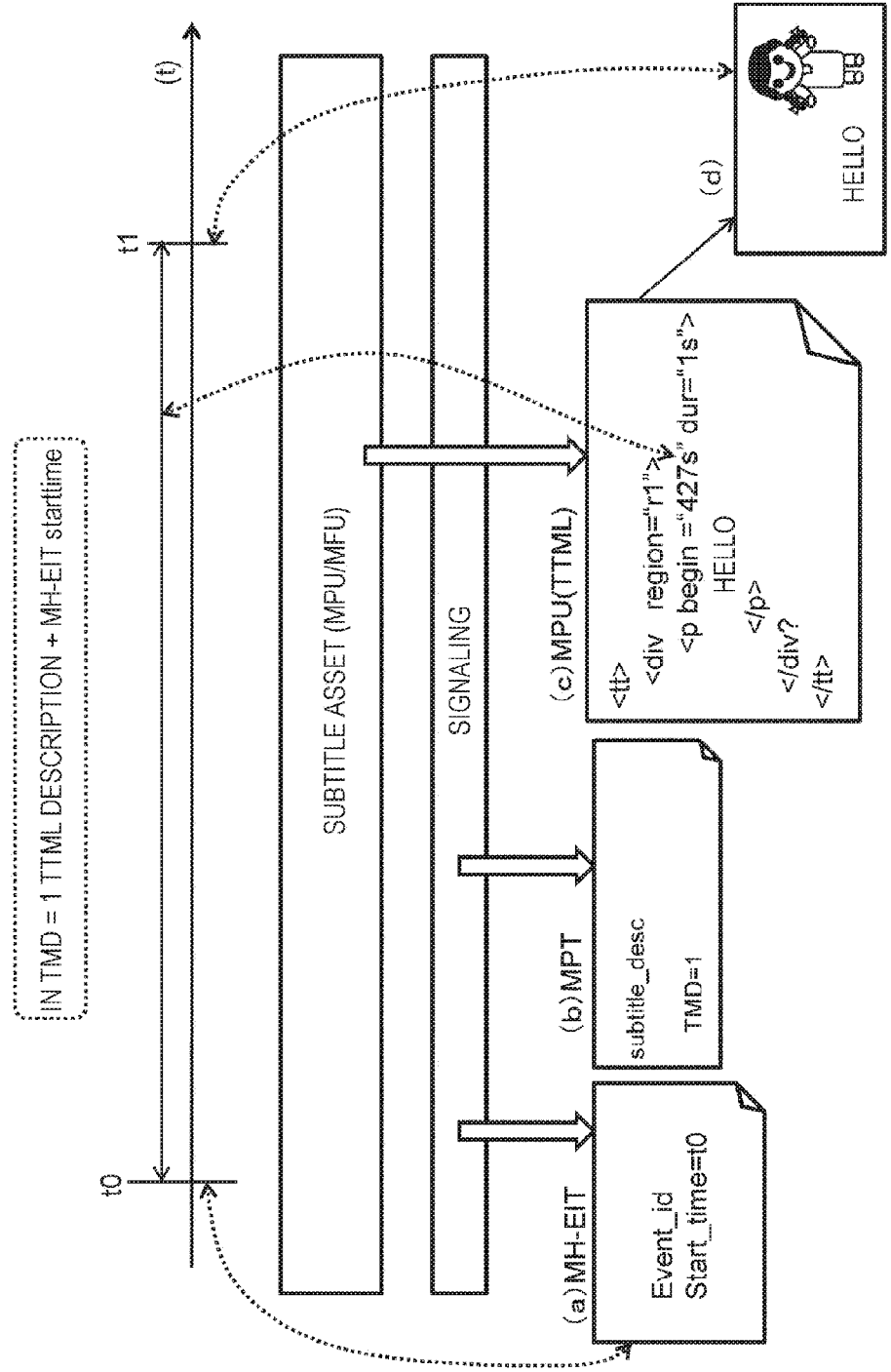
FIG. 24 is a diagram for explaining the processing while TMD=1: TTML description+EIT starttime mode is set.

FIG. 24 illustrates the following data:
(a) MH-EIT
(b) MPT
(c) TTML in MPU
(d) Exemplary video displayed with subtitles Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT and MH-EIT from the transmission channel of the signaling message, and obtains MPU including TTML subtitle data from the subtitle asset channel.

Further, a time axis (t) is illustrated at the uppermost part in FIG. 24.

The information of start_time=t0 is recorded as program start time information in (a) MH-EIT.

This information indicates an absolute time when the program is started.

The data of TMD=1 (=0001) is recorded as time mode in (b) MPT.

This is the setting of TMD=0001=TTML description+EIT start time as described above with reference to FIG. 18, and indicates that the setting is a content for performing the processing of determining a subtitle display timing according to the TTML description and the EIT start time description.

The data of <p begin="427 s" dur="1 s"> is present as subtitle display timing information in (c) TTML in MPU.

This is description data for displaying the subtitle data "HELLO" recorded in TTML for one second 427 seconds after the program start time.

Note that, the data of <div region="r1"> is information for designating a display region of the subtitles "HELLO."

At first, the reception device 30 confirms that TTML subtitle data display timing control applied to contents is in the setting of TMD=0001=TTML description+EIT starttime with reference to MPT.

That is, it confirms that the setting is a content for performing the processing of determining a subtitle display timing according to the TTML description and the EIT start time description.

The reception device 30 then refers to the subtitle display timing information recorded in both TTML and EIT.

The data of <p begin="427 s" dur="1 s"> is recorded as subtitle display timing information in TTML in MPU.

The information of start_time=t0 is recorded as program start time information in EIT.

The reception device 30 confirms the program start absolute time information of start_time=t0 recorded as program start time information in EIT, and counts 427 seconds recorded in the subtitle display timing information in TTML in MPU of <p begin="427 s" dur="1 s"> from the absolute time t0 on the basis of the clock held in the reception device 30.

When 427 seconds elapse (t1) from the program start time (t0), "HELLO" recorded in the TTML subtitle data is displayed.

The display result is the display data illustrated in (d) in FIG. 24.

[7-2. Processing while TMD=2: TTML Description+NPT Mode is Set]

Subtitle display control in the time mode (TMD) of TMD=2 or in the setting of 0002=TTML description+NPT will be described below with reference to FIG. 25 and FIG. 26.

In the TMD=2 mode setting, the reception device 30 controls a display timing by use of the subtitle display time described in TTML and the record information in NPT reference information [Normal Play Time (NPT)-reference/EMT].

NPT reference information [Normal Play Time (NPT)-reference/EMT] is the structure information of the signaling message 96, and has UTC (coordinated universal time) time information (st), normal play time (NPT) time information (nt), and correspondence data between the two items of time information. UTC is absolute time information.

Updated data of the NPT is sequentially transmitted from the transmission device 20 to the reception device 30.

A specific structure of NPT-reference/EMT is illustrated in FIG. 25 by way of example.

As illustrated in FIG. 25, the following data is recorded in NPT-reference/EMT:

(a) UTC time information (UTC_Reference)
(b) NPT time information (NPT_Reference)

For example, the information is included.

(a) UTC time information (UTC_Reference) is time information corresponding to absolute time, and is time information synchronized in both the transmission device and the reception device.

NPT is time information from the program start, and is time information which is stopped when the program is interrupted due to CM or the like, for example, and is counted as the program progresses.

That is, UTC time information (UTC_Reference) always progresses, but NPT time information (NPT_Reference) progresses only when the program progresses, and does not progresses during interruption due to CM or the like.

NPT-reference/EMT illustrated in FIG. 25 is sequentially updated in the transmission device 20, and is transmitted to the reception device 30.

(a) UTC time information (UTC_Reference) is updated to the data indicating the same elapse as the elapse of time, while (b) NPT time information (NPT_Reference) is time information which is not updated when the program is interrupted and indicates a time corresponding to the broadcasted program time.

For the program start time, the NPT time starts to be counted as (a) UTC time information (UTC_Reference)=t0 and (b) NPT time information (NPT_Reference)=0, and the subsequent time information equally increases.

Note that, the two items of time information are described in the 64-bit NTP format and expressed in 32 bits in seconds, but are assumed to be used with accuracy of about 16 bits in seconds in actual operation. In this case, the lower 16 bits are used with 0 substituted.

However, when a program interruption cause such as CM occurs after the program starts, the two items of time information are offset in their increase.

That is, the following is assumed:
(a) UTC time information (UTC_Reference)=u1
(b) NPT time information (NPT_Reference)=n1

The reception device 30 determines a subtitle display timing of the TTML subtitle data by use of correspondence information between two items of information recorded in the NPT:

(a) UTC time information (UTC_Reference)=u1
(b) NPT time information (NPT_Reference)=n1.

The TTML subtitle data display timing control processing performed by the reception device 30 will be described with reference to FIG. 26.

FIG. 26 illustrates the following data:
(a) MPT
(b) TTML in MPU
(c) NPT-reference/EMT
(d) Exemplary video displayed with subtitles The illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT and NPT-reference/EMT from the transmission channel of the signaling message, and obtains MPU including TTML subtitle data from the subtitle asset channel.

A time axis (t) for NPT and UTC is illustrated at the uppermost part in FIG. 23.

The data of TMD=2 (=0010) is recorded as time mode in (a) MPT.

This is the setting of TMD=0010=TTML description+NPT as described above with reference to FIG. 18, and indicates that the setting is a content for performing the processing of determining a subtitle display timing according to the TTML description and the NPT description.

The data of <p begin="276392t" dur="1 s"> is present as subtitle display timing information in (b) TTML in MPU.

Further, the data of <tt ttp: tickrate="65536"> is present.

<tt ttp: tickrate="65536"> indicates that a time is counted in units of 1/65536 seconds. This corresponds to a value expressed by the higher bits of the lower 16 bits substituted with 0 in the time expression in the NTP format. Thus, <p begin="276392t" dur="1 s"> indicates a subtitle display start time in the time expression that the higher bits are 276392 of the lower 16 bits substituted with 0 in the NTP format. That is, 276392 (decimal)=437A8 (hexadecimal) is established, and thus 0000000437A80000 (hexadecimal) is assumed in the NTP format.

A subtitle display timing is described as data in units of second (s) in TTML described with reference to FIG. 21, while it is described in the NTP format in the example illustrated in FIG. 26.

The description data is directed for displaying the subtitle data "HELLO" recorded in TTML for one second when 0000000437A80000 (hexadecimal) is reached from the program start time in the time expression in the NTP format.

Note that, the data of <div region="r1"> is information for designating a display region of the subtitles "HELLO."

Correspondence information between the two items of time information is recorded in (c) NPT-reference/EMT:
 (a) UTC time information (UTC_Reference)=ux
 (b) NPT time information (NPT_Reference)=nx Note that, NPT-reference/EMT is sequentially updated, and the reception device 30 uses the latest NPT-reference/EMT.

At first, the reception device 30 confirms that TTML subtitle data display timing control applied to contents is in the setting of TMD=0010=TTML description+NPT with reference to MPT.

That is, it confirms that the setting is a content for performing the processing of determining a subtitle display timing according to the TTML description and the NPT-reference/EMT description.

The reception device 30 then refers to the subtitle display timing information recorded in both TTML and the latest NPT-reference/EMT.

<p begin="276392t" dur="1 s"> is recorded as subtitle display timing information in TTML in MPU, and correspondence information between the two items of time information is recorded in NPT-reference/EMT:
 (a) UTC time information (UTC_Reference)=u1
 (b) NPT time information (NPT_Reference)=n1.

Note that, NPT is sequentially updated, and the reception device 30 uses the latest NPT-reference/EMT.

For example, NPT-reference/EMT, which is obtained immediately before the subtitle display time recorded in TTML, is obtained, and correspondence data between UTC and NPT is obtained.

For example, it is assumed that NPT reference information is obtained at the absolute time indicated in NTP of C84F3804230A0000 (hexadecimal).

Correspondence data between the two following items of time information is recorded in the obtained NPT reference information, for example:
 (a) UTC time information (UTC_Reference)= u1=C84F380314260000 (hexadecimal)
 (b) NPT time information (NPT_Reference)= n1=0000000122370000 (hexadecimal)

NPT time information (n1) is a value of the counted actual broadcast time of the program, and advances more slowly than UTC time information (s1) when CM is inserted, or the like.

The reception device 30 converts the subtitle time information recorded in the TTML subtitle data or <p begin="276392t" dur="1 s">, which is the NPT time value of 276392t as the subtitle display start time, into the absolute time ut1 on the basis of the correspondence data between the two items of time information.

That is, a difference in NPT in the latest NPT reference information is added to the absolute time in the NTP format thereby to calculate a corrected STC value as subtitle display timing.

For example, the latest NPT-reference/EMT is set as follows:
 (a) UTC time information (UTC_Reference)= u1=C84F380314260000 (hexadecimal)
 (b) NPT time information (NPT_Reference)= n1=0000000122370000 (hexadecimal)

In this setting, the subtitle display start time ut1=C84F380314260000+(0000000437A80000−0000000122370000)=C84F38062997 (hexadecimal) is assumed, and subtitle display is started when the clock based on the NTP of the reception device reaches the value.

The display result is the display data illustrated in (d) in FIG. 26.

[7-3. Processing while TMD=3: TTML Description+Absolute Time Mode is Set]

Subtitle display control in the time mode (TMD) of TMD=3 or in the setting of 0011=TTML description+absolute time will be described below with reference to FIG. 27.

In the TMD=3 mode setting, the reception device 30 controls a display timing by use of the subtitle display time described in TTML and the absolute time.

The absolute time is time information capable of being measured by the clock held in the reception device.

The TTML subtitle data display timing control processing performed by the reception device 30 will be described with reference to FIG. 27.

Figure 27:
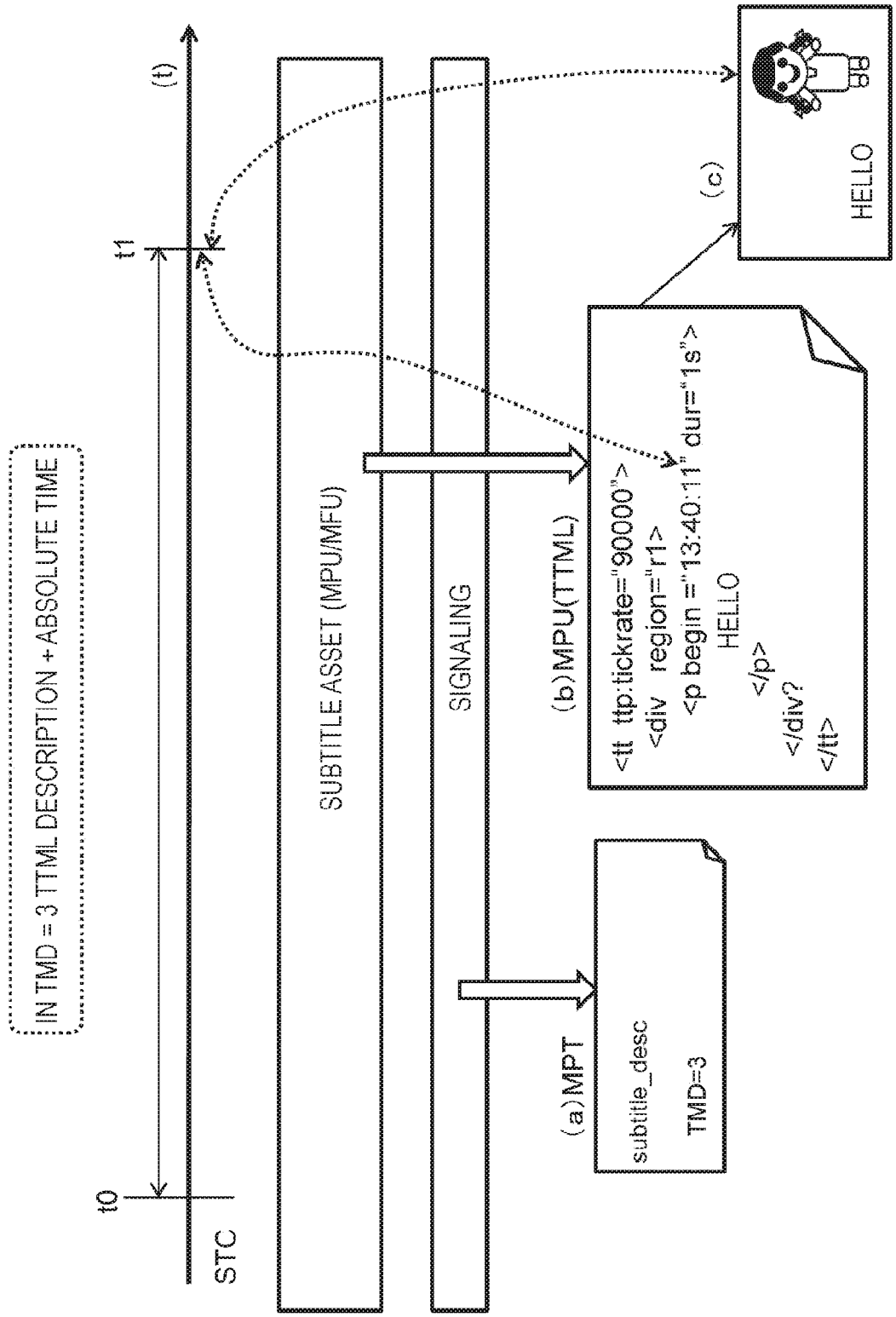
FIG. 27 is a diagram for explaining the processing while TMD=3: TTML description+absolute time mode is set.

FIG. 27 illustrates the following data:
 (a) MPT
 (b) TTML in MPU
 (c) Exemplary video displayed with subtitles Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

Further, a time axis (t) is illustrated at the uppermost part in FIG. 27.

The data of TMD=3 (=0011) is recorded as time mode in (a) MPT.

This is the setting of TMD=0011=TTML description+absolute time as described above with reference to FIG. 18, and indicates that the setting is a content for performing the processing of determining a subtitle display timing according to the TTML description and the absolute time.

The data of <p begin="13:40:11" dur="1 s"> is present as subtitle display timing information in (b) TTML in MPU.

This is description data for displaying the subtitle data "HELLO" recorded in TTML for one second at the absolute time=13:40:11.

Note that, the data <div region="r1"> is information for designating a display region of the subtitles "HELLO."

At first, the reception device 30 confirms that TTML subtitle data display timing control applied to contents is in the setting of TMD=0001=TTML description+absolute time with reference to MPT.

That is, it confirms that the setting is a content for performing the processing of determining a subtitle display timing according to the TTML description and the absolute time.

The reception device 30 then refers to the subtitle display timing information recorded in TTML.

The data of <p begin="13:40:11 s" dur="1 s"> is recorded as subtitle display timing information in TTML in MPU.

The reception device 30 calculates absolute time information according to the internal clock. Note that, the clock in the reception device is sequentially corrected by externally-received absolute time information, and the reception device 30 can obtain correct absolute time information.

The reception device 30 displays "HELLO" recorded in the TTML subtitle data at time point (t1) of the time 13:40:11 described in the TTML subtitle data.

The display result is the display data illustrated in (c) in FIG. 27.

[7-4a. Processing while TMD=4: TTML Description+Reference Starttime Mode is Set (First Example)]

Subtitle display control in the time mode (TMD) of TMD=4 or in the setting of 0100=TTML description+reference starttime will be described below with reference to FIG. 28.

In the TMD=4 mode setting, the reception device 30 controls a display timing by use of the subtitle display time described in TTML and the reference start time (reference starttime) as record information in MH-Envent Information Table (EIT).

MH-Envent Information Table (EIT) is structure information of the signaling message 96 and a table recording therein the information such as title, broadcast time/date, contents to be broadcasted, and cast of a program as described above with reference to FIG. 14.

According to the present exemplary embodiment, MH-Envent Information Table (EIT) records therein precice starttime indicating a program start time as higher-accuracy time information in units of ms, for example.

The reception device 30 measures a time according to the display time information recorded in MPU (TTML) with the high-accuracy time information=reference starttime in units of ms recorded in MH-EIT as the start point (t0).

The TTML subtitle data display timing control processing performed by the reception device 30 will be described with reference to FIG. 28.

Figure 28:
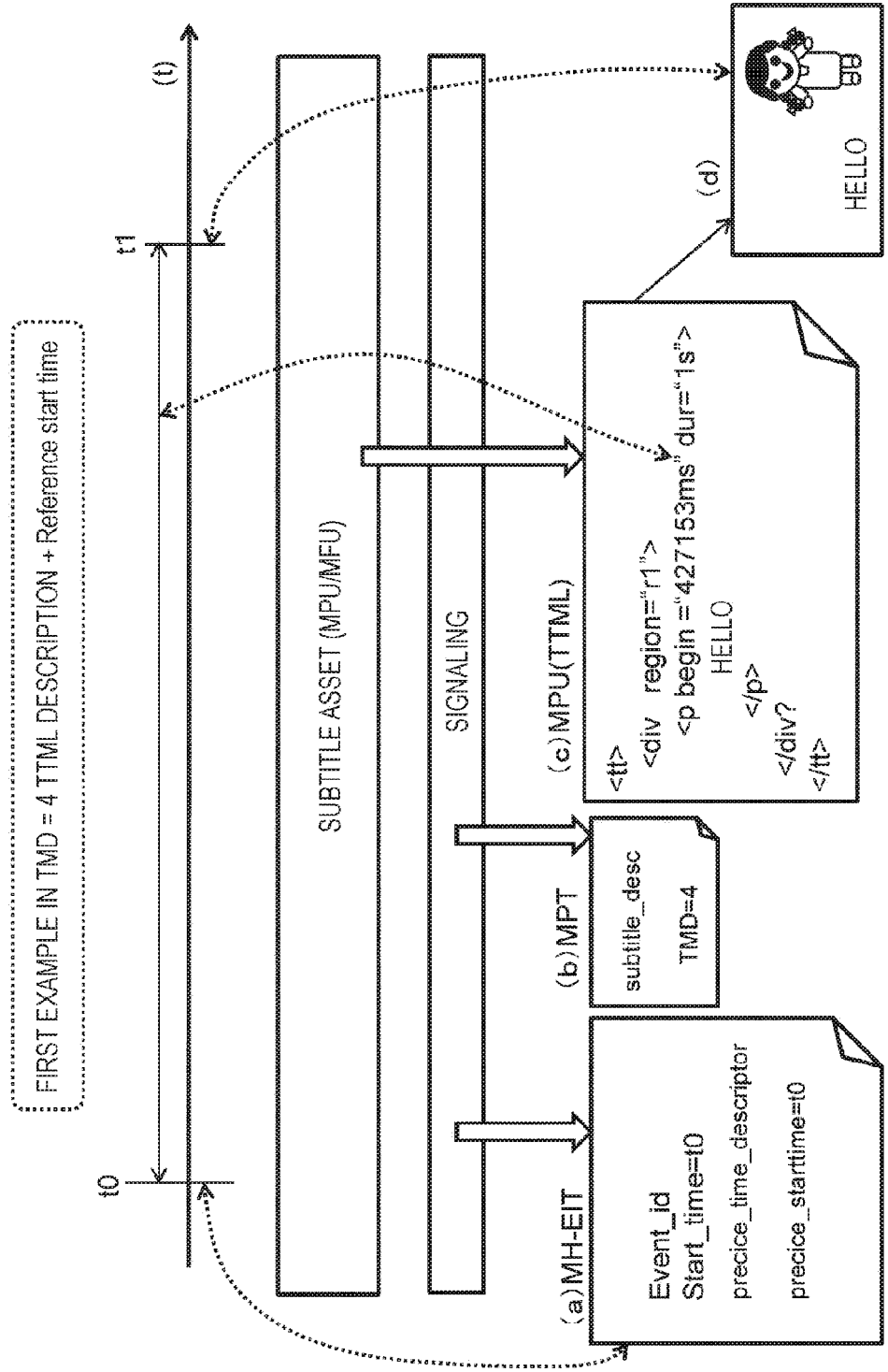
FIG. 28 is a diagram for explaining the processing while TMD=4: TTML description+reference starttime mode is set.

FIG. 28 illustrates the following data:
(a) MH-EIT
(b) MPT
(c) TTML in MPU
(d) Exemplary video displayed with subtitles Further, the illustrated subtitle asset (MPU/MFU) and signaling indicate MPU/MFU stored in the MMT packet transmitted from the transmission device 20 to the reception device 30, and each channel of the signaling message, respectively.

The reception device 30 obtains MPT and MH-EIT from the transmission channel of the signaling message, and obtains MPU including TTML subtitle data from the subtitle asset channel.

A time axis (t) is illustrated at the uppermost part in FIG. 28.

The information of start_time=t0 and precice_starttime=t0 is recorded as program start time information in (a) MH-EIT.

This information indicates an absolute time when the program is started.

In this example, precice starttime is recorded as high-accuracy time information in units of ms, for example.

The data of TMD=4 (=0100) is recorded as time mode in (b) MPT.

This is the setting of TMD=0100=TTML description+reference starttime as described above with reference to FIG. 18, and indicates that the setting is a content for performing the processing of determining a subtitle display timing according to the TTML description and the high-accuracy precice starttime description in EIT.

The data of <p begin="427153 ms" dur="1 s"> is present as subtitle display timing information in (c) TTML in MPU.

This is description data for displaying the subtitle data "HELLO" recorded in TTML for one second 427153 milliseconds (ms) after the program start time.

Note that, the data of <div region="r1"> is information for designating a display region of the subtitles "HELLO."

At first, the reception device 30 confirms that TTML subtitle data display timing control applied to contents is in the setting of TMD=0001=TTML description+reference starttime with reference to MPT.

That is, it confirms that the setting is a content for performing the processing of determining a subtitle display timing according to the TTML description and the start time description (precice starttime) in EIT.

The reception device 30 then refers to the subtitle display timing information recorded in both TTML and EIT.

The data of <p begin="427153 ms" dur="1 s"> is recorded as subtitle display timing information in TTML in MPU.

This is high-accuracy time information in units of ms.

The information of precice starttime=t0 is recorded as program start time information in EIT.

This is also high-accuracy time information in units of ms.

The reception device 30 confirms the program start absolute time information of precice starttime=t0 (ms) recorded as program start time information in EIT, and counts 427153 milliseconds (ms) recorded in the information of <p begin="427153 s" dur="1 s">, which is TTML subtitle display timing information in MPU, from the absolute time t0 (ms) on the basis of the clock count of the system clock held in the reception device 30.

At time point (t1) when 427153 milliseconds elapse after the program start time (t0), "HELLO" recorded in the TTML subtitle data is displayed.

The display result is the display data illustrated in (d) in FIG. 28.

In this example, MH-EIT is used as in the example of TMD=1 described above with reference to FIG. 24, but with the TMD=4 structure, both MH-EHT time information and TTML time information are high-accuracy time information in units of millisecond (ms), which enables subtitle display control with higher accuracy

[7-4b. Processing while TMD=4: TTML Description+Reference Starttime Mode is Set (Second Example)]

Another example (second example) of subtitle display control in the time mode (TMD) of TMD=4 or in the setting of 0100=TTML description+reference starttime will be described below with reference to FIG. 29.

In the TMD=4 mode setting (second example), reference starttime is recorded in MPT thereby to control a display timing according to MPT and TTML description without the use of MH-Envent Information Table (EIT).

In this example, precice starttime is recorded as high-accuracy time information in units of ms, for example, in MPT.

The reception device 30 measures a time according the display time information recorded in MPU (TTML) with high-accuracy time information=reference starttime in units of ms recorded in MPT as the start point (t0).

The TTML subtitle data display timing control processing performed by the reception device 30 will be described with reference to FIG. 29.

Figure 29:
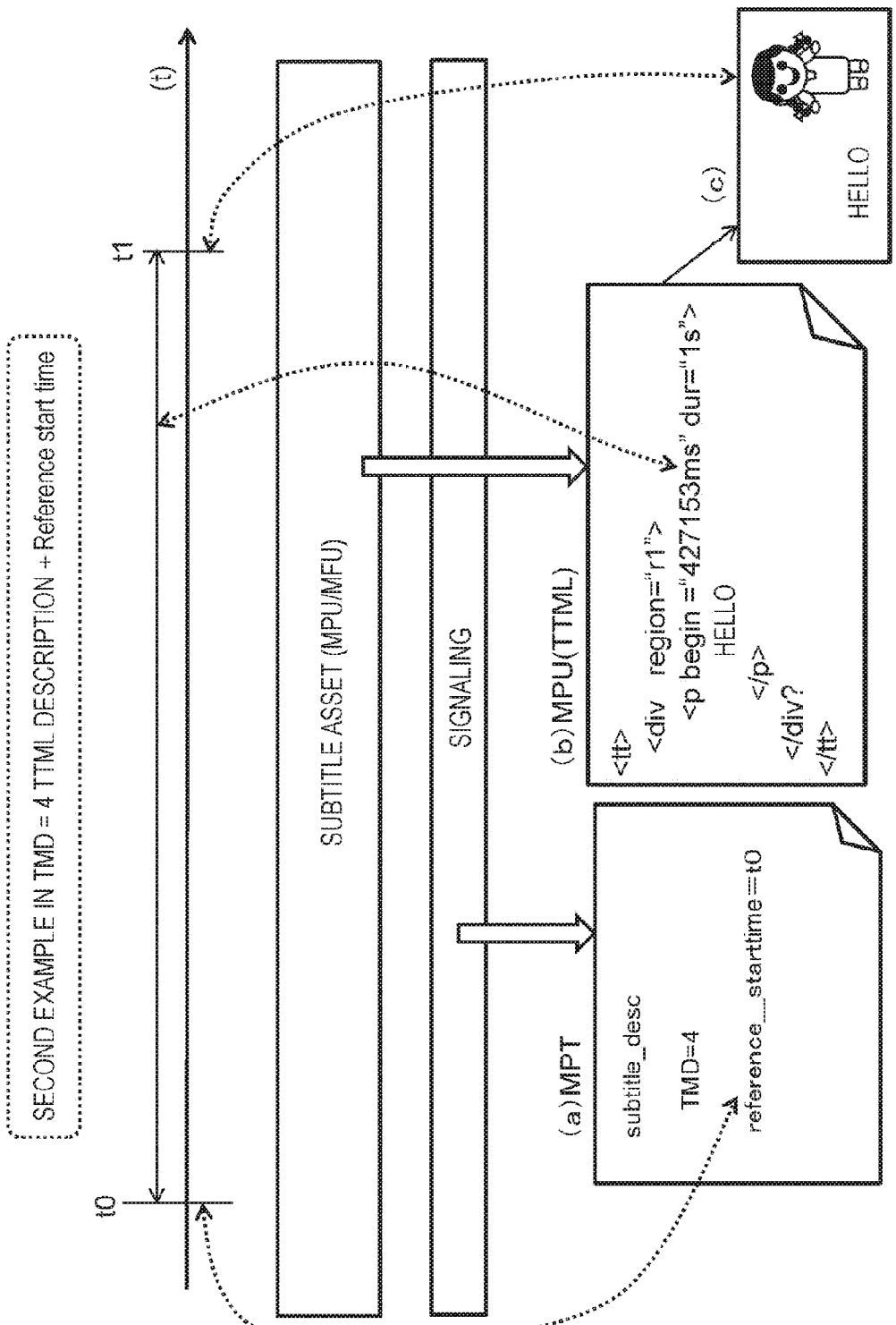
FIG. 29 is a diagram for explaining the processing while TMD=4: TTML description+reference starttime mode is set.

FIG. 29 illustrates the following data:
(a) MPT
(b) TTML in MPU
(c) Exemplary video displayed with subtitles The illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

A time axis (t) is illustrated at the uppermost part in FIG. 29.

The data of TMD=4 (=0100) is recorded as time mode in (a) MPT.

This is the setting of TMD=0100=TTML description+reference starttime as described above with reference to FIG. 18, and indicates that the setting is a content for performing the processing of determining a subtitle display timing according to the TTML description and the high-accuracy precice starttime description in EIT.

Further, the information of precice starttime=t0 is recorded as program start time information in MPT.

This information indicates an absolute time when the program is started.

In this example, precice starttime is recorded as high-accuracy time information in units of ms, for example.

The data of <p begin="427153 ms" dur="1 s"> is present as subtitle display timing information in TTML in (b) MPU.

This is description data for displaying the subtitle data "HELLO" recorded in TTML for one second 427153 milliseconds (ms) after the program start time.

Note that, the data of <div region="r1"> is information for designating a display region of the subtitles "HELLO."

At first, the reception device 30 confirms that TTML subtitle data display timing control applied to contents is in the setting of TMD=0001=TTML description+reference starttime with reference to MPT.

That is, it confirms that the setting is a content for performing the processing of determining a subtitle display timing according to the TTML description and the start time description (precice starttime) in MPT.

The reception device 30 then refers to the subtitle display timing information recorded in both TTML and MPT.

The data of <p begin="427153 ms" dur="1 s"> is recorded as subtitle display timing information in TTML in MPU.

This is high-accuracy time information in units of ms.

The information of precice starttime=t0 is recorded as program start time information in MPT.

This is also high-accuracy time information in units of ms.

The reception device 30 confirms the program start absolute time information of precice starttime=t0 (ms) recorded as program start time information in MPT, and counts 427153 milliseconds (ms) recorded in the subtitle display timing information of <p begin="427153 s" dur="1 s"> in TTML in MPU from the absolute time t0 (ms) on the basis of the clock count of the system clock held in the reception device 30.

"HELLO" recorded in the TTML subtitle data is displayed at time point (t1) when 427153 milliseconds elapse after the program start time (t0).

The display result is the display data illustrated in (c) in FIG. 29.

Also in this example, similarly as in the case of TMD=4 (first example) described above with reference to FIG. 28, both time information in MPT and time information in TTML are high-accuracy time information in units of millisecond (ms), which enables subtitle display control with higher accuracy.

[7-5. Processing while TMD=5: TTML Description+MPU Timestamp Mode is Set]

Exemplary subtitle display control in the time mode (TMD) of TMD=5 or in the setting of 0100=TTML description+MPU timestamp will be described below with reference to FIG. 30 and FIG. 31.

In the TMD=5 mode setting, a display timing is controlled according to the MPU timestamp and the TTML description by use of the MPU timestamp recorded in MPT.

A timestamp corresponding to an asset (subtitle data in this example) processing start time set as one item of data of the asset control information in MPU can be recorded in MPT.

The timestamp is recorded as high-accuracy time information in units of ms, for example.

FIG. 30 illustrates a data structure of a MPU timestamp descriptor recorded in MPT.

As illustrated, MPU sequence number indicating MPU to which the timestamp is applied, and MPU-related timestamp (MPU_presentation_timestamp) as MPU-related time information corresponding to the sequence number are recorded in the MPU timestamp descriptor recorded in MPT.

The timestamp is high-accuracy time information in units of ms, for example.

The reception device 30 measures a time according to the display time information recorded in MPU (TTML) with the high-accuracy timestamp (MPU_presentation_timestamp) in units of ms recorded in MPT as the start point (t0).

The TTML subtitle data display timing control processing performed by the reception device 30 will be described with reference to FIG. 31.

Figure 31:
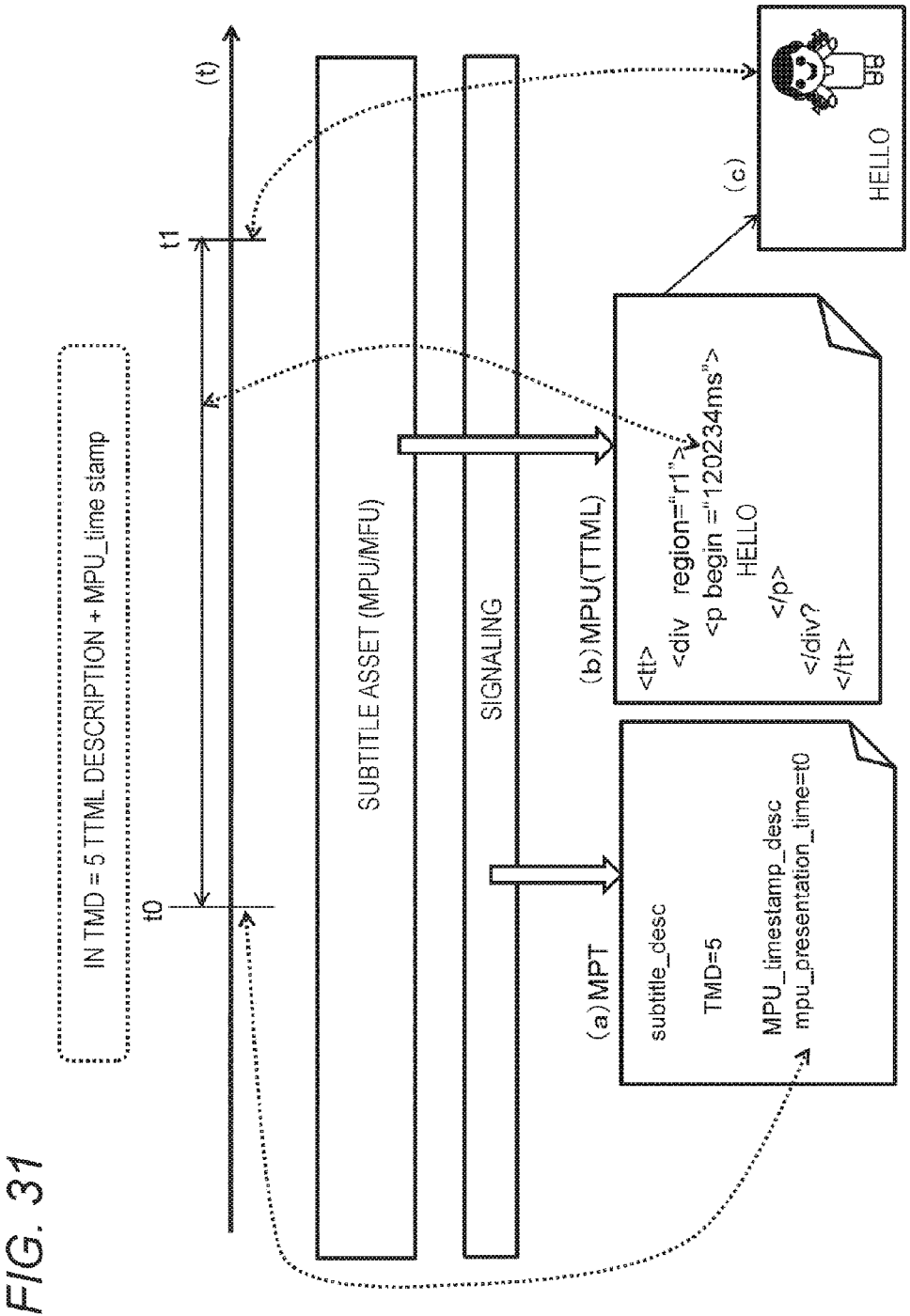
FIG. 31 is a diagram for explaining the processing while TMD=5: TTML description+MPU_time stamp mode is set.

FIG. 31 illustrates the following data:
(a) MPT
(b) TTML in MPU
(c) Exemplary video displayed with subtitles Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

Further, a time axis (t) is illustrated at the uppermost part in FIG. 31.

The data of TMD=5 (=0101) is recorded as time mode in (a) MPT.

This is the setting of TMD=0101=TTML description+MPU timestamp as described above with reference to FIG. 18, and the setting indicates a content for performing the processing of determining a subtitle display timing according to the TTML description and the MPU timestamp recorded in MPT.

As illustrated in (a) MPT in FIG. 31, the information of mpu_presentation_timestamp=t0 is recorded as MPU-related timestamp in MPT.

This is time information on a MPU processing time or the like set for MPU corresponding to TTML to be processed.

The timestamp is recorded as high-accuracy time information in units of ms, for example.

The data of <p begin="120234 ms"> is present as subtitle display timing information in (b) TTML in MPU.

This is description data for displaying the subtitle data "HELLO" recorded in TTML 120243 milliseconds (ms) after the start time (t0) designated by the timestamp.

Note that, the data of <div region="r1"> is information for designating a display region of the subtitles "HELLO."

At first, the reception device 30 confirms that TTML subtitle data display timing control applied to contents is in the setting of TMD=0101=TTML description+MPU timestamp with reference to MPT.

That is, it confirms that the setting is a content for performing the processing of determining a subtitle display timing according to the TTML description and the MPU timestamp recorded in MPT.

The reception device 30 then refers to the subtitle display timing information recorded in both TTML and MPT.

The data of <p begin="120234 ms"> is recorded as subtitle display timing information in TTML in MPU.

This is high-accuracy time information in units of ms.

The information of MPU timestamp (mpu_presentation_timestamp)=t0 is recorded as start time information in MPT.

This is also high-accuracy time information in units of ms.

The reception device 30 confirms the start time information of MPU timestamp=t0 (ms) recorded as start time information in MPT, and counts 120234 milliseconds (ms) recorded in the TTML subtitle display timing information of <p begin="120234 s"> in MPU from the time t0 (ms) on the basis of the clock count of the system clock held in the reception device 30.

"HELLO" recorded in the TTML subtitle data is displayed at time point (t1) when 120234 milliseconds elapse from the start time (t0).

The display result is the display data illustrated in (c) in FIG. 31.

Also in this example, similarly as in the case of TMD=4 described with reference to FIG. 28 and FIG. 29, both time information in MPT and time information in TTML are high-accuracy time information in units of millisecond (ms), which enables subtitle display control with higher accuracy.

[7-6. Processing while TMD=8: MPU Timestamp Mode is Set]

Exemplary subtitle display control in the time mode (TMD) of TMD=8 or in the setting of 1000=MPU timestamp will be described below with reference to FIG. 32.

In the TMD=6 mode setting, a display timing is controlled according to the MPU timestamp by use of only the MPU timestamp recorded in MPT.

As described above with reference to FIG. 30, a timestamp corresponding to the asset (subtitle data in this example) processing start time set as one item of the asset control information in MPU can be recorded in MPT.

The timestamp is recorded as high-accuracy time information in units of ms.

The reception device 30 displays the subtitle data recorded in TTML by use of the high-accuracy timestamp (MPU_presentation_timestamp) in units of ms recorded in MPT as TTML subtitle data display timing.

The TTML subtitle data display timing control processing performed by the reception device 30 will be described with reference to FIG. 32.

Figure 32:
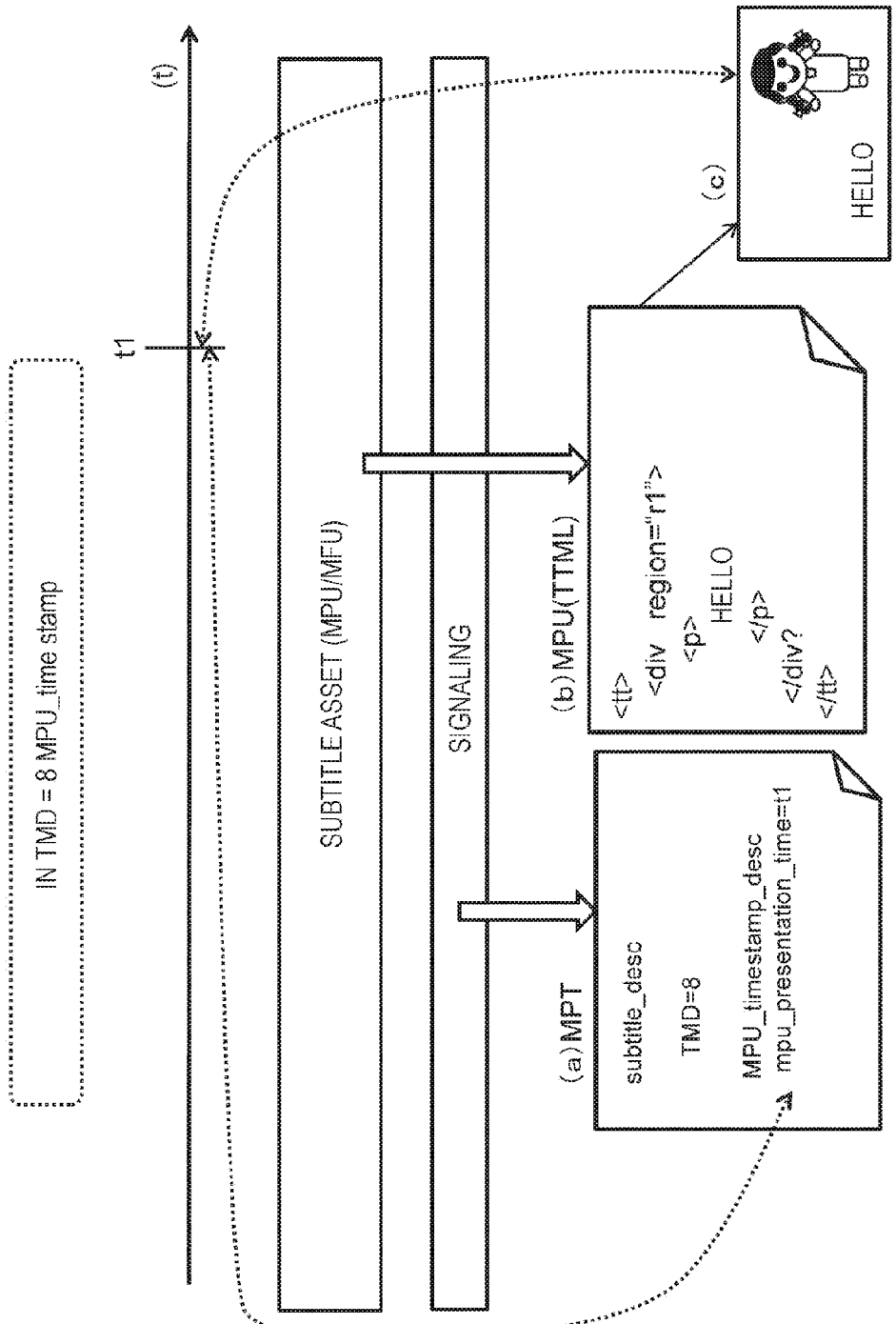
FIG. 32 is a diagram for explaining the processing while TMD=8: MPU_time stamp mode is set.

FIG. 32 illustrates the following data:

(a) MPT
(b) TTML in MPU
(c) Exemplary video displayed with subtitles

Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

A time axis (t) is illustrated at the uppermost part in FIG. 32.

The data of TMD=8 (=1000) is recorded as time mode in (a) MPT.

This is the setting of TMD=1000=MPU timestamp as described above with reference to FIG. 18, and the setting indicates a content for performing the processing of determining a subtitle display timing according to the MPU timestamp recorded in MPT.

As illustrated in (a) MPT in FIG. 32, the information of mpu_presentation_timestamp=t0 is recorded as MPU-related timestamp in MPT.

This is time information on a MPU processing time or the like set for MPU corresponding to TTML to be processed.

The timestamp is recorded as high-accuracy time information in units of ms, for example.

The subtitle display timing information is not recorded in (b) TTML in MPU.

In the TMD=8 mode, the subtitle data display processing using the time (t1) designated by the timestamp recorded in MPT as the display time of the subtitle data "HELLO" recorded in TTML is performed.

Note that, the data of <div region="r1"> recorded in the TTML subtitle data is information for designating a display region of the subtitles "HELLO."

At first, the reception device 30 confirms that TTML subtitle data display timing control applied to contents is in the setting of TMD=1000=MPU timestamp with reference to MPT.

That is, it confirms that the setting is a content for performing the processing of determining a subtitle display timing according to the MPU timestamp recorded in MPT.

The reception device 30 then refers to the subtitle display timing information recorded in MPT.

The information of MPU timestamp (mpu_presentation_timestamp)=t1 is recorded as subtitle display time information in MPT.

This is high-accuracy time information in units of ms.

The reception device 30 confirms the time information of MPU timestamp=t1 (ms) recorded in MPT, and displays "HELLO" recorded in the TTML subtitle data at time t1 (ms).

This display result is the display data illustrated in (c) in FIG. 32.

Also in this example, time information (timestamp) in MPT is high-accuracy time information in units of millisecond (ms), which enables subtitle display control with higher accuracy.

[7-7. Processing while TMD=15: No Time Control Mode is Set]

Subtitle Display Control in the Time Mode (TMD) of TMD=15 or in the setting of 1111=no time control will be described below with reference to FIG. 33.

In the TMD=15 mode setting, the reception device 30 displays subtitles without time control. For example, display is rapidly performed after MPU storing TTML subtitle data therein is received. For example, the setting is applied to display live translated subtitle data or to display braking news.

The TTML subtitle data display timing control processing performed by the reception device 30 will be described with reference to FIG. 33.

Figure 33:
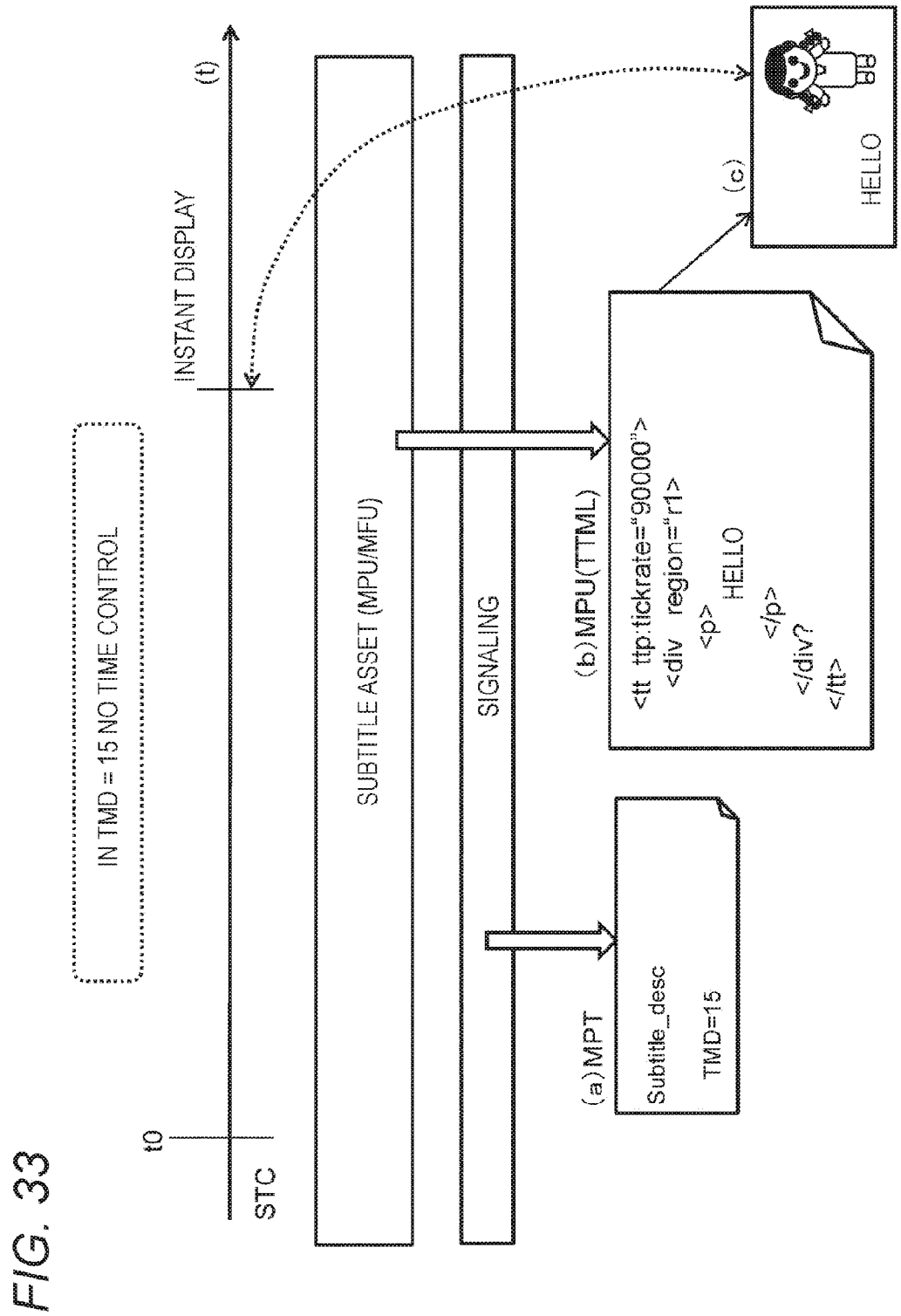
FIG. 33 is a diagram for explaining the processing while TMD=15: no time control mode is set.

FIG. 33 illustrates the following data:
(a) MPT
(b) TTML in MPU
(c) Exemplary video displayed with subtitles Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

Further, a time axis (t) is illustrated at the uppermost part in FIG. 33.

The data of TMD=15 (=1111) is recorded as time mode in (a) MPT.

This is the setting of TMD=1111=no time control as described above with reference to FIG. 18, and indicates that the setting is a content having no subtitle display timing control information.

A description of subtitle display timing information is not included in (b) TTML in MPU.

Note that, the data of <div region="r1"> is information for designating a display region of the subtitles "HELLO."

At first, the reception device 30 confirms that TTML subtitle data display timing control applied to contents is in the setting of TMD=1111=no time control with reference to MPT.

That is, it confirms that the setting is a content having no subtitle display timing control.

The reception device 30 then refers to the subtitle display timing information recorded in TTML.

Subtitle display timing information is not recorded in TTML in MPU.

When receiving MPU including TTML subtitle data, the reception device 30 instantly displays "HELLO" recorded in the TTML subtitle data.

This display result is the display data illustrated in (c) in FIG. 33. This is subtitle display of simultaneous interpretation, for example.

[8. Specific Processing in Each of Operation Modes (OPM)]

Specific processing in each of the operation modes (OPM) as one of subtitle information descriptors (subtitle descriptors) recorded in MPT will be described below.

As described with reference to FIG. 20, the operation modes (OPM) are operation mode definition information applied to subtitle display control. As illustrated in FIG. 20, the following modes can be set for the operation mods (OPM):
00=Live mode
01=Segmentation mode
10=Program mode 00=Live mode is a mode of instantly displaying received TTML subtitle data on reception. For example, the mode is used for displaying subtitle data of simultaneous interpretation, for example.

01=Segmentation mode is a mode applied to contents for which subtitle data is previously prepared, such as movie contents, and is a mode of displaying according to a display timing defined in MPT and TTML subtitle data control information.

10=Program mode is a mode in which a TTML file recording all the subtitles of one program is prepared and is transmitted from the transmission device to the reception device and the reception device performs subtitle display of the program by use of the TTML file.

Specific examples of subtitle display control in the reception device corresponding to the three operation modes will be described below.

[8-1. Processing while OPM=0 Live Mode is Set]

At first, subtitle display control in the operation mode (OPM) of OPM=0 or in the setting of OPM=00=Live mode will be described with reference to FIG. 34.

In the OPM=0 mode setting, the reception device 30 instantly displays received TTML subtitle data on reception. For example, the mode is used for displaying subtitle data of simultaneous interpretation, for example.

Figure 34:
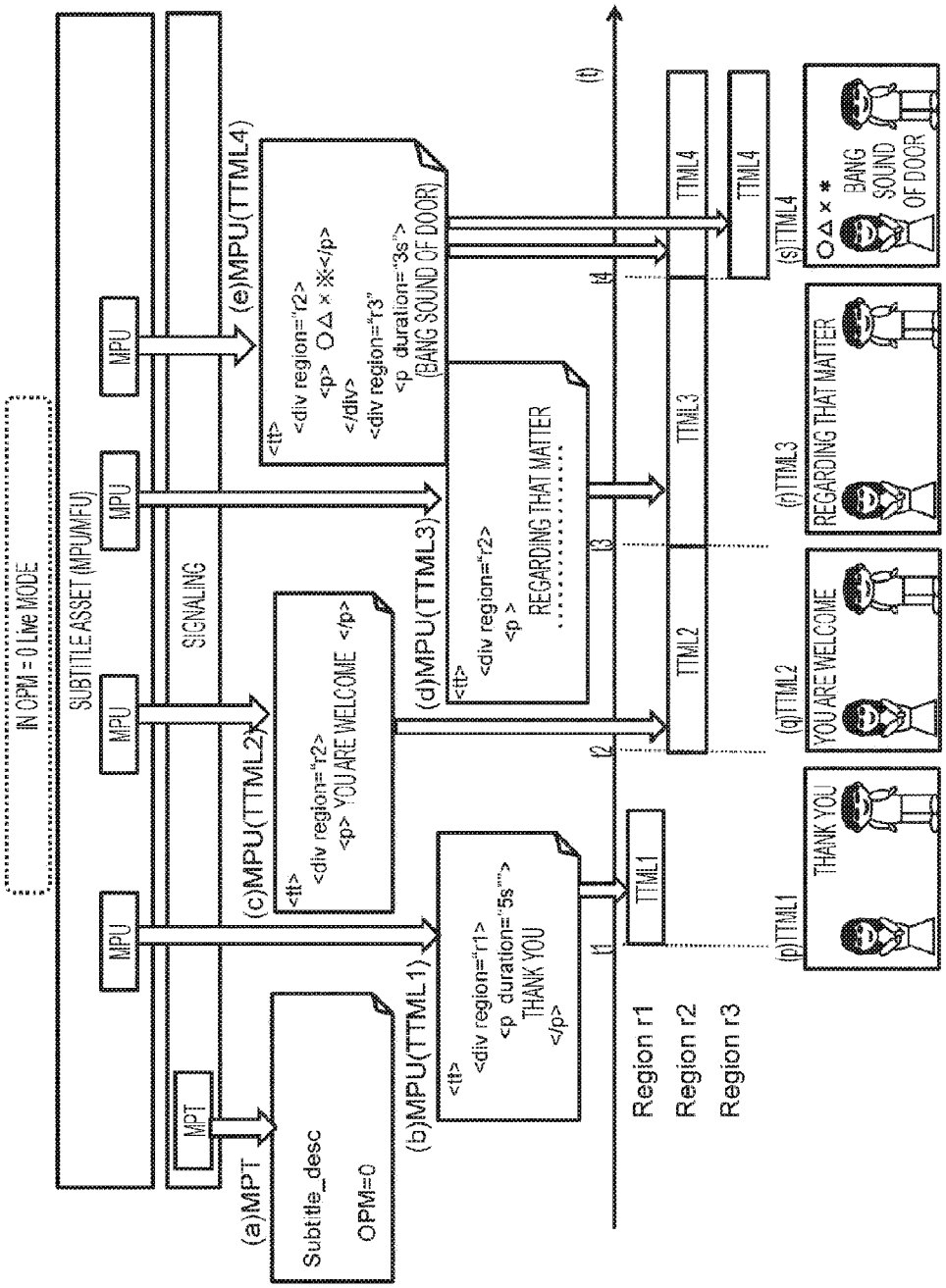
FIG. 34 is a diagram for explaining the processing while OPM=0: Live mode is set.

FIG. 34 illustrates the following data:
(a) MPT
(b) to (e) MPU storing TTML subtitle data Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

Further, a time axis (t) as well as TTML subtitle data and exemplary subtitle display applied over time is illustrated at the lower part in FIG. 34.

The data of OPM=0 (=00) is recorded in (a) MPT.

This is the setting of OPM=00=Live mode as described above with reference to FIG. 20, and indicates that the setting is a mode of instantly displaying received TTML subtitle data on reception.

TTML in each of (b) to (e) MPU does not include a description of subtitle display timing information.

Note that, the following data is information for designating a subtitle display region included in each item of TTML subtitle data:
<div region="r1">
<div region="r2">
<div region="r3">
r1, r2, and r3 are information for designating a different region.

At first, the reception device 30 confirms an operation mode with reference to MPT.

It confirms that the setting is OPM=00=Live mode.

That is, it confirms that the setting is a mode of instantly displaying TTML subtitle data on reception.

Then, the reception device 30 sequentially receives MPU storing TTML subtitle data therein.

The reception device 30 extracts TTML subtitle data from the received MPU, and displays the subtitle data according to the display control information (only designated display region) recorded in the TTML subtitle data.

The display processing result is four videos illustrated at the lower part in FIG. 34.

At first, the reception device receives (b) MPU (TTML1), and performs subtitle display according to TTML1 stored in MPU.

The video (p) is a subtitle-superposed video displayed according to TTML1 stored in (b) MPU (TTML1).

The subtitle data "THANK YOU" stored in TTML1 is displayed in the designated region (r1) in the region designation information recorded in TTML1. The display timing is time (t1). The time (t1) is the shortest timing when display is enabled after the reception device 30 receives MPU storing TTML1 therein and performs the necessary processing.

The reception device receives (c) MPU (TTML2), and performs subtitle display according to TTML2 stored in MPU.

The video (q) is a subtitle-superposed video displayed according to TTML2 stored in (c) MPU (TTML2).

The subtitle data "YOU ARE WELCOME" stored in TTML2 is displayed in the designated region (r2) in the region designation information recorded in TTML2. The display timing is time (t2). The time (t2) is the shortest timing when display is enabled after the reception device 30 receives MPU storing TTML2 therein and performs the necessary processing.

The reception device then receives (d) MPU (TTML3), and performs subtitle display according to TTML3 stored in MPU.

The video (r) is a subtitle-superposed video displayed according to TTML3 stored in (d) MPU (TTML3).

The subtitle data "REGARDING THAT MATTER" stored in TTML3 is displayed in the designated region (r2) in the region designation information recorded in TTML3. The display timing is time (t3). The time (t3) is the shortest timing when display is enabled after the reception device 30 receives MPU storing TTML3 therein and performs the necessary processing.

The reception device then receives (e) MPU (TTML4), and performs subtitle display according to TTML4 stored in MPU.

The video (s) is a subtitle-superposed video displayed according to TTML4 stored in (e) MPU (TTML4).

The subtitle data "○ΔX* . . . " stored in TTML4 is displayed in the designated region (r2) in the region designation information recorded in TTML4.

Further, another item of subtitle data "(BANG SOUND OF DOOR)" stored in TTML4 is displayed in the designated region (r3) in the region designation information recorded in TTML4. Herein, the designated region r2 in TTML2, TTML3, and TTML4 indicates the same region. Though not illustrated in this example, when a so-called roll-up mode is designated, it is assumed that the latter half of a character string designated in the designated region r2 in TTML2 is left and added with the character string designated in the designated region r2 in TTML3 to be displayed also in TTML3. In the assumed case, each TTML cannot be independently processed in the Live mode.

As described above, when the Live mode of the operation mode (OPM)=0 is set, the reception device 30 instantly displays the subtitles of the TTML subtitle data stored in the received MPU.

With the processing, it is possible to display translated sentences in conversation in live broadcast without any delay. Further, in the operation mode, a dependence on previous TTML subtitle data can be caused.

[8-2. Processing while OPM=1: Segmentation Mode is Set]

Subtitle display control in the operation mode (OPM) of OPM=1 or in the setting of OPM=01=Segmentation mode will be described below with reference to FIG. 35.

The OPM=1 mode setting is a mode applied to contents for which subtitle data is previously prepared, such movie contents, and in this mode, the reception device 30 displays according to a display timing defined in MPT and the TTML subtitle data control information.

Figure 35:
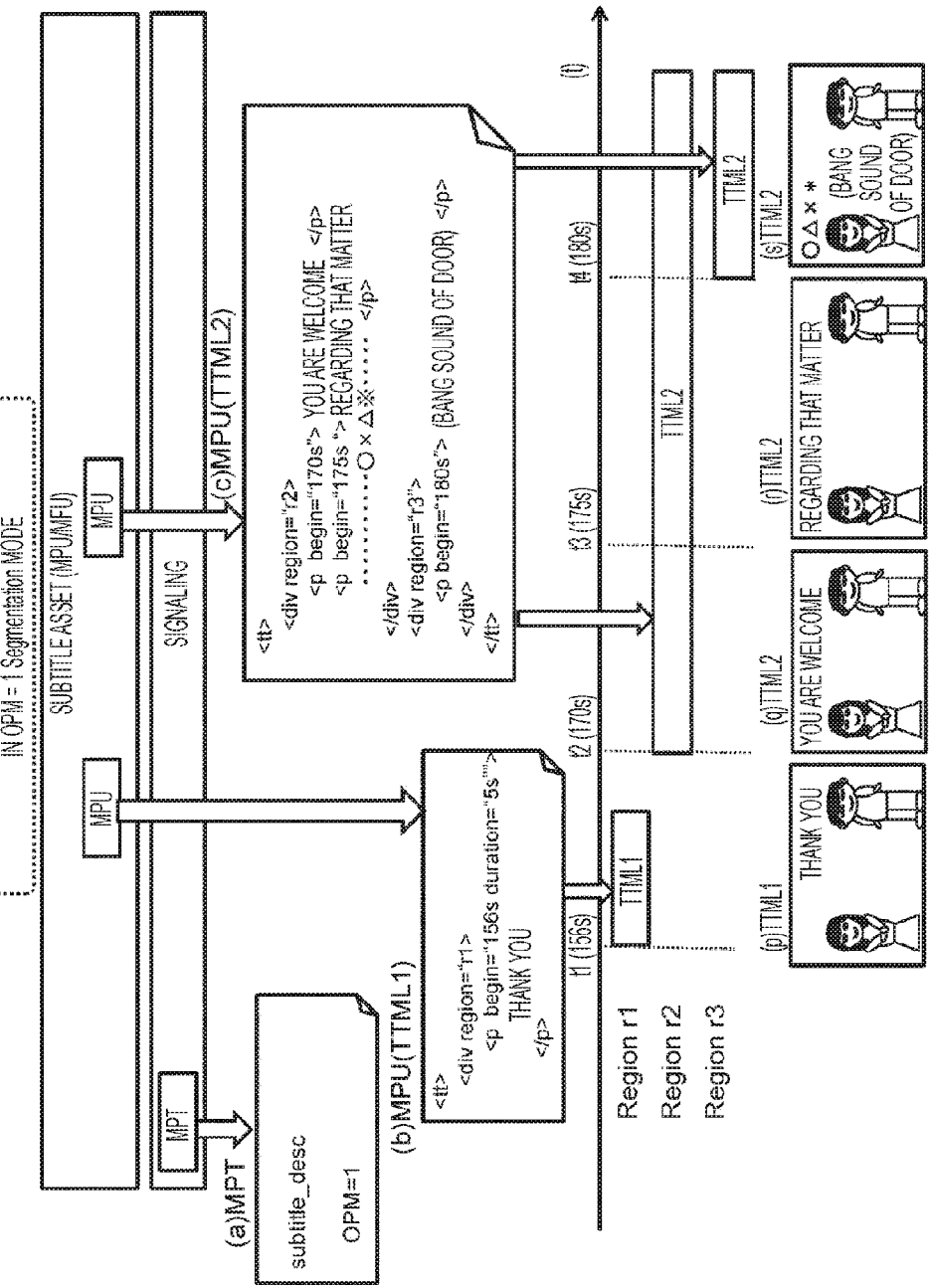
FIG. 35 is a diagram for explaining the processing while OPM=1: Segmentation mode is set.

FIG. 35 illustrates the following data:
(a) MPT
(b) to (c) MPU storing TTML subtitle data therein Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU including TTML subtitle data from the subtitle asset channel.

Further, a time axis (t) as well as TTML subtitle data and exemplary subtitle display is illustrated at the lower part in FIG. 35.

The data of OPM=1 (=01) is recorded in (a) MPT.

This is the setting of OPM=01=segmentation mode as described above with reference to FIG. 20, and indicates that the setting is a mode of displaying received TTML subtitle data according to a display timing defined in MPT and TTML subtitle data control information.

A description of subtitle display timing information is included in TTML in each of (b) to (c) MPU.

The subtitle display timing information of <p begin="156 s" duration="5 s"> is recorded in (b) MPU (TTML1).

The subtitle display timing information of <p begin="170 s"> is recorded in (c) MPU (TTML2) in association with the subtitles "YOU ARE WELCOME."

Further, the subtitle display timing information of <p begin="175 s"> is recorded in association with the subtitles "REGARDING THAT MATTER" . . . "○ΔX* . . . "

Both of the items of data are recorded as subtitle data display timing information corresponding to the display region (r2).

Further, the subtitle display timing information of <p begin="180 s"> is recorded in (c) MPU (TTML2) in association with the subtitles "BANG SOUND OF DOOR."

This is recorded as subtitle data display timing information corresponding to the display region (r3).

Note that, display duration information (duration) is not described in (c) MPU (TTML2). This is the setting for automatically erasing previous subtitle display for displaying subsequent subtitle data.

The following data is information for designating a subtitle display region included in each item of TTML subtitle data:
<div region="r1">
<div region="r2">
<div region="r3">
r1, r2, and r3 are information for designating a different region.

Note that, when the subtitle data designated in the TTML subtitle data cannot be displayed in one designated region, the subtitles to be displayed are sequentially switched and displayed over time. Alternatively, roll-up display or subtitle display in several lines is performed so that new subtitles are sequentially displayed in the lower line and the old subtitles in the upper line are sequentially erased along with new subtitle display.

The processing of the reception device 30 in OPM=1 illustrated in FIG. 35 will be described.

At first, the reception device 30 confirms an operation mode with reference to MPT.

It confirms that the setting of OPM=01=Segmentation mode is made.

That is, it confirms that the setting is a mode of displaying subtitles according to a display timing defined in MPT and TTML subtitle data control information.

Then, the reception device 30 sequentially receives MPU storing TTML subtitle data therein.

The reception device 30 extracts TTML subtitle data from the received MPU, and displays subtitle data according to display control information recorded in the TTML subtitle data.

The display processing result is four videos illustrated at the lower part in FIG. 35.

The reception device first receives (b) MPU (TTML1), and performs subtitle display according to TTML1 stored in MPU.

The video (p) is a subtitle-superposed video displayed according to TTML1 stored in (b) MPU (TTML1).

The subtitle data "THANK YOU" stored in TTML1 is displayed in the designated region (r1) in the region designation information recorded in TTML1. The display timing is time (t1).

The time (t1) corresponds to the subtitle display time information recorded in TTML1, or the subtitle display timing information of <p begin="156 s" duration="5 s">.

The reception device then receives (c) MPU (TTML2), and performs subtitle display according to TTML2 stored in MPU.

The videos (q) to (s) are subtitle-superposed videos displayed according to TTML2 stored in (c) MPU (TTML2).

At first, the subtitle data "YOU ARE WELCOME" stored in TTML2 is displayed in the designated region (r2) in the region designation information recorded in TTML2.

The video is the video (q).

The display timing is time (t2). The time (t2) corresponds to the subtitle display time information corresponding to "YOU ARE WELCOME" recorded in TTML2, or the subtitle display timing information of <p begin="170 s">.

The subtitle data "REGARDING THAT MATTER" stored in TTML2 is then displayed in the designated region (r2) in the region designation information recorded in TTML2.

The video is the video (r).

The display timing is time (t3). The time (t3) corresponds to the subtitle display time information corresponding to "REGARDING THAT MATTER" recorded in TTML2, or the subtitle display timing information of <p begin="175 s">.

Then, the subtitle data "○ΔX* . . . " stored in TTML2 is displayed in the designated region (r2) in the region designation information recorded in TTML2.

The video is the video (s).

The display timing is time (t3).

The subtitle data "○ΔX* . . . " follows "REGARDING THAT MATTER" recorded in TTML2, and cannot fall within the designated region (r2), and thus is overwritten on the erased old subtitles to be displayed. Therefore, the display timing is offset from the designated time (t2) for display. Note that, the roll-up display may be performed as described above.

Further, the reception device displays the subtitle data "(BANG SOUND OF DOOR)" stored in TTML2 in the designated region (r3) in the region designation information recorded in TTML2.

The video is the video (s).

The display timing is time (t3). The time (t3) corresponds to the subtitle display time information corresponding to "(BANG SOUND OF DOOR)" stored in TTML2, or the subtitle display timing information of <p begin="180 s">.

When the segmentation mode of the operation mode (OPM)=1 is set in this way, the reception device 30 performs subtitle display of the TTML subtitle data stored in the received MPU according to the display timing defined in the TTML subtitle data control information.

With the processing, subtitle display synchronized with the video scenes of contents such as movie can be performed. In this operation mode, each item of TTML subtitle data can be independently processed. Thus, new TTML subtitle data can be processed without any influence of previous TTML subtitle data.

[8-3. Processing while OPM=2: Program Mode is Set]

Subtitle display control in the operation mode (OPM) of OPM=2 or in the setting of OPM=10=program mode will be described below with reference to FIG. 36.

The OPM=2 mode setting is a mode in which a TTML file recording all the subtitles of one program therein is prepared and is repeatedly transmitted from the transmission device to the reception device and the reception device performs subtitle display of the program by use of the TTML file.

Figure 36:
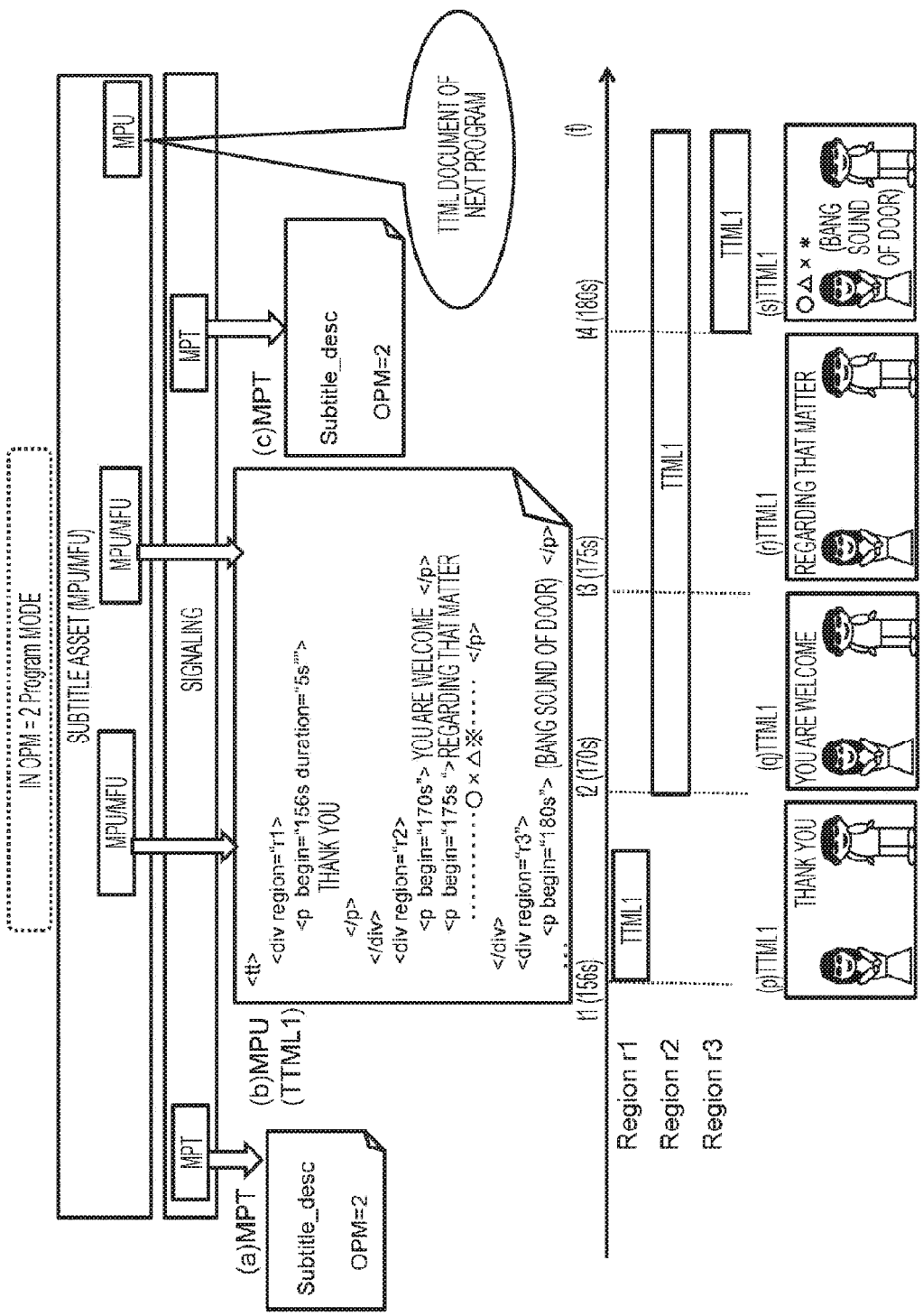
FIG. 36 is a diagram for explaining the processing while OPM=2: Program mode is set.

FIG. 36 illustrates the following data:
(a) MPT
(b) TTML subtitle data extracted from MPU (TTML1)
(c) MPT Further, the illustrated subtitle asset (MPU/MFU) and signaling indicate MPU/MFU stored in the MMT packet transmitted from the transmission device 20 to the reception device 30 and each channel of the signaling message, respectively.

The reception device 30 obtains MPT from the transmission channel of the signaling message, and obtains MPU or MFU including TTML subtitle data from the subtitle asset channel.

Further, a time axis (t) as well as TTML subtitle data and exemplary subtitle display applied over time is illustrated at the lower part in FIG. 36.

The data of OPM=2 (=10) is recorded in (a) MPT.

This is the setting of OPM=10=Program mode as described above with reference to FIG. 20, and the setting is a mode of performing subtitle display of one program by use of the TTML file recoding all the subtitles of the program, for example.

(b) TTML subtitle data (TTML1) extracted from MPU or MFU includes all the subtitle data of one program.

Note that, with one transmission of MPU, the subtitles cannot be displayed when the broadcast service is selected, and thus MPU of the same TTML subtitle data file is repeatedly transmitted in this mode.

A description of control information defining a display timing and a display region therein is included for each of the items of subtitle data in (b) TTML1.

The subtitle display timing information of <p begin="156 s" duration="5 s"> is recorded and the display region information of <div region "r1"> is recorded for the subtitles "THANK YOU."

Further, the subtitle display timing information of <p begin="170 s"> is recorded and the display region information of <div region="r2"> is recorded for the subtitles "YOU ARE WELCOME."

Further, the subtitle display timing information of <p begin="175 s"> is recorded for each of the subtitles "REGARDING THAT MATTER" and "○ΔX* . . . " applied with the display region information of <div region="r2">.

Further, the subtitle display timing information of <p begin="180 s"> is recorded and the display region information of <div region="r3"> is recorded in association with the subtitles "BANG SOUND OF DOOR."

Note that, as described above with reference to FIG. 35, when the subtitle data designated in the TTML subtitle data cannot be displayed in one designated region, the subtitles to be displayed are sequentially switched and displayed over time. Alternatively, roll-up display or subtitle display in several lines is performed so that the new subtitles are sequentially displayed in the lower line and the old subtitles in the upper line are sequentially erased for displaying the new subtitles.

The processing of the reception device 30 in OPM=2 illustrated in FIG. 36 will be described.

At first, the reception device 30 confirms an operation mode with reference to MPT.

It confirms that the setting is OPM=10=Program mode.

That is, it confirms that the setting is a mode of displaying subtitles according to the TTML subtitle data file recording all the subtitles of one program.

Once receiving MPU storing the entire TTML subtitle data of one program, the reception device 30 does not need to receive repeatedly-transmitted MPU.

The reception device 30 extracts TTML subtitle data of a program, and displays the subtitle data according to the display control information recorded in the TTML subtitle data.

The display processing result is four videos illustrated at the lower part in FIG. 36.

The reception device performs subtitle display according to the reconstructed TTML1.

The video (p) is a subtitle-superposed video displayed according to TTML1.

The subtitle data "THANK YOU" stored in TTML1 is displayed in the designated region (r1) in the region designation information recorded in TTML1. The display timing is time (t1).

The time (t1) corresponds to the subtitle display time information recorded in TTML1, or the subtitle display timing information of <p begin="156 s" duration="5 s">.

The reception device sequentially performs subtitle display by use of the same TTML1.

The videos (q) to (s) are subtitle-superposed videos displayed according to TTML1.

The subtitle data "YOU ARE WELCOME" stored in TTML1 is displayed in the designated region (r2) in the region designation information recorded in TTML1.

The video is the video (q).

The display timing is time (t2). The time (t2) corresponds to the subtitle display time information corresponding to "YOU ARE WELCOME" recorded in TTML1, or the subtitle display timing information of <p begin="170 s">.

Then, the subtitle data "REGARDING THAT MATTER" stored in TTML1 is displayed in the designated region (r2) in the region designation information recorded in TTML1.

The video is the video (r).

The display timing is time (t3). The time (t3) corresponds to the subtitle display time information corresponding to "REGARDING THAT MATTER" recorded in TTML1, or the subtitle display timing information of <p begin="175 s">.

Then, the subtitle data "○△X* . . . " stored in TTML1 is displayed in the designated region (r2) in the region designation information recorded in TTML1.

The video is the video (s).

The display timing is time (t3).

The subtitle data "○△X* . . . " follows "REGARDING THAT MATTER" recorded in TTML1 and cannot fall within the designated region (r2), and thus is overwritten on the erased old subtitles to be displayed. Therefore, the display timing is offset from the designated time (t2) for display. Note that, as described above, roll-up display may be performed Further, the reception device displays the subtitle data "(BANG SOUND OF DOOR)" stored in TTML1 in the designated region (r3) in the region designation information recorded in TTML1.

This video is the video (s).

The display timing is time (t3). The time (t3) corresponds to the subtitle display time information corresponding to "(BANG SOUND OF DOOR)" recorded in TTML1, or the subtitle display timing information of <p begin="180 s">.

When the program mode of the operation mode (OPM)=2 is set in this way, the reception device 30 receives a TTML subtitle data file of one program only once, and ignores repeatedly-transmitted data.

With the processing, the MPU reception and analysis processing do not need to be performed in parallel within the content display period for the contents such as movie, which alleviates processing loads on the reception device. Also in this operation mode, the processing of each item of TTML subtitle data can be independently performed. Thus, new TTML subtitle data can be processed without any influence of previous TTML subtitle data.

The processing of the reception device 30 in each of the operation modes (OPM) have been described with reference to FIG. 34 to FIG. 36.

As described above, the operation mode (OPM) recorded in MPT can be set as follows:
00=Live mode
01=Segmentation mode
10=Program mode 00=Live mode is a mode of instantly displaying received TTML subtitle data on reception. For example, the mode is used for displaying subtitle data of simultaneous interpretation or the like.

01=Segmentation mode is a mode applied to contents for which subtitle data is previously prepared, such as movie contents, and is a mode of displaying according to a display timing defined in MPT and TTML subtitle data control information.

10=Program mode is a mode in which a TTML file recording all the subtitles of one program is prepared and is transmitted from the transmission device to the reception device and the reception device performs subtitle display of the program by use of the TTML file.

The Live mode (OPM=00) is different from the Segmentation mode (OPM=1) in that OPM=00 is for instantly displaying subtitles according to received TTML while OPM=01 is for displaying subtitles on the basis of a timing recorded in received TTML.

According to the above exemplary embodiment, in the exemplary processing in OPM=00 with reference to FIG. 34, a description of subtitle display timing is not included in received TTML.

Therefore, if a rule of instant display is followed when a description of subtitle display timing is not included in received TTML, all the modes may be OPM=01.

In OPM=00 as described above, the processing may not be performed independent of previously-received TTML subtitle data. On the other hand, in OPM=01, each item of TTML subtitle data can be independently processed. The processing in the reception device require information for determining whether to overwrite newly-received TTML subtitle data in the memory area for storing previous TTML subtitle data display data or whether to temporarily store it in another area for confirming a relationship. That is, a flag indicating whether subtitle display based on previously-received TTML subtitle data and independent processing are possible (independent processing possibility flag) may be set in MPT.

The OPM=2 setting is a mode of performing a processing by use of TTML subtitle data of one program, and a flag indicating whether to repeatedly transmit the same TTML subtitle data (repeat flag) may be set as a flag having the same meaning in MPT.

[9. Processing Sequences of Processing Performed by Transmission Device and Reception Device]

The processing sequences performed by the transmission device and the reception device will be described below with reference to the flowcharts illustrated in FIG. 37 and FIG. 38.

The processing performed by the transmission device 20 will be first described with reference to the flowchart illustrated in FIG. 37. The processing according to the flow illustrated in FIG. 37 are performed in the data processing unit in the transmission device 20. For example, the processing are performed according to a program stored in the storage unit under control of the CPU having a program execution function in the data processing unit, for example.

Figure 37:
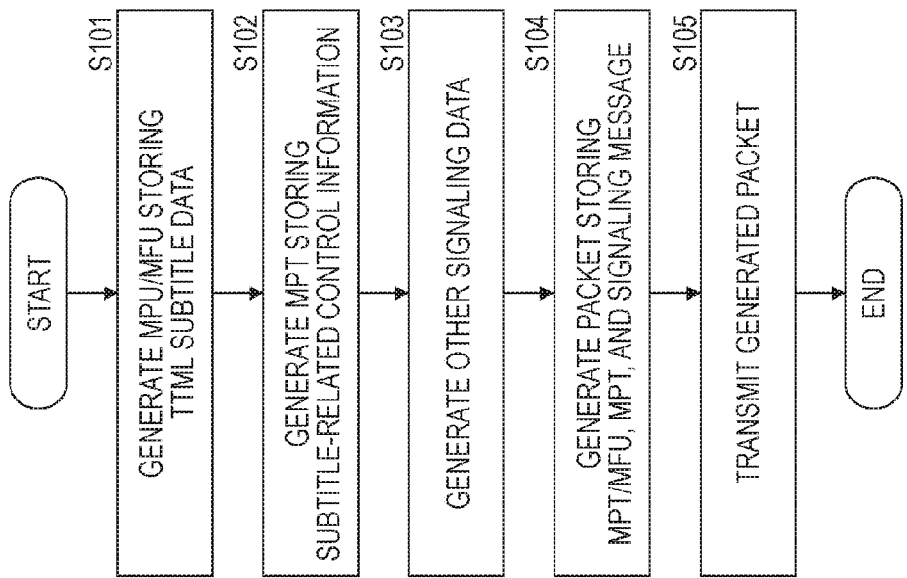
FIG. 37 is a diagram illustrating a flowchart for explaining a processing sequence performed by the transmission device.
Figure 38:
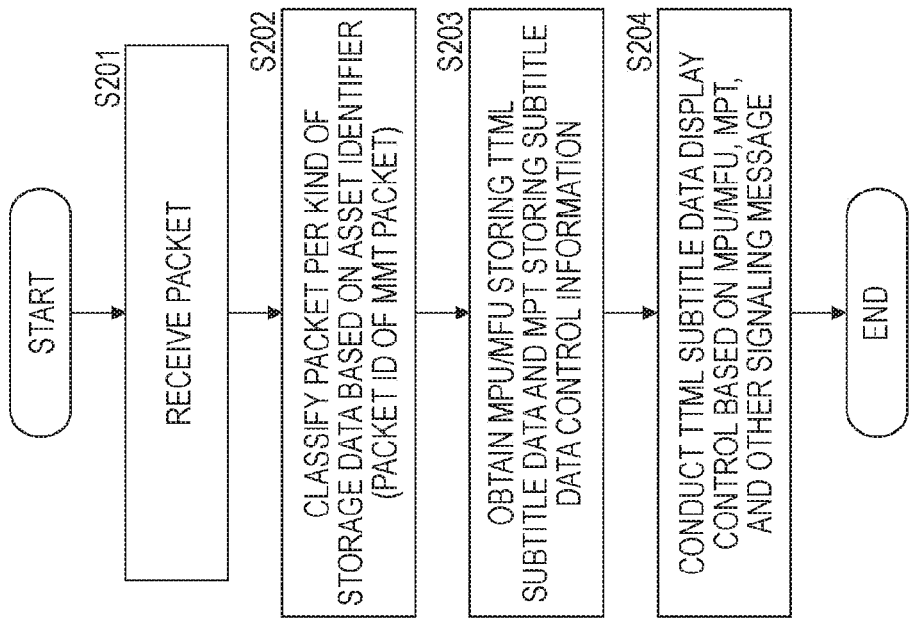
FIG. 38 is a diagram illustrating a flowchart for explaining a processing sequence performed by the reception device.

Note that, the flow illustrated in FIG. 37 is directed for mainly explaining the processing on subtitles.

In step S101, the transmission device generates one or more MPUs storing TTML subtitle data therein. Further, it generates MFU as divided MPU data as needed.

MPU is an asset-related unit depending on the kind of subtitles, which stores TTML subtitle data therein. MPU is generated as asset-based data defined per kind of subtitles.

The kind of subtitle is discriminated depending on subtitle channel tag, subtitle type, or the like, not only the kind of language.

Control information or attribute information is recorded in MPT in units of asset, and TTML character data belonging to the same asset is subjected to the same control.

Then, in step S102, MPT storing control information corresponding to the MPU generated in step S101 is generated.

MPT is a table storing a plurality of items of subtitle-related control information or attribute information described above with reference to FIG. 9 to FIG. 12 and FIG. 16 to FIG. 22.

As described above, the following descriptors are recorded in the subtitle information descriptor [subtitle descriptor] recording fields in MPT:

(1) Language code (ISO_639_language_code)
(2) Subtitle type (Type)
(3) Time mode (TMD)
(4) Display mode (DMF)
(5) Operation mode (OPM)
(6) Display format (Format)
(7) Compression mode (Compression_mode)

The subtitle-related control information and attribute information are asset-based, and TTML character data belonging to the same asset is subjected to control according to the asset-based control information, such as display timing control.

Then, in step S103, a packet storing MPT or MFU, MPT, and other signaling message is generated.

In step S105, the transmission device 20 transmits the packet storing the information on MPU/MFU or MPT.

Note that, the transmission device 20 additionally generates and transmits a packet storing videos and audios therein or a packet storing other control information therein.

The processing sequence performed by the reception device 30 will be described below with reference to the flow illustrated in FIG. 30. The processing according to the flow illustrated in FIG. 30 are performed in the data processing unit in the reception device 30. For example, the processing are performed according to a program stored in the storage unit under control of the CPU having a program execution function in the data processing unit.

Note that, the flow illustrated in FIG. 30 is directed for mainly explaining the processing on subtitles.

In step S201, the reception device receives a packet transmitted from the transmission device 20.

In step S202, the packet is classified per kind of data (such as video, audio, or subtitles) on the basis of an asset identifier (packet ID of MMT packet) of the received packet.

Then, in step S203, the reception device 30 obtains MPU or MFU storing TTML subtitle data stored as payload of the MMT packet, and MPT storing MPU-related control information.

Then, in step S204, subtitle data display control is performed by use of TTML subtitle data recorded in MPU or MFU or a signaling message such as each item of recording information of MPT storing MPU-related control information therein, and other time information.

[10. Exemplary Structure of Transmission Device and Reception Device]

FIG. 39 illustrates an exemplary hardware structure of a communication device applicable as the transmission device 20 and the reception device 30.

A Central Processing Unit (CPU) 401 functions as a data processing unit for performing various processing according to a program stored in a Read Only Memory (ROM) 402 or a storage unit 408. For example, it performs the processing according to the sequence described according to the exemplary embodiment described above. A Random Access Memory (RAM) 403 stores programs executed by the CPU 401 or data therein. The CPU 401, the ROM 402, and the RAM 403 are connected to each other via a bus 404.

The CPU 401 is connected to an I/O interface 405 via the bus 404, and the I/O interface 405 is connected to an input unit 406 made of various switches, keyboard, mouse, microphone or the like, and an output unit 407 such as display or speaker. The CPU 401 performs various processing in response to an instruction input from the input unit 406, and outputs the processing results to the output unit 407, for example.

The storage unit 408 connected to I/O interface 405 is configured of a hard disk or the like, for example, and stores the programs executed by the CPU 401 or various items of data therein. A communication unit 409 functions as a data communication exchange unit via a network such as the Internet or local area network, and a broadcast wave exchange unit, and makes communication with external devices.

A drive 410 connected to the I/O interface 405 drives a removable medium 411 such as magnetic disk, optical disk, magnetooptical disk, or semiconductor memory such as memory card, and records or reads data.

Note that, data coding or decoding can be performed as a processing of the CPU 401 as the data processing unit, and a codec as dedicated hardware for performing the coding processing or the decoding processing may be provided.

[11. Summary of Structure of Present Disclosure]

The exemplary embodiment according to the present disclosure has been described in detail with reference to the specific examples. However, the exemplary embodiment can be modified or replaced by those skilled in the art without departing from the scope of the present disclosure. That is, the present invention is disclosed in exemplary forms, and should not be limited in its interpretation. CLAIMS should be referred to for determining the spirit of the present disclosure.

Note that, the technique disclosed in the present specification may be configured as follows.

(1) A reception device including:

a communication unit for receiving a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data; and a data processing unit for conducting subtitle display control by use of the TTML subtitle data and the signaling message.

(2) The reception device according to (1), wherein the TTML subtitle data storage packet is a MMT packet in which one TTML subtitle data file is set as Media presentation unit (MPU) defined in the MMT format.

(3) The reception device according to (1) or (2), wherein the signaling message is a message in which subtitle-related information is recorded in MMT package table (MPT) defined in the MMT format.

(4) The reception device according to (3), wherein the MPT includes asset-based subtitle display control information set per kind of subtitles, and the data processing unit conducts subtitle display control according to the asset-based subtitle display control information recorded in the MPT.

(5) The reception device according to (3) or (4), wherein the MPT includes time mode (TMD) setting information defining a subtitle display timing therein, and the data processing unit conducts subtitle display timing control in a set time mode (TMD) recorded in the MPT.

(6) The reception device according to (5), wherein the time mode (TMD) in the MPT is configured to be able to designate a mode using TTML description and Envent Information Table (EIT), and when the set time mode in the MPT is a mode of designating the use of the TTML description and the EIT, the data processing unit determines a subtitle display timing by use of display timing control information described in the TTML subtitle data and content start time information obtained from the EIT.

(7) The reception device according to (5), wherein the time mode (TMD) in the MPT is configured to be able to designate a mode using TTML description and Normal Play Time (NPT), and when the set time mode in the MPT is a mode of designating the use of the TTML description and the NPT, the data processing unit determines a subtitle display timing by use of display timing control information described in the TTML subtitle data, and correspondence data between NPT time information obtained from NPT reference information and UTC (coordinated universal time) time information.

(8) The reception device according to (5), wherein the time mode (TMD) in the MPT is configured to be able to designate a mode using TTML description and an absolute time, and when the set time mode in the MPT is a mode of designating the use of the TTML description and the absolute time, the data processing unit determines a subtitle display timing by use of display timing control information described in the TTML subtitle data and the absolute time.

(9) The reception device according to (5), wherein the time mode (TMD) in the MPT is configured to be able to designate a mode using TTML description and reference start time (reference_starttime) as high-accuracy time information on a content start time recorded in the EIT or MPT, and when the set time mode in the MPT is a mode of designating the use of the TTML description and the time information (reference starttime) recorded in the EIT or MPT, the data processing unit determines a subtitle display timing by use of display timing control information described in the TTML subtitle data and time information (reference starttime) recorded in the EIT or MPT.

(10) The reception device according to (5), wherein the time mode (TMD) in the MPT is configured to be able to designate a mode using a MPU timestamp recorded in the MPT, and when the set time mode in the MPT is a mode of designating the use of the MPU timestamp, the data processing unit determines a subtitle display timing by use of the MPU timestamp recorded in the MPT.

(11) The reception device according to (5), wherein the time mode (TMD) in the MPT is configured to be able to designate a mode indicating no TTML subtitle data display timing control, and when the set time mode in the MPT is a mode indicating no TTML subtitle data display timing control, the data processing unit conducts subtitle display timing control for instantly displaying the TTML subtitle data.

(12) The reception device according to any one of (3) to (11), wherein the MPT includes operation mode (OPM) setting information defining subtitle display control information therein, and the data processing unit conducts subtitle display control in a set operation mode (OPM) recorded in the MPT.

(13) The reception device according to (12), wherein the operation mode (OPM) in the MPT is configured to be able to designate the modes (a) to (c):

(a) Live mode of instantly displaying TTML subtitle data on reception (b) Segmentation mode of displaying TTML subtitle data according to TTML description, and (c) Program mode of performing a subtitle display processing by use of program-based TTML subtitle data, and the data processing unit conducts display control according to operation mode designation information recorded in the MPT.

(14) A transmission device including:

a data processing unit for generating a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data; and a communication unit for transmitting the TTML subtitle data storage packet and the signaling message.

(15) The transmission device according to (14), wherein the TTML subtitle data storage packet is a MMT packet in which one TTML subtitle data file is set as Media presentation unit (MPU) defined in the MMT format.

(16) The transmission device according to (14) or (15), wherein the data processing unit generates a signaling message in which asset-based subtitle display control information set per kind of subtitles is recorded in MMT package table (MPT) defined in the MMT format.

(17) The transmission device according to any one of (14) to (16), wherein the data processing unit selectively applies information in any of (a) to (e) thereby to generate a signaling message including time mode (TMD) designation information for determining a subtitle display timing:
(a) Envent Information Table (EIT)
(b) NPT (Normal Play Time)
(c) absolute time
(d) high-accuracy reference start time (reference start-time) indicating a content start time; and
(e) MPU timestamp defining a TTML subtitle data processing time therein.

(18) The transmission device according to any one of (14) to (17),
wherein the data processing unit generates a signaling message including operation mode (OPM) designation information for selectively performing instant display of TTML subtitle data or TTML description-based display thereof.

(19) A data processing method performed by the reception device, wherein the communication unit receives a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data, and
the data processing unit conducts subtitle display control by use of the TTML subtitle data and the signaling message.

(20) A data processing method performed by the transmission device,
wherein the data processing unit generates a TTML subtitle data storage packet storing Timed Text Markup Language (TTML) subtitle data as payload of a MMT packet defined in the MPEG Media Transport (MMT) format, and a signaling message including subtitle-related information corresponding to the TTML subtitle data, and
the communication unit transmits the TTML subtitle data storage packet and the signaling message.

A series of processing described in the specification can be performed in hardware, software, or a combination thereof. When the processing are performed in software, the program recording a processing sequence therein may be installed in a memory in a computer incorporated in dedicated hardware for execution, or the program may be installed in a general-purpose computer capable of performing various processing for execution. For example, the program may be previously recorded in a recording medium. The program may be installed from a recording medium into a computer, and additionally the program may be received via a network such as Local Area Network (LAN) or the Internet and installed in a recording medium such as incorporated hard disk.

Note that, various processing described in the specification may be performed in time sequence according to the description, or may be performed in parallel or independently depending on a processing capability of a device for performing the processing or as needed. In the present specification, a system is a logical collective structure of a plurality of devices and the devices in each structure are not necessarily in the same casing.

INDUSTRIAL APPLICABILITY

As described above, according to one exemplary embodiment of the present disclosure, a device and method for realizing accurate TTML subtitle data display control can be realized.

Specifically, a TTML subtitle data storage packet storing TTML subtitle data as payload of a MMT packet defined in the MMT format, and a signaling message including subtitle-related information corresponding to the TTML subtitle data are transmitted from the transmission device to the reception device. The signaling message defines therein a time mode (TMD) as subtitle display timing control mode, or an operation mode (OPM) of selectively performing instant display of subtitles or TTML description-based display thereof and the reception device can conduct display control in a designated mode.

With the structure, a device and a method for realizing accurate TTML subtitle data display control can be realized.

REFERENCE SIGNS LIST

10 Communication system
20 Transmission device
21 Broadcast station
30 Reception device
31 TV
32 PC
33 Portable terminal
51 Content providing unit
52 Information processing unit
53 Clock signal generation unit
54 Video data processing unit
55 Audio data processing unit
56 Subtitle data processing unit
57 Signaling data processing unit
58 TLV signaling data processing unit
59 IP service multiplexer
60 TLV multiplexer
61 Communication unit
71 Communication unit
72 Demultiplexer
73 TLV processing unit
74 UDP/IP processing unit
75 MMT processing unit
76 MMT-SI filter
77 TLV-SI filter
78 Clock signal generation unit
79 Video data processing unit
80 Audio data processing unit
81 Subtitle data processing unit
82 Control unit
83 Superposition unit
91 Video MPU
92 Audio MPU
93 to 95 Subtitle MPU
96 Signaling message
401 CPU
402 ROM
403 RAM
404 Bus
405 I/O interface
406 Input unit
407 Output unit
408 Storage unit
409 Communication unit
410 Drive
411 Removable medium

The invention claimed is:
1. A reception device comprising:
a communication unit for receiving a TTML subtitle data storage packet storing Timed Text Markup Language (TTML) subtitle data as payload of a MMT packet defined in the MPEG Media Transport (MMT) format, and a signaling message including subtitle display control information corresponding to the TTML subtitle data; and a data processing unit for conducting subtitle display control by use of the TTML subtitle data and the signaling message wherein the subtitle display control information includes a time mode (TMD) identifier, the time mode identifier is an identifier capable of identifying a mode of determining a subtitle display timing by use of description data of the TTML subtitle data and a mode of determining a subtitle display timing without the use of description data of the TTML subtitle data, and the data processing unit selectively conducts subtitle display timing control using description data of the TTML subtitle data or subtitle display timing control not using description data of the TTML subtitle data depending on the time mode identifier;

wherein the signaling message is a message in which subtitle display control information is recorded in MMT package table (MPT) defined in the MMT format;

wherein the MPT includes asset-based subtitle display control information set per kind of subtitles, and the data processing unit conducts subtitle display control according to the asset-based subtitle display control information recorded in the MPT.

2. The reception device according to claim 1, wherein the TTML subtitle data storage packet is a MMT packet in which one TTML subtitle data file is set as Media presentation unit (MPU) defined in the MMT format.

3. The reception device according to claim 1, wherein the MPT includes time mode (TMD) identifier defining a subtitle display timing therein, and the data processing unit conducts subtitle display timing control in a set time mode (TMD) identifier recorded in the MPT.

4. The reception device according to claim 3, wherein the time mode (TMD) identifier in the MPT is configured to be able to identify a mode using TTML description and an absolute time, and when the set time mode in the MPT is an identifier of designating the use of the TTML description and the absolute time, the data processing unit determines a subtitle display timing by use of display timing control information described in the TTML subtitle data and the absolute time.

5. The reception device according to claim 3, wherein the time mode (TMD) identifier in the MPT is configured to be able to identify a mode using TTML description and Normal Play Time (NPT), and when the set time mode in the MPT is an identifier of designating the use of the TTML description and the NPT, the data processing unit determines a subtitle display timing by use of display timing control information described in the TTML subtitle data, and correspondence data between NPT time information obtained from NPT reference information and UTC (coordinated universal time) time information.

6. The reception device according to claim 3, wherein the time mode (TMD) identifier in the MPT is configured to be able to identify a mode using TTML description and an absolute time, and when the set time mode in the MPT is an identifier of designating the use of the TTML description and the absolute time, the data processing unit determines a subtitle display timing by use of display timing control information described in the TTML subtitle data and the absolute time.

7. The reception device according to claim 3, wherein the time mode (TMD) identifier in the MPT is configured to be able to identify a mode using TTML description and reference start time (reference_starttime) as high-accuracy time information on a content start time recorded in the EIT or MPT, and when the set time mode identifier in the MPT is an identifier of designating the use of the TTML description and the time information (reference starttime) recorded in the EIT or MPT, the data processing unit determines a subtitle display timing by use of display timing control information described in the TTML subtitle data and time information (reference starttime) recorded in the EIT or MPT.

8. The reception device according to claim 3, wherein the time mode (TMD) identifier in the MPT is configured to be able to identify a mode using a MPU timestamp recorded in the MPT, and when the set time mode in the MPT is an identifier of designating the use of the MPU timestamp, the data processing unit determines a subtitle display timing by use of the MPU timestamp recorded in the MPT.

9. The reception device according to claim 3, wherein the time mode (TMD) in the MPT is configured to be able to identify a mode indicating no TTML subtitle data display timing control, and when the set time mode identifier in the MPT is an identifier indicating no TTML subtitle data display timing control, the data processing unit conducts subtitle display timing control for instantly displaying the TTML subtitle data.

10. The reception device according to claim 1, wherein the MPT includes operation mode (OPM) identifier defining subtitle display control information therein, and the data processing unit conducts subtitle display control in a set operation mode (OPM) identifier recorded in the MPT.

11. The reception device according to claim 10, wherein the operation mode (OPM) identifier in the MPT is configured to be able to identify the modes (a) to (c):

(a) Live mode of instantly displaying TTML subtitle data on reception (b) Segmentation mode of displaying TTML subtitle data according to TTML description, and (c) Program mode of performing a subtitle display processing by use of program-based TTML subtitle data, and the data processing unit conducts display control according to operation mode identifier recorded in the MPT.

12. A transmission device comprising:

a data processing unit for generating a TTML subtitle data storage packet storing TTML (Timed Text Markup Language) subtitle data as payload of a MMT packet defined in the MMT (MPEG Media Transport) format, and a signaling message including subtitle related display control information corresponding to the TTML subtitle data; and a communication unit for transmitting the TTML subtitle data storage packet and the signaling message wherein the subtitle display control information includes a time mode (TMD) identifier, the time mode identifier is an identifier capable of identifying a mode of determining a subtitle display timing using description data of the TTML subtitle data and a mode of determining a subtitle display timing not using description data of the TTML subtitle data, and the data processing unit generates a signaling message including subtitle display control information enabling to selectively conduct subtitle display timing control using description data of the TTML subtitle data or subtitle display timing control not using description data of the TTML subtitle data depending on the time mode identifier;

wherein the TTML subtitle data storage packet is a MMT packet in which one TTML subtitle data file is set as Media presentation unit (MPU) defined in the MMT format, wherein the data processing unit generates a signaling message in which asset-based subtitle display control information set per kind of subtitles is recorded in MMT package table (MPT) defined in the MMT format.

13. The transmission device according to claim 12, wherein the data processing unit selectively applies information in any of (a) to (e) thereby to generate a signaling message including time mode (TMD) identifier for determining a subtitle display timing:
(a) Envent Information Table (EIT)
(b) NPT (Normal Play Time)
(c) absolute time
(d) high-accuracy reference start time (reference_start-time) indicating a content start time; and
(e) MPU timestamp defining a TTML subtitle data processing time therein.

14. The transmission device according to claim 12, wherein the data processing unit generates a signaling message including operation mode (OPM) identifier for selectively performing instant display of TTML subtitle data or TTML description-based display thereof.

15. A data processing method performed by the reception device, wherein the communication unit receives a TTML subtitle data storage packet storing TTML (Timed Text Markup Language) subtitle data as payload of a MMT packet defined In the MMT (MPEG Media Transport) format, and a signaling message including subtitle display control information corresponding to the TTML subtitle data, the data processing unit conducts subtitle display control by use of the TTML subtitle data and the signaling message, the subtitle display control information includes a time mode (TMD) identifier, the time mode identifier is an identifier capable of identifying a mode of determining a subtitle display timing by use of description data of the TTML subtitle data and a mode of determining a subtitle display timing without the use of description data of the TTML subtitle data, and the data processing unit selectively conducts subtitle display timing control using description data of the TTML subtitle data or subtitle display timing control not using description data of the TTML subtitle data depending on the time mode identifier;

wherein the signaling message is a message in which subtitle display control information is recorded in MMT package table (MPT) defined in the MMT format;

wherein the MPT includes asset-based subtitle display control Information set per kind of subtitles, and the data processing unit conducts subtitle display control according to the asset-based subtitle display control information recorded in the MPT.

16. A data processing method performed by the transmission device, wherein the data processing unit generates a TTML subtitle data storage packet storing TTML (Timed Text Markup Language) subtitle data as payload of a MMT packet defined in the MMT (MPEG Media Transport) format, and a signaling message including subtitle display control information corresponding to the TTML subtitle data, the communication unit transmits the TTML subtitle data storage packet and the signaling message, the subtitle display control information includes a time mode (TMD) identifier, the time mode identifier is an identifier capable of identifying a mode of determining a subtitle display timing by use of description data of the TTML subtitle data and a mode of determining a subtitle display timing without the use of description data of the TTML subtitle data, and the data processing unit generates a signaling message including subtitle display control information enabling to selectively conduct subtitle display timing control using description data of the TTML subtitle data or subtitle display timing control not using description data of the TTML subtitle data depending on the time mode identifier;

wherein the TTML subtitle data storage packet is a MMT packet in which one TTML subtitle data file is set as Media presentation unit (MPU) defined in the MMT format, wherein the data processing unit generates a signaling message in which asset-based subtitle display control information set per kind of subtitles is recorded in MMT package table (MPT) defined in the MMT format.

* * * * *